United States Patent
Theimer et al.

(10) Patent No.: US 9,639,589 B1
(45) Date of Patent: May 2, 2017

(54) CHAINED REPLICATION TECHNIQUES FOR LARGE-SCALE DATA STREAMS

(71) Applicant: Amazon Technologies, Inc., Reno, NV (US)

(72) Inventors: Marvin Michael Theimer, Bellevue, WA (US); Benjamin Warren Mercier, Issaquah, WA (US); Nathaniel Martin Glass, Seattle, WA (US); Gaurav D. Ghare, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 292 days.

(21) Appl. No.: 14/136,645

(22) Filed: Dec. 20, 2013

(51) Int. Cl.
  *G06F 17/30* (2006.01)
(52) U.S. Cl.
  CPC .............................. *G06F 17/30575* (2013.01)
(58) Field of Classification Search
  CPC ......... G06F 17/30575; G06F 17/30578; G06F 17/30581; G06F 17/30566
  USPC ................................ 707/610, 634, 637, 615
  See application file for complete search history.

(56) References Cited

U.S. PATENT DOCUMENTS

| | | | |
|---|---|---|---|
| 7,386,586 B1 | 6/2008 | Headley et al. | |
| 8,359,596 B2 | 1/2013 | Kobayashi et al. | |
| 8,386,631 B2 | 2/2013 | Nilsson et al. | |
| 8,386,771 B2 | 2/2013 | Baker et al. | |
| 8,463,633 B2 | 6/2013 | Jung et al. | |
| 8,488,661 B2 | 7/2013 | Menon et al. | |
| 8,543,746 B2 | 9/2013 | Roever | |
| 2007/0250835 A1 | 10/2007 | Kobayashi et al. | |
| 2009/0125362 A1 | 5/2009 | Reid et al. | |
| 2011/0178985 A1* | 7/2011 | San Martin Arribas | G06F 17/30584 707/636 |
| 2012/0066337 A1 | 3/2012 | Wu et al. | |
| 2012/0265890 A1 | 10/2012 | Carlson et al. | |
| 2013/0073724 A1 | 3/2013 | Parashar et al. | |
| 2013/0124466 A1* | 5/2013 | Naidu | G06F 17/30575 707/610 |
| 2013/0346366 A1* | 12/2013 | Ananthanarayanan | G06F 17/30578 707/611 |
| 2014/0019413 A1* | 1/2014 | Braam | G06F 11/1471 707/625 |

OTHER PUBLICATIONS

U.S. Appl. No. 14/077,158, filed Nov. 11, 2013, Marvin Michael Theimer.
U.S. Appl. No. 13/942,618, Carl Bellingan, filed Jul. 15, 2013.
(Continued)

*Primary Examiner* — Robert Beausoliel, Jr.
*Assistant Examiner* — Pedro J Santos
(74) *Attorney, Agent, or Firm* — Robert C. Kowert; Meyertons, Hood, Kivlin, Kowert & Goetzel, P.C.

(57) ABSTRACT

A replication chain comprising one or more replication nodes of a multi-tenant stream management system is assigned to store data records of a partition of a particular data stream. A data record of the partition is received at a selected replication node of the replication chain. In a sequential order, a respective replica of the data record is stored at each replication node of the chain. An acknowledgement of a successful storage of the data record is provided after the replications are completed.

20 Claims, 40 Drawing Sheets

(56) References Cited

OTHER PUBLICATIONS

Alejandro Abdelnur, "Oozie Specification, a Hadoop Workflow System," Oct. 8, 2010, retrieved from http://rvs.github.com/oozie/releases/2.2.1/ WorkftowFunctionaiSpec.html on Feb. 11, 2013. pp. 1-37.

Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.

"Oozie-Design," retrieved from http://rvs.github.com/oozie/design.html on Feb. 11, 2013. pp. 1-2.

"Quartz Scheduler 2.1.x Documentation," retrieved from http://quartz-scheduler.org/files/documentation/Quartz-2.1.x-Documentation.pdfon Feb. 11, 2013. pp. 1-140.

U.S. Appl. No. 13/764,716, filed Feb. 11, 2013, Kathryn Marie Shih et al.

U.S. Appl. No. 13/764,711, filed Feb. 11, 2013, Kathryn Marie Shih et al.

U.S. Appl. No. 61/738,967, filed Dec. 18, 2012, Kathryn Marie Shih et al.

U.S. Appl. No. 13/465,944, filed May 7, 2012, Jonathan 8. Corley et al.

U.S. Appl. No. 13/465,978, filed May 7, 2012, Jonathan 8. Corley et al.

U.S. Appl. No. 13/476,987, filed May 21, 2012, Jacob Gabrielson et al.

Apache Kafka, "A High-Throughput Distributed Messaging System", pp. 1-42, Oct. 8, 2013.

Amazon Web Services, "Amazon Simple Queue Service (Amazon SQS)", pp. 1-5, Oct. 8, 2013.

Apache Software Foundation, "Hadoop Streaming", pp. 7-17, 2008.

SIGMOD Record, "Parallel Data Processing with MapReduce: A Survey", Kyong-Ha Lee, et al., pp. 11-20, Dec. 2011.

Splunk Inc., "Splunk for Application Management", pp. 1-2, 2012.

GitHub, "Rationale", pp. 1-2, Oct. 8, 2013.

GitHub, "Tutorial", pp. 1-8, Oct. 8, 2013.

U.S. Appl. No. 14/077,173, Marvin Michael Theimer, filed Nov. 11, 2013.

U.S. Appl. No. 14/077,171, Marvin Michael Theimer, filed Nov. 11, 2013.

U.S. Appl. No. 14/077,167, Marvin Michael Theimer, filed Nov. 11, 2013.

U.S. Appl. No. 14/077,162, Marvin Michael Theimer, filed Nov. 11, 2013.

U.S. Appl. No. 14/136,624, Marvin Michael Theimer, filed Dec. 20, 2013.

U.S. Appl. No. 14/316,674, filed Jun. 26, 2014, Allan Henry Vermeulen.

U.S. Appl. No. 14/316,680, filed Jun. 26, 2014, Allan Henry Vermeulen.

* cited by examiner

CHAINED REPLICATION TECHNIQUES FOR LARGE-SCALE DATA STREAMS

BACKGROUND

As the costs of data storage have declined over the years, and as the ability to interconnect various elements of the computing infrastructure has improved, more and more data pertaining to a wide variety of applications can potentially be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources. Clients may also be concerned regarding the security of their streaming data, or the results of analyzing streaming data, if such data or results are stored at facilities that the clients do not control. The failures that naturally tend to occur with increasing frequency as distributed systems grow in size, such as the occasional loss of connectivity and/or hardware failure, may also have to be addressed effectively to prevent costly disruptions of stream data collection, storage or analysis. Some clients may also be concerned about the possibility of duplicates being introduced into their data streams, which could in some cases lead to application errors.

Figure 1:
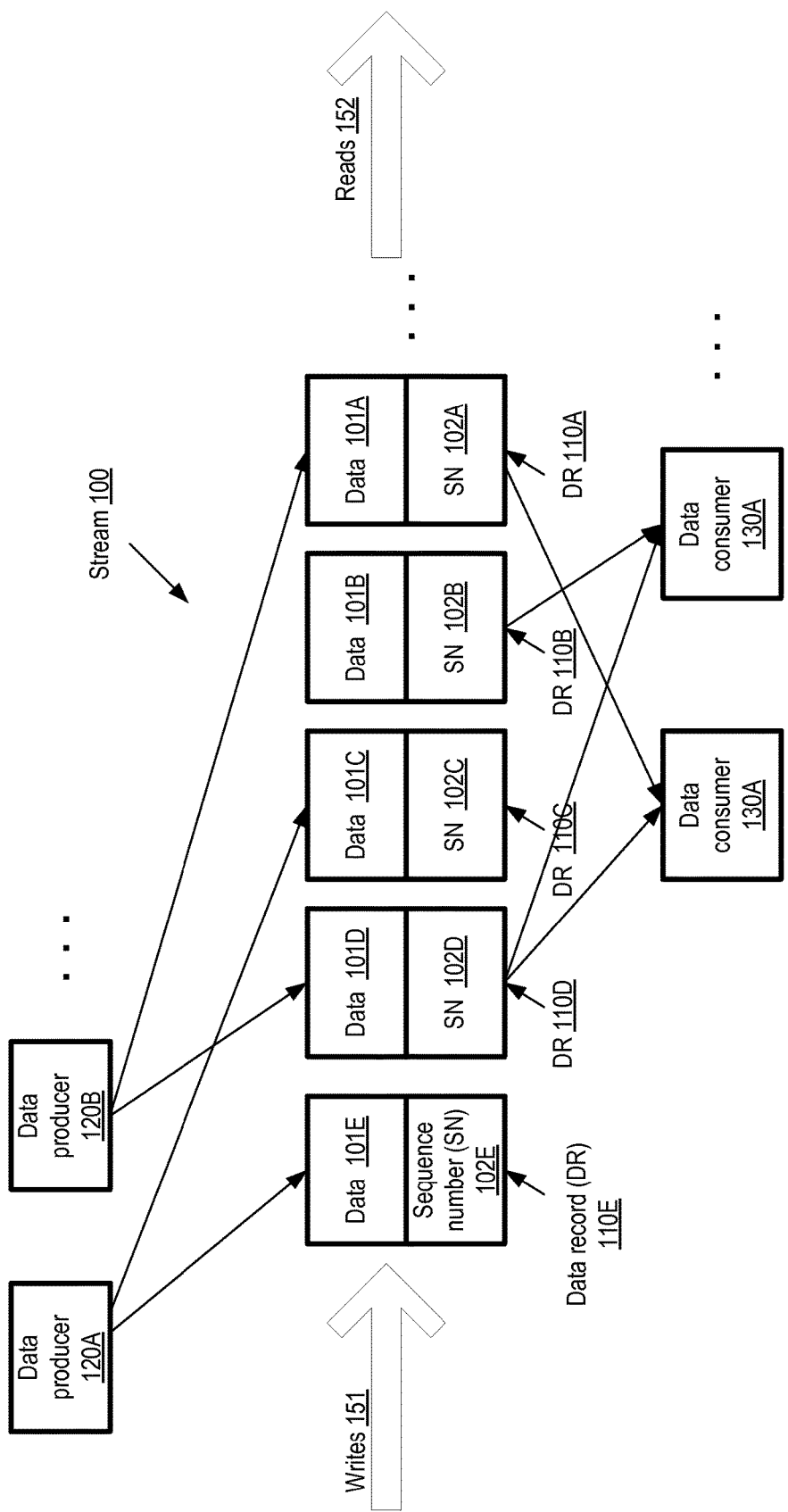
FIG. 1 provides a simplified overview of data stream concepts, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing the creation, storage, retrieval, and processing of large-scale data streams designed to handle hundreds or even thousands of concurrent data producers and data consumers are described. The term "data stream", as used herein, refers to a sequence of data records that may be generated by one or more data producers and accessed by one or more data consumers, where each data record is assumed to be an immutable sequence of bytes. A stream management service (SMS) may provide programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. Some types of stream operations (such as stream creation or deletion, or the kinds of dynamic repartitioning operations described below) that involve interactions with SMS control components may be referred to as "control-plane" operations herein, while operations such as data record submissions, storage and retrievals that typically (e.g., under normal operating conditions) do not require interactions with control components may be referred to herein as "data-plane" operations. Dynamically provisioned sets of compute, storage and networking resources may be used to implement the service in some such embodiments, based for example on various partitioning policies that allow the stream management workload to be distributed in a scalable fashion among numerous service components, as described below in further detail. The acronym SMS may be used herein to refer to a stream management service, and also to a stream management system comprising the collection of virtual and/or physical resources used to implement a stream management service.

Some customers of the SMS may develop applications that directly invoke the SMS programmatic interfaces in various embodiments. In at least some embodiments, however, in addition to the SMS interfaces, a higher-level abstraction or application-level processing framework may be provided for customers, which may simplify various aspects of stream processing for those clients that do not wish to develop applications using the lower-level stream management functions supported directly by the SMS. Such a framework may provide its own programmatic interfaces (built, for example, on top of the SMS interfaces), enabling customers to focus more on the business logic to be implemented using stream records than on lower-level stream management operations. The higher-level framework may be implemented as a stream processing service (SPS) with its own control-plane and data-plane components in some embodiments, which may provide advanced functionality such as automated resource provisioning for stream processing, automated failovers of processing nodes, the ability to construct arbitrary stream processing workflow graphs, support for ephemeral streams, dynamic repartitioning based on workload changes or other triggering conditions, and so on. In at least some embodiments, either the stream management service, the stream processing service, or both services, may be implemented as multi-tenant managed network-accessible services in a virtualization environment. That is, various physical resources (such as computer servers or hosts, storage devices, networking devices and the like) may at least in some cases be shared among streams of different customers in such embodiments, without necessarily making the customers aware of exactly how the resources are being shared, or even making a customer aware that a given resource is being shared at all. Control components of the managed multi-tenant stream management and/or processing managed services may dynamically add, remove, or reconfigure nodes or resources being used for a particular stream based on various applicable policies, some of which may be client-selectable. In addition, the control components may also be responsible for transparently implementing various types of security protocols (e.g., to ensure that one client's stream application cannot access another client's data, even though at least some hardware or software may be shared by both clients), monitoring resource usage for billing, generating logging information that can be used for auditing or debugging, and so on. From the perspective of clients of the managed multi-tenant service(s), the control/administrative functionality implemented by the service(s) may eliminate much of the complexity involved in supporting large-scale streaming applications. In some scenarios, customers of such multi-tenant services may be able to indicate that they do not wish to share resources for at least some types of stream-related operations, in which case some physical resources may be designated at least temporarily as being single-tenant for those types of operations (i.e., limited to operations performed on behalf of a single customer or client).

A number of different approaches may be taken to the implementation of SMS and/or SPS control-plane and data-plane operations in various embodiments. For example, with respect to control-plane operations, in some implementations a redundancy group of control servers or nodes may be set up. The redundancy group may include a plurality of control servers, of which one server is designated as a primary server responsible for responding to administrative requests regarding various streams, while another server may be designated to take over as the primary in the event of a triggering condition such as a failure at (or loss of connectivity to) the current primary. In another implementation, one or more tables created at a network-accessible database service may be used to store control-plane metadata (such as partition maps) for various streams, and various ingestion, storage or retrieval nodes may be able to access the tables as needed to obtain the subsets of metadata required for data-plane operations. Details regarding various aspects of the SPS and the SMS data-plane and control-plane functionality in different embodiments are provided below. It is noted that in some embodiments in which a stream management service is implemented, a stream processing service providing higher-level primitives may not necessarily be implemented. In other embodiments, only high-level programmatic interfaces of a stream processing service may be exposed to customers, and lower-level stream management interfaces used by the may not be made available to clients.

According to some embodiments, a stream management system may comprise a plurality of independently configurable subsystems, including a record ingestion subsystem primarily responsible for obtaining or collecting data records, a record storage subsystem primarily responsible for saving the data record contents in accordance with applicable persistence or durability policies, and a record retrieval subsystem primarily responsible for responding to read requests directed at the stored records. A control subsystem may also be implemented in some embodiments, comprising one or more administrative or control components responsible for configuring the remaining subsystems, e.g., by dynamically determining and/or initializing the required number of nodes for each of the ingestion, storage and retrieval subsystems at selected resources such as virtual or physical servers. Each of the ingestion, storage, retrieval and control subsystems may be implemented using a respective plurality of hardware and/or software components which may collectively be referred as "nodes" or "servers" of the subsystems. The various resources of an SMS may thus be logically said to belong to one of four functional categories: ingestion, storage, retrieval or control. In some implementations, respective sets of control components may be established for each of the other subsystems, e.g., independent ingestion control subsystems, storage control subsystems and/or retrieval control subsystems may be implemented. Each such control subsystem may be responsible for identifying the resources to be used for the other nodes of the corresponding subsystem and/or for responding to administrative queries from clients or from other subsystems. In some implementations, pools of nodes capable of performing various types of SMS and/or SPS functions may be set up in advance, and selected members of those pools may be assigned to new streams or new processing stages as needed.

Stream partitioning policies and associated mappings may be implemented in at least some embodiments, e.g., to distribute subsets of the data records between different sets of ingestion, storage, retrieval and/or control nodes. For example, based on the partitioning policy selected for a particular data stream as well as on other factors such as expectations of record ingestion rates and/or retrieval rates, a control component may determine how many nodes (e.g., processes or threads) should be established initially (i.e., at stream creation time) for ingestion, storage and retrieval, and how those nodes should be mapped to virtual and/or physical machines. Over time, the workload associated with a given stream may increase or decrease, which (among other triggering conditions) may lead to repartitioning of the stream. Such re-partitioning may involve changes to various parameters, such as the function to be used to determine a record's partition, the partitioning keys used, the total number of partitions, the number of ingestion nodes, storage nodes or retrieval nodes, or the placement of the nodes on different physical or virtual resources. In at least some embodiments, the repartitioning may be implemented dynamically without interrupting the flow of the data records, using techniques described below in further detail. Different partitioning schemes and repartition-triggering criteria may be used for different data streams in some embodiments, e.g., based on client-provided parameters or on heuristics of the SMS control nodes. In some embodiments, it may be possible to limit the number and/or frequency of reparations, e.g., based on client preferences, the expected lifetime of a stream, or other factors.

A number of different record ingestion policies and interfaces may be implemented in different embodiments. For example, in some embodiments, clients (e.g., executable components or modules configured to invoke the programmatic interfaces of the SMS on behalf of customers of the SMS) may utilize either in-line submission interfaces, or by-reference submission interfaces. For in-line submissions, the contents or body of the data record may be included as part of the submission request in such embodiments. In contrast, in a by-reference submission request, an address (such as a storage device address, a database record address, or a URL (Uniform record Locator)) may be provided from which the contents or body of the data record can be obtained. In some implementations, a hybrid submission interface may also or instead be supported, in which up the first N bytes of the data record may be included in-line, while the remaining bytes (if any) are provided by reference. In such a scenario, short records (whose bodies are less than N bytes long) may be fully specified by the submission request, while portions of longer records may have to be obtained from the corresponding address.

In addition to the different alternatives for specifying record contents during ingestion, in some embodiments a variety of acknowledgement or de-duplication related ingestion policies may also be implemented. For example, for some stream applications, clients may wish to ensure that each and every data record is ingested reliably by the SMS. In large distributed stream management environments, packets may be lost, or various failures may occur from time to time along the path between the data producers and the ingestion nodes, which could potentially result in some submitted data being lost. In some embodiments, therefore, an SMS may implement an at-least-once ingestion policy, in accordance with which a record submitter may submit the same record one or more times until a positive acknowledgement is received from the ingestion subsystem. Under normal operating conditions, a record may be submitted once, and the submitter may receive an acknowledgement after the receiving ingestion node has obtained and stored the record. If the acknowledgement is lost or delayed, or if the record submission request itself was lost, the submitter may resubmit the same data record one or more times, until eventually an acknowledgement is received. The ingestion node may, for example, generate an acknowledgement for each submission, regardless of whether it is a duplicate or not, based on an expectation that the record would not be resubmitted if an acknowledgement had already been received by the submitter. The ingestion node may, however, be responsible in at least some embodiments for recognizing that the same data record has been submitted multiple times, and for avoiding storing new copies of the duplicate data unnecessarily. In some embodiments, a decentralized technique for de-duplication may be used, in which local de-duplication tables are instantiated at each ingestion node to store de-duplication signatures for only the partitions to which the ingestion node. A number of optimization techniques may be used to limit the sizes of the local de-duplication tables, as described below in further detail.

In one embodiment, at least two versions of an at-least-once ingestion policy may be supported—one version (which may be termed "at-least-once ingestion, no-duplication") in which the SMS is responsible for de-duplicating data records (i.e., ensuring that data is stored at the SMS storage subsystem in response to only one of a set of two or more submissions), and one version in which duplication of data records storage by the SMS is permitted (which may be termed "at-least-once, duplication-permitted"). The at-least-once, duplication-permitted approach may be useful for stream applications in which there are few or no negative consequences of data record duplication, and/or for stream applications that perform their own duplicate elimination. Other ingestion policies may also be supported, such as a best-effort ingestion policy in which acknowledgements are not required for every data record submitted. The loss of a few data records may be acceptable if a best-effort ingestion policy is in effect in at least some embodiments. Clients may select which ingestion policies they wish to use for various streams in various embodiments.

With respect to the storage of stream records, a number of alternative policies may also be supported in at least some embodiments. For example, a client may be able to choose a persistence policy from among several supported by the SMS, which governs such aspects of record storage as the number of copies of a given data record that are to be stored, the type of storage technology (e.g., volatile or non-volatile RAM, rotating disk-based storage, solid state devices (SSDs), network attached storage devices, and the like) to be used for the copies, and so on. For example, if a client selects an N-replica persistence policy to disk-based storage, a data record submission may not be considered complete until N copies of the record have been safely written to N respective disk devices. A chained replication technique may be used in some embodiments, in which the N copies are written to N storage locations in sequential order, as described below in further detail. In at least some embodiments in which disk-based storage devices are used, the SMS storage subsystem may attempt to write incoming data records of a given partition sequentially to disk, e.g., to avoid the performance impact of disk seeks. Sequence numbers may be generated for (and stored with) data records using various techniques as described below, including for example timestamp-based techniques that enable ordered record retrieval based on ingestion times. Data records of a given partition may be stored together, e.g., contiguously on disk, and separately from the data records of other partitions in at least some embodiments. In some implementations, in accordance with a retention policy (selected by a client or by the SMS) or a de-duplication time window policy (indicating the time period, subsequent to a submission of any given data record, during which the SMS may be required to ensure that no duplicates of that given data record are stored in the SMS storage subsystem, even if some duplicates are submitted), at least some data records may be archived to a different types of storage service and/or deleted after a time period from the SMS. Such removal operations may be referred to herein as stream "trimming". Clients may submit stream trimming requests in some embodiments, e.g., notifying the SMS that specified data records are no longer needed and can therefore be deleted from the perspective of the client submitting the trimming request, or explicitly requesting the deletion of specified data records. In scenarios in which there may be multiple clients consuming the data records of a given stream, the SMS may be responsible for ensuring that a given record is not deleted or trimmed prematurely, before it has been accessed by all the interested consumers. In some implementations, if there are N data consumers of a given stream, before deleting a given record R of the stream, he SMS may wait until it has determined that all N data consumers have read or processed R. The SMS may determine that R has been read by all the consumers based on respective trimming requests from the consumers, for example, or based on respective indications of how far within the stream the data consumers have progressed. In some embodiments, some types of data consumers (such as testing-related applications) may accept the deletion of at least a small subset of data records before they have been accessed. Accordingly, applications may be able to notify the SMS regarding the acceptability of data deletion prior to retrieval in at least some embodiments, and the SMS may schedule deletions in accordance with the notifications. In some embodiments, an archival policy may be implemented, e.g., as part of the data retention policy, indicating for example the types of storage devices to which stream data records should be copied, and the scheduling policies to be used for such copies.

In at least some embodiments, a plurality of programmatic interfaces may also be supported for record retrieval. In one embodiment, an iterator-based approach may be used, in which one programmatic interface (e.g., getIterator) may be used to instantiate and position an iterator or cursor at a specified logical offset (e.g., based on sequence number or timestamp) within a partition of a stream. A different programmatic interface (such as getNextRecords) may then be used to read a specified number of data records sequentially starting from the current position of the iterator. The instantiation of an iterator may in effect allow a client to specify an arbitrary or random starting position for record retrieval within the stream partition. If a client wishes to read data records in a random access pattern in such an embodiment, the client may have to repeatedly create new iterators. In rotating disk based storage systems, disk seeks required for frequent random accesses may impact I/O response times significantly. Accordingly, as an incentive to clients to read stream data records sequentially rather than randomly, different (e.g., higher) billing rates may be applied to random read accesses than are applied to sequential read accesses in at least some embodiments. Thus, for example, a client may be billed X currency units per getIterator call, and Y currency units per record retrieved via getNextRecords, with X>Y in some implementations. When alternative client interfaces are supported for other operation categories (such as ingestion), in at least some embodiments the billing rates or prices for the alternatives may also differ—e.g., a client may be charged more for a by-reference submission request than for an online submission request, just as a client may be charged more for random reads than for sequential reads. Other factors may also influence billing in various embodiments, such as the sizes of the data records, the distribution of write versus read requests over time, the persistence policies selected, and so on.

According to some embodiments, a stream processing service (SPS) may allow clients to specify arbitrarily complex processing workflows comprising numerous processing stages, in which the output of the processing performed at a given stage may be used as input for zero or more other stages. Partitioning policies (similar to those described for the SMS for ingesting, storing and retrieving data records) may be used to divide the processing workload among a plurality of worker nodes at various stages in some embodiments. In one such embodiment, programmatic SPS interfaces may be implemented enabling clients to specify various configuration settings for any given stage, including for example the input data source(s) for the stage (e.g., one or more streams from which data records are to be retrieved, together with the partitioning policies for the streams), the processing operations to be performed at the stage, and a descriptor or specification for output or result distribution from the stage (e.g., whether the output is to be saved to storage locations, sent to a network endpoint, or fed into one or more other processing stages in the form of a different stream). In at least some embodiments, the processing operations specified for an SPS stage may be idempotent: that is, if a given processing operation is performed multiple times on the same input data, the result of the operation does not differ from the result that would have been obtained if the operation were performed just once. Recoveries from failures (e.g., a worker node failure at an SPS stage) may be simplified if the processing operations are idempotent, as described below in further detail. According to some embodiments, non-idempotent processing operations may be permitted at some or all SPS stages.

Based at least in part on configuration information such as the input stream partitioning policies and then nature of the processing operations received via the SPS programmatic interfaces, in various embodiments SPS control servers may determine how many worker nodes are to be set up initially for various stages of a processing workflow. The performance capabilities of the resources to be used for the worker nodes (e.g., the virtual or physical machines being used) may also be taken into account when determining the initial number and placement of the worker nodes. The selected number of worker nodes (which may in some implementations each comprise an executable thread or an executable process) may be instantiated. Each worker node may be configured, for example, to obtain data records from the appropriate input sources (e.g., from retrieval nodes of one or more stream partitions), perform the specified processing operations on the data records, and transmit the results of the processing to the specified output destination(s). In addition, in at least some embodiments, a checkpoint scheme may be implemented, in accordance with which a given worker node may be configured to store progress records or checkpoints indicative of the portion of a partition that has been processed at that worker node, with the assumption that the partition records are being processed sequentially. The worker node may, for example, write a progress record to persistent storage periodically in some implementations (e.g., once every N seconds or once every R data records have been processed), and/or in response to checkpoint requests from an SPS control server.

The progress records may be used for rapid recovery from worker node failures in some embodiments. For example, an SPS control server may monitor the health status of the various worker nodes over time, e.g., using a heartbeat mechanism and/or by monitoring resource utilization levels (such as CPU utilization, I/O device utilization, or network utilization levels). In response to a determination by the SPS control server that a particular worker node is in an undesired or unhealthy state (e.g., if it is unresponsive or overloaded), a replacement worker node may be instantiated to take over the responsibilities of the particular worker node. The replacement worker node may access the most recent progress record stored by the replaced worker node to identify the set of data records that the replacement worker node should process. In embodiments in which the processing operations are idempotent, even if some operations are repeated (e.g., because the most recent progress record was written some time prior to the replacement worker's instantiation), the overall results of the processing would not be affected by the failure and replacement. In some implementations, in addition to storing progress records indicating the subset of a given stream or partition that has been processed by it, a worker node may also be configured to store accumulated application state information. For example, if a stream processing workflow is responsible for determining client billing amounts for a particular service based on analyzing streaming data records that indicate service usage metrics, a worker node may periodically store the cumulative billing amounts determined for various clients.

In at least some embodiments, the SPS control servers may also be configured to respond to various other triggers such as changing workload levels or detected workload imbalances (e.g., if the ingestion rates for one partition become disproportionately higher than those of others) by initiating other actions, such as requesting dynamic repartitioning of the input streams for various stages, changing the number of worker nodes assigned to a given partition at a given stage., assigning higher-performance worker nodes to some stages, or transferring worker nodes from one physical resource to another physical resource with a different performance capability. In some embodiments, e.g., in response to a determination by an SPS control server that a best-effort recovery policy is to be implemented for a given stage rather than a checkpoint-based recovery policy, progress records of the type described above may not be stored by worker nodes of at least some SPS stages. In some implementations of such a best-effort recovery policy, a replacement worker node may simply process new data records as they are received, without requiring access to progress records. In some embodiments, if a client wishes to implement a best-effort recovery policy at an SPS stage, the stream processing operations performed at the stage need not necessarily be idempotent. In some embodiments in which non-idempotent processing operations are to be performed on stream records at an SPS stage, checkpoint-based recovery may not be supported, and a different recovery scheme such as best-effort recovery may be used. In at least one embodiment, only idempotent stream processing operations may be allowed at SPS stages.

The data records of some streams may contain sensitive or confidential information, or the processing operations performed at the SPS stages may comprise the use of proprietary algorithms whose discovery by competitors may be problematic. Clients may thus be concerned about the security of various categories of stream management and processing operations, especially if the operations are performed using resources located at provider network data centers that are not fully controlled by the clients themselves. Networks set up by an entity such as a company or a public sector organization to provide one or more network-accessible services (such as various types of cloud-based database, computing or storage services) accessible via the Internet and/or other networks to a distributed set of clients may be termed provider networks herein. In some embodiments, clients may be able to choose from among a plurality of security-related options for their data streams. As described above, a combined SPS and SMS configuration may comprise nodes belonging to a number of different functional categories, such as control nodes for the SMS and/or the SPS, SMS ingestion nodes, SMS storage nodes, SMS retrieval nodes, and SPS processing or worker nodes. The security-related choices made available to clients may include options for placement or locations of various types of nodes in some embodiments. For example, in one embodiment, a client may be able to request that SPS worker nodes for one or more processing stages of a stream workflow be implemented at computing devices located on client-owned facilities, even if the stream records are initially collected and/or stored using resources located at a provider network. In response to such placement requests, nodes of different functional categories for a given stream may be instantiated at respective resource sets with differing security characteristics or profiles.

The resource sets may differ from one another in various security-related characteristics in different embodiments, including for example physical location, physical security protocols being used (e.g., who has physical access to the resources), network isolation levels (e.g., the extent to which network addresses of the resources are visible to various entities), multi-tenancy versus single-tenancy, and so on. In some embodiments, clients may be able to establish isolated virtual networks (IVNs) within a provider network, with a given client being given substantial control over networking configurations of various devices included within that client's IVN. In particular, clients may be able to restrict access to the network addresses (e.g., Internet Protocol or IP addresses) assigned to various servers or compute instances within their IVNs. In such embodiments, clients may request that certain subsets of their SMS or SPS nodes be instantiated within specified IVNs. In embodiments in which provider network resources such as virtualization instance hosts (which may typically be configured as multi-tenant hosts) are being used for various categories of SMS or SPS nodes, a client may request that some set of nodes be instantiated on instance hosts that are restricted to implementing instances belonging to that client alone (i.e., some SMS or SPS nodes may be implemented at instance hosts configured as single-tenant hosts).

In some embodiments, as another security-related option, clients may request that the data records of a particular stream be encrypted before they are transmitted over a network link—e.g., before being ingested at the SMS, between the ingestion and storage subsystems, between the storage and retrieval subsystems, between the retrieval subsystems and the SPS worker nodes, and/or between the worker nodes and the SPS output destinations. Clients may specify the encryption algorithms to be used in some embodiments. In one embodiment, secure networking protocols such as TLS (Transport Layer Security) or SSL (secure sockets layer) protocols may be used for data record transmissions and/or for transmitting SPS processing results.

Data Stream Concepts and Overview

FIG. 1 provides a simplified overview of data stream concepts, according to at least some embodiments. As shown, a stream 100 may comprise a plurality of data records (DRs) 110, such as DRs 110A, 110B, 110C, 110D and 110E. One or more data producers 120 (which may also be referred to as data sources), such as data producers 120A and 120B, may perform write operations 151 to generate the contents of data records of stream 100. A number of different types of data producers may generate streams of data in different embodiments, such as, for example, mobile phone or tablet applications, sensor arrays, social media platforms, logging applications or system logging components, monitoring agents of various kinds, and so on. One or more date consumers 130 (such as data consumers 130A and 130B) may perform read operations 152 to access the contents of the data records generated by the data producers 120. Data consumers 130 may comprise, for example, worker nodes of a stream processing stage in some embodiments.

In at least some embodiments, a given data record 110 as stored in an SMS may comprise a data portion 101 (e.g., data portions 101A, 101B, 101C, 101D and 101E of DRs 110A, 110B, 110C, 110D and 110E respectively) and a sequence number SN 102 (e.g., SNs 102A, 102B, 102C, 102D and 102E of DRs 110A, 110B, 110C, 110D and 110E respectively). The sequence number 102 may be indicative of the order in which the DRs are received at a stream management system (or at a particular node of a stream management system) in the depicted embodiment. The data portions 101 may comprise immutable un-interpreted byte sequences in some implementations: that is, once a write operation 152 is completed, the contents of the DR generated as a result of the write may not be changed by the SMS, and in general the SMS may not be aware of the semantics of the data. In some implementations, different data records of a given stream 100 may comprise different amounts of data, while in other implementations, all the data records of a given stream may be of the same size. In at least some implementations, nodes of the SMS (e.g., ingestion subsystem nodes and/or storage subsystem nodes) may be responsible for generating the SNs 102. As described below in further detail, the sequence numbers of the data records need not always be consecutive. In one implementation, clients or data producers 120 may provide, as part of a write request, an indication of a minimum sequence number to be used for the corresponding data record. In some embodiments, data producers 120 may submit write requests that contain pointers to (or addresses of) the data portions of the data records, e.g., by providing a storage device address (such as a device name and an offset within the device) or a network address (such as a URL) from which the data portion may be obtained.

The stream management service may be responsible for receiving the data from the data producers 120, storing the data, and enabling data consumers 130 to access the data in one or more access patterns in various embodiments. In at least some embodiments, the stream 100 may be partitioned or "sharded" to distribute the workload of receiving, storing, and retrieving the data records. In such embodiments, a partition or shard may be selected for an incoming data record 110 based on one or more attributes of the data record, and the specific nodes that are to ingest, store or retrieve the data record may be identified based on the partition. In some implementations, the data producers 120 may provide explicit partitioning keys with each write operation which may serve as the partitioning attributes, and such keys may be mapped to partition identifiers. In other implementations, the SMS may infer the partition ID based on such factors as the identity of the data producer 120, the IP addresses of the data producers, or even based on contents of the data submitted. In some implementations in which data streams are partitioned, sequence numbers may be assigned on a per-partition basis—for example, although the sequence numbers may indicate the order in which data records of a particular partition are received, the sequence numbers of data records DR1 and DR2 in two different partitions may not necessarily indicate the relative order in which DR1 and DR2 were received. In other implementations, the sequence numbers may be assigned on a stream-wide rather than a per-partition basis, so that if sequence number SN1 assigned to a data record DR1 is lower than sequence number SN2 assigned to data record DR2, this would imply that DR1 was received earlier than DR2 by the SMS, regardless of the partitions to which DR1 and DR2 belong.

The retrieval or read interfaces supported by an SMS may allow data consumers 130 to access data records sequentially and/or in random order in various embodiments. In one embodiment, an iterator-based set of read application programming interfaces (APIs) may be supported. A data consumer 130 may submit a request to obtain an iterator for a data stream, with the initial position of the iterator indicated by a specified sequence number and/or a partition identifier. After the initiator is instantiated, the data consumer may submit requests to read data records in sequential order starting from that initial position within the stream or the partition. If a data consumer wishes to read data records in some random order, a new iterator may have to be instantiated for each read in such embodiments. In at least some implementations, the data records of a given partition or stream may be written to disk-based storage in sequence number order, typically using sequential write operations that avoid disk seeks. Sequential read operations may also avoid the overhead of disk seeks. Accordingly, in some embodiments, data consumers may be encouraged to perform more sequential reads than random reads using pricing incentives: e.g., random-access read operations such as iterator instantiations may have higher associated billing rates than sequential-access read operations.

Example System Environment

Figure 2:
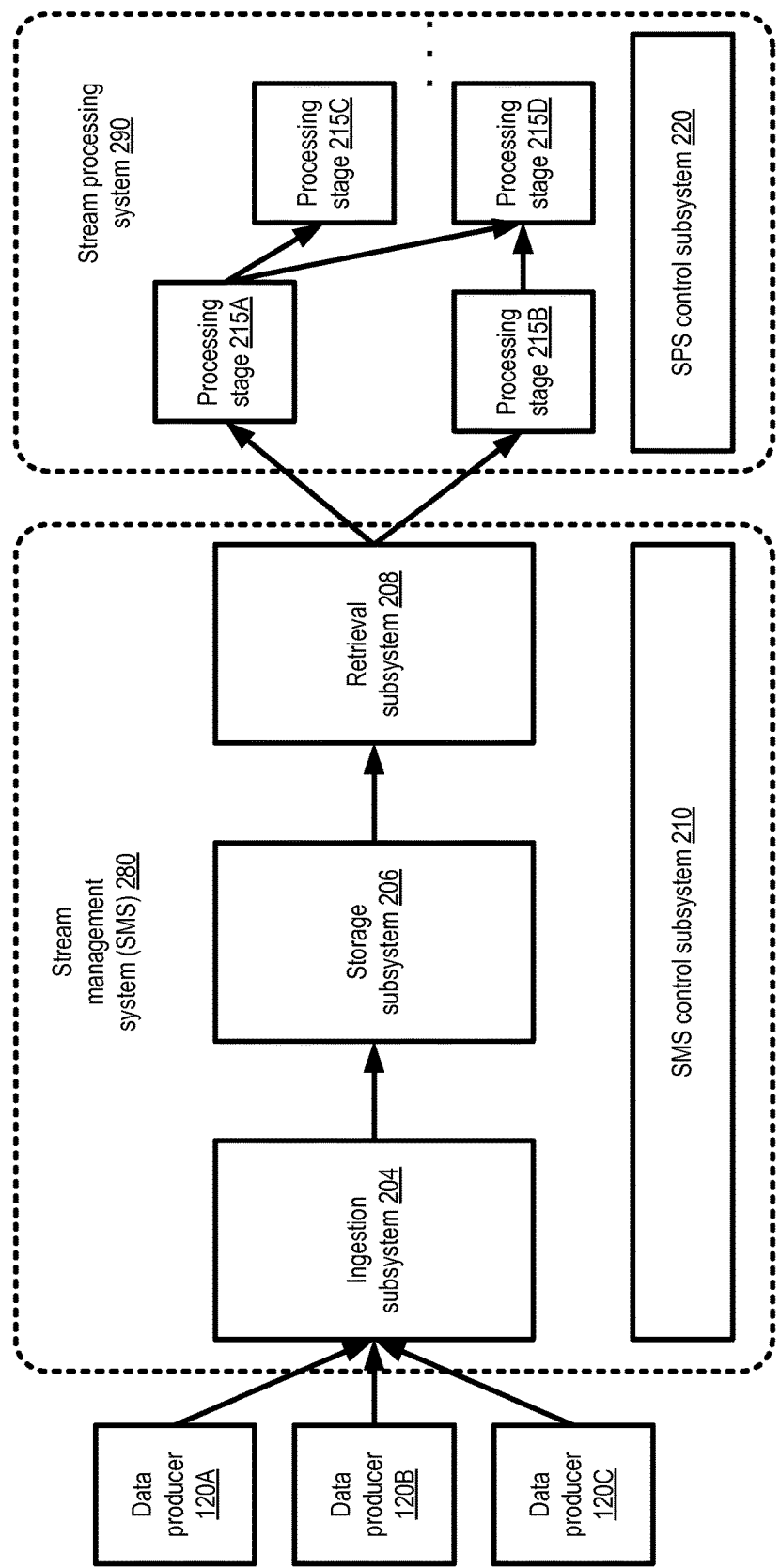
FIG. 2 provides an overview of the flow of data among various subcomponents of a stream management system (SMS) and a stream processing system (SPS) comprising a collection of stream processing stages, according to at least some embodiments.

FIG. 2 provides an overview of the flow of data among various subcomponents of a stream management system (SMS) and a stream processing system (SPS) comprising a collection of stream processing stages, according to at least some embodiments. As shown, the SMS 280 may comprise an ingestion subsystem 204, a storage subsystem 206, a retrieval subsystem 208, and an SMS control subsystem 210. Each of the SMS subsystems may include one or more nodes or components, implemented for example using respective executable threads or processes instantiated at various resources of a provider network (or a client-owned or third-party facility) as described below. Nodes of the ingestion subsystem 204 may be configured (e.g., by nodes of the SMS control subsystem 210) to obtain data records of a particular data stream from data producers 120 (such as 120A, 120B, and 120C) based on a partitioning policy in use for the stream, and each ingestion node may pass received data records on to corresponding nodes of the storage subsystem 206. The storage subsystem nodes may save the data records on any of various types of storage devices in accordance with a persistence policy selected for the stream. Nodes of the retrieval subsystem 208 may respond to read requests from data consumers, such as worker nodes of SPS 290. Stream processing stages 215, such as stages 215A, 215B, 1215C and 215D of the SPS 290 may be established with the help of SPS control subsystem 220. Each stage 215 may include one or more worker nodes configured by the SPS control subsystem 220 to perform a set of processing operations on received data records. As shown, some stages 215 (such as 215A and 215B) may obtain data records directly from the SMS 280, while others (such as 215C and 215D) may receive their inputs from other stages. Multiple SPS stages 215 may operate in parallel in some embodiments, e.g., different processing operations may be performed concurrently on data records retrieved from the same stream at stages 215A and 215B. It is noted that respective subsystems and processing stages similar to those illustrated in FIG. 2 for a particular stream may be instantiated for other streams as well.

In at least some embodiments, at least some of the nodes of the subsystems and processing stages shown in FIG. 2 may be implemented using provider network resources. As noted earlier, networks set up by an entity such as a company or a public sector organization to provide one or more network-accessible services (such as various types of cloud-based database, computing or storage services) accessible via the Internet and/or other networks to a distributed set of clients may be termed provider networks herein. Some of the services may be used to build higher-level services: for example, computing, storage or database services may be used as building blocks for a stream management service or a stream processing service. At least some of the core services of a provider network may be packaged for client use in service units called "instances": for example, a virtual machine instantiated by a virtualized computing service may represent a "compute instance", and a storage device such as a block-level volume instantiated by a storage service may be referred to as a "storage instance", or a database management server may be referred to as a "database instance". Computing devices such as servers at which such units of various network-accessible services of a provider network are implemented may be referred to as "instance hosts" or more simply as "hosts" herein. Nodes of the ingestion subsystem 204, the storage subsystem 206, the retrieval subsystem 208, the SMS control system 210, the processing stages 215, and/or the SPS control subsystem 220 may comprises threads or processes executing at various compute instances on a plurality of instance hosts in some embodiments. A given instance host may comprise several compute instances, and the collection of compute instances at a particular instance host may be used to implement nodes for various different streams of one or more clients. Storage instances may be used for storing the data records of various streams in some embodiments, or as destinations of the results of stream processing stages. Over time, control subsystem nodes may modify the populations of other subsystems dynamically in response to various triggering conditions, e.g., by adding or removing nodes, changing the mappings of nodes to processes or compute instances or instance hosts, or re-partitioning a given stream while still continuing to receive, store and process data records as described below with reference to FIG. 15 and FIG. 16.

In the context of embodiments in which provider network resources are used for stream-related operations, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of a provider network. Clients of one service may themselves be implemented using resources of another service—e.g., a stream data consumer (a client of a stream management service) may comprise a compute instance (a resource provided by a virtualized computing service).

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. It is noted that although provider networks serve as one example context in which many of the stream management and processing techniques described herein may be implemented, those techniques may also be applied to other types of distributed systems than provider networks, e.g., to large-scale distributed environments operated by a single business entity for its own applications.

Programmatic Interface Examples

Figure 3:
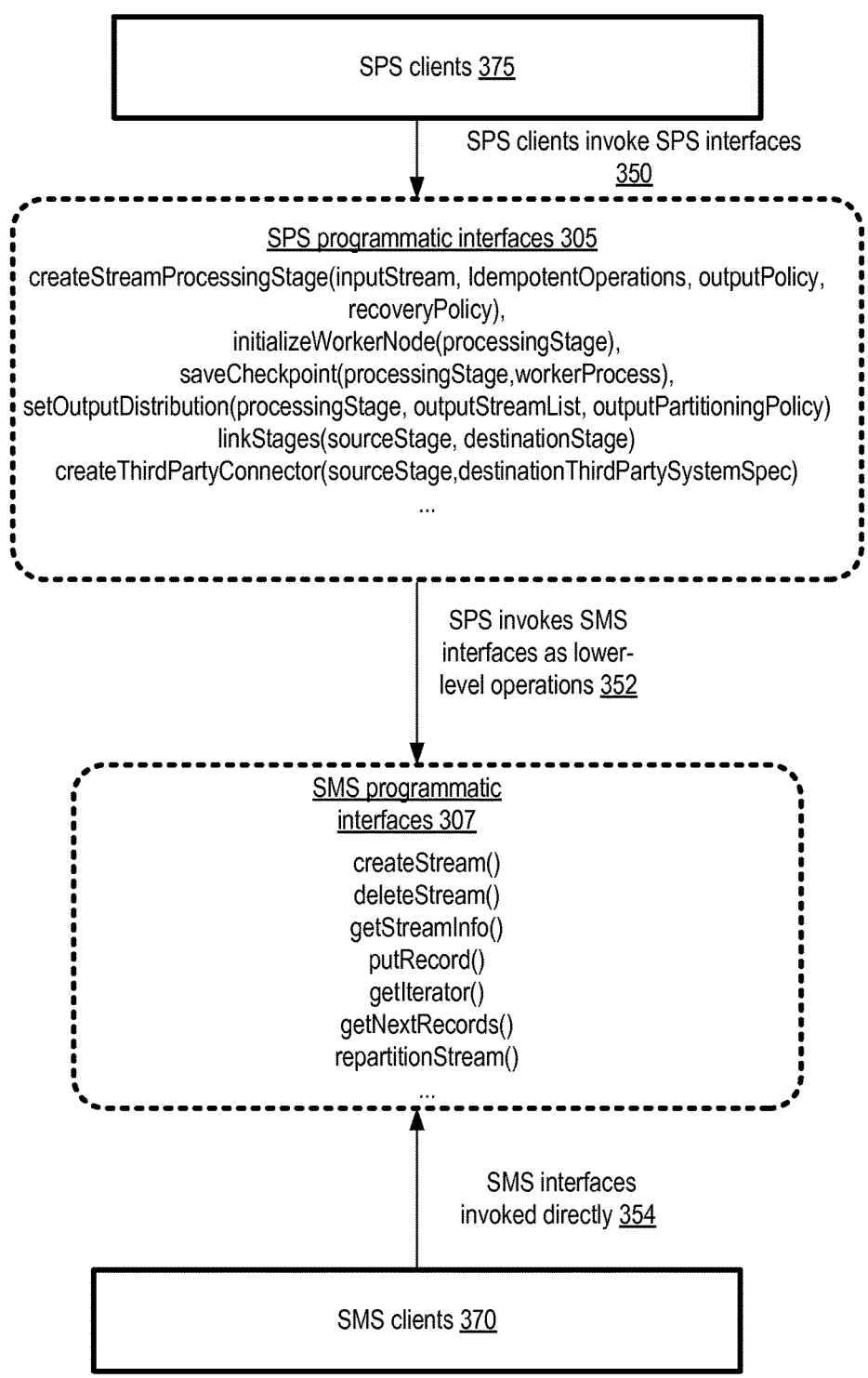
FIG. 3 illustrates examples of respective sets of programmatic interfaces that may be implemented at an SMS an SPS, according to at least some embodiments.

As indicated above, in at least some embodiments an SPS may utilize SMS programmatic interfaces to build higher-level functionality that can more easily be used by SPS clients to implement the desired business logic for various stream-based applications. When considering the differences between SPS and SMS functionality, an analogy may be helpful: SPS functions may in general be compared to programming language constructs in higher-level languages such as C++, while SMS functions may in general be compared to the assembly language instructions to which the programming language constructs are translated by a compiler. It may be possible to implement the same operations using the assembly language instructions directly, but programming in the higher-level language may typically be easier for many categories of customers or users. Similarly, it may be possible to implement various applications using the primitives provided by an SMS, but it may be easier to do so using SPS features. SPS processing operations (such as idempotent processing operations performed on data records) may be implemented on the data contents of the stream records, while the SMS operations are performed to acquire, store and retrieve the records themselves, usually without considering the contents of the records. FIG. 3 illustrates examples of respective sets of programmatic interfaces that may be implemented at an SMS an SPS, according to at least some embodiments. A number of different application programming interfaces (APIs) are indicated for both the SMS and the SPS by way of example. The APIs illustrated are not intended to be exhaustive lists of those supported in any given implementation, and some of the illustrated APIs may not be supported in a given implementation.

As indicated by arrow 350, SPS clients 375 may invoke SPS programmatic interfaces 305 to configure processing stages. Various types of SPS programmatic interfaces 305 may be implemented in different embodiments. For example, a createStreamProcessingStage API may enable clients to request the configuration of a new processing stage 215 for a specified input stream, such that worker nodes of the stage are each configured to perform a set of idempotent operations specified in the interface invocation, and to distribute the results to destinations indicated by an output distribution descriptor or policy. In some versions of the createStreamProcessingStage API or its equivalent, a client may request the creation of the input stream as well, while in other versions, an input stream may have to be created before the processing stage is created. A recovery policy may be specified for the worker nodes, indicating for example whether a checkpoint-based recovery technique is to be used or a best-effort recovery technique is preferred. In some embodiments an initializeWorkerNode API may be supported to request the explicit instantiation of worker nodes at a specified stage. In embodiments in which checkpoint-based recovery is implemented, a saveCheckpoint API may be supported to allow clients to request that progress records be generated by worker nodes.

Various types of SPS output management APIs may be supported in different embodiments, such as a setOutputDistribution API by which a client may indicate one or more streams to be created using the results of the processing operations performed at a specified stage, and the particular partitioning policies to be used for the newly created streams. Some processing stages may be configured primarily for repartitioning—e.g., one partitioning function PF1 that maps data records to N1 partitions based on record attribute set A1 may be in use for an input stream S1, and a processing stage may be used to implement a different partitioning function PF2 to map those same data records to N2 partitions (using either a different attribute set A2, or the same attribute set A1). Some SPS APIs such as linkStages may be used to configure arbitrary graphs (e.g., directed acyclic graphs) comprising a plurality of stages. In some embodiments, connectors to third-party or open-source stream processing frameworks or services may be supported. In one such embodiment, an SPS stage may be used to prepare data records (e.g., by appropriately formatting results of the processing operations performed at the stage) for consumption by existing third-party or open-source systems. An API such as createThirdPartyConnector may be used to set up such connectors in the depicted embodiment, and the appropriate transformations of the results of the SPS stage into a format compatible with the third party system may be performed by one or more connector modules instantiated as a result of a createThirdPartyConnector invocation.

The SPS may invoke SMS APIs 307 to perform at least some of its functions, as indicated by arrow 352. The SMS APIs 307 may include, for example, createStream and deleteStream (to create and delete a stream, respectively) and getStreamInfo (to obtain metadata for a stream, such as the network addresses of various types of nodes responsible for a given partition) in the depicted embodiment. A putRecord interface may be used to write data records, while the getIterator and getNextRecords interfaces may be used for non-sequential and sequential reads respectively. A repartitionStream interface may be used to request dynamic repartitioning of a specified stream in some embodiments. Clients 370 that wish to do so may invoke the SMS APIs 307 directly, as indicated by arrow 354. As indicated earlier, various other SMS and/or SPS APIs may also be implemented in other embodiments, and some of the APIs listed in FIG. 3 may not be implemented in some embodiments.

Figure 4:
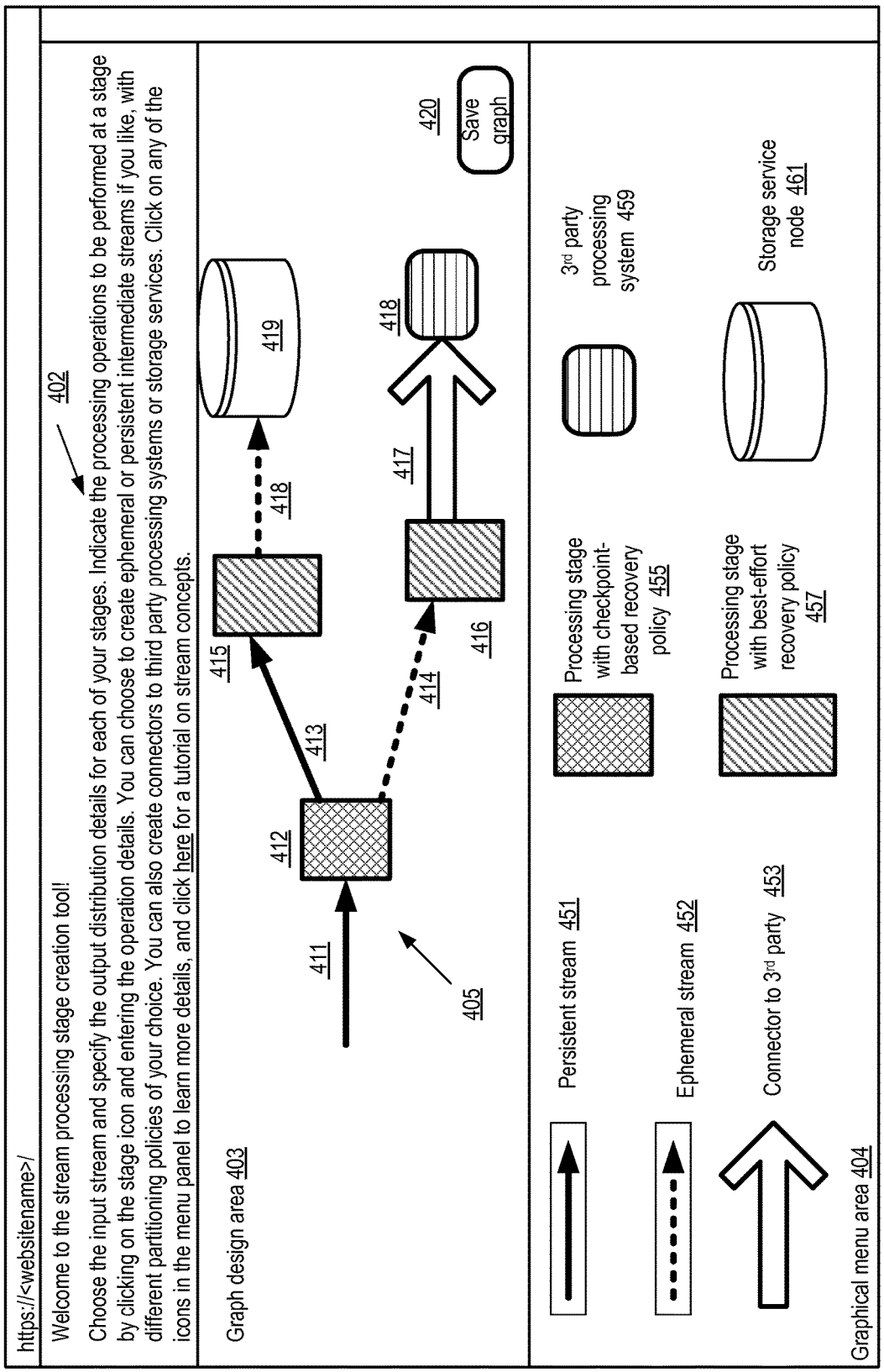
FIG. 4 illustrates an example web-based interface that may be implemented to enable SPS clients to generate graphs of stream processing stages, according to at least some embodiments.

In various embodiments, programmatic interfaces other than APIs may also or instead be implemented for either the SPS or the SMS. Such interfaces may include graphical user interfaces, web pages or web sites, command-line interfaces, and the like. In some cases web-based interfaces or GUIs may use the APIs as building blocks—e.g., a web-based interaction may result in the invocation of one or more APIs at control components of the SMS or SPS. FIG. 4 illustrates an example web-based interface that may be implemented to enable SPS clients to generate graphs of stream processing stages, according to at least some embodiments. As shown, the interface comprises a web page 400 with a message area 402, a graph menu area 404 and a graph design area 403.

Users may be provided general instructions regarding the construction of stream processing graphs in message area 402, as well as links to enable used to learn more about stream concepts and primitives. A number of graphical icons may be provided as part of a stream processing graph toolset in menu area 404. For example, clients may be allowed to indicate, as inputs or outputs of various SPS processing stages, persistent streams 451, ephemeral streams 452, or connectors 453 to third-party processing environments. With respect to the SPS/SMS for which the web-based interface is implemented, a persistent stream 451 may be defined as a stream whose data records are stored on persistent storage devices such as disks, non-volatile RAMs, or SSDs, and an ephemeral stream 452 may be defined as one whose data records need not be stored at persistent storage devices. An ephemeral stream may be created, for example, from the output of an SPS stage that is expected to be consumed as input by a different SPS stage at which a best-effort recovery policy is to be implemented.

Two types of processing stages are supported in the example SPS graph construction web page 400: stages 455 in which checkpoint-based worker node recovery is used (e.g., each worker node saves progress records at intervals, and in the event of failure of a particular worker node, a replacement node refers to the failed node's progress records to determine which data records to start processing), and stages 456 in which best-effort recovery is used (e.g., replacement worker nodes do not refer to progress records, but simply start processing new data records as they are received). Details regarding the processing operations to be performed at each stage may be entered by clicking on the corresponding icon in the graph construction area 403, as indicated by the instructions in message area 402. In addition to icons for streams, connectors, and processing stages, the menu area 404 also includes icon type 459 indicating third-party or external stream processing systems, and icon type 460 indicating nodes of a storage service that may be implemented at a provider network whose resources are being used for the processing stages.

In the example scenario shown in FIG. 4, a client has constructed a graph 405 comprising three processing stages 412, 415 and 416 within graph design area 403. Processing stage 412, which is configured to use checkpoint-based recovery, uses a persistent stream 411 as input. Output or results of the processing at stage 412 is sent to two destinations: in the form of a different persistent stream 413 that forms the input of stage 415, and in the form of an ephemeral stream 414 that forms the input of stage 416. Stages 415 and 416 both use best-effort recovery policies for their worker nodes. The output of stage 415 is sent in the form of an ephemeral stream to storage service node 419. The output of stage 415 is sent via a connector 417 to a third-party processing system 418. A "save graph" button 420 may be used to save a representation of the processing stage graph, e.g., in any appropriate format such as JSON (JavaScript Object Notation), XML (Extensible Markup Language) or YAML. Arbitrarily complex processing workflows may be constructed using tools similar to those shown in FIG. 4 in various embodiments. The workflows created using such tools may subsequently be activated, and such activations may result in invocations of SMS APIs—for example, to obtain data records for a processing stage such as stage 412 of FIG. 4, getIterator and/or getNextRecords interfaces may be invoked on stream 411.

Figure 5:
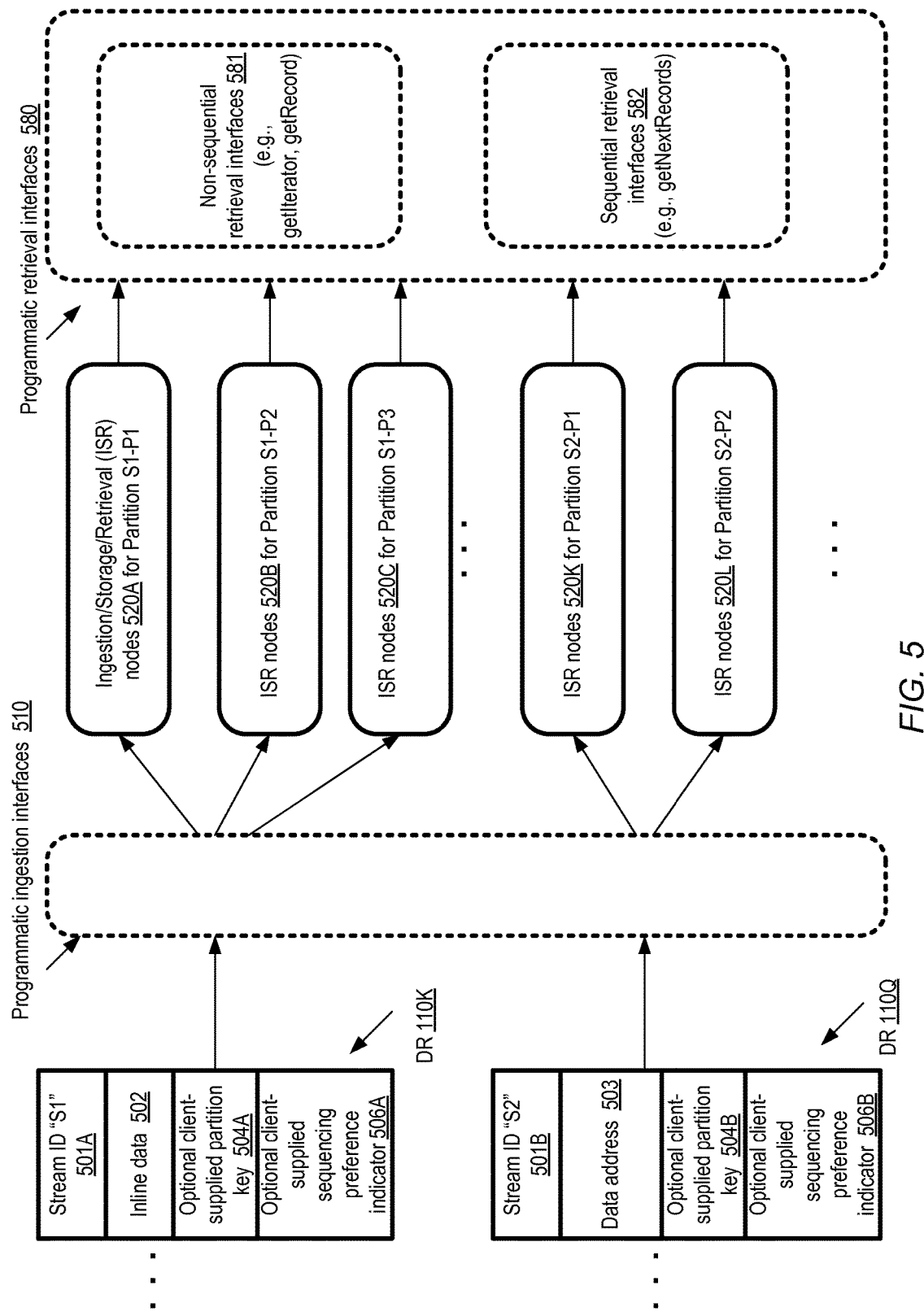
FIG. 5 illustrates examples of programmatic record submission interfaces and record retrieval interfaces that may be implemented at an SMS, according to at least some embodiments.

FIG. 5 illustrates examples of programmatic record submission interfaces and record retrieval interfaces that may be implemented at an SMS, according to at least some embodiments. Data records, such as the illustrated DRs 110K and 110Q, may be submitted via various types of programmatic ingestion interfaces 510 to the SMS in the depicted embodiment. A DR 110 may comprise four types of elements in some embodiments: a stream identifier such as 501A (for stream "S1") or 501B (for stream "S2"), an indication of the data or body of the record, an optional partition key 504 (such as 504A or 504B), and an optional sequencing preference indicator 506 (such as sequencing preference indicators 506A and 506B). The data itself may be provided in-line in some data records (e.g., inline data 502 of DR 110K), while for other data records a pointer or address 503 may be provided, indicating to the SMS a network-accessible location (or an address at a local device that does not require network transfers). In some embodiments, a given stream may support both inline and by-reference (address-based) data record submissions. In other embodiments, a given stream may require data producers to supply all the data inline or all the data by reference. In some implementations, a data record submission may include a partition identifier to be used for the record.

The incoming data records 110 may be directed to respective ingestion and/or storage nodes based on a partitioning policy in the depicted embodiment. Similarly, record retrieval may also be partition-based—e.g., one or more retrieval nodes may be designated for responding to read requests directed to records of a given partition. For some streams, data producers may be required to provide an explicit partition key with each data record write request. For other streams, the SMS may be able to distribute the data records according to a partitioning scheme that relies on metadata or attributes other than explicitly-supplied partition keys—for example, identification information pertaining to the submitting data producer may be used as a partition key, or a portion or all of the submitting data producer's IP address may be used, or a portion of the data being submitted may be used. In some implementations, for example, a hash function may be applied to a partition key to obtain an integer value of a certain size, such as a 128-bit integer. The total range of positive integers of that size (e.g., from 0 to $2^{128}-1$) may be divided into N contiguous sub-ranges, with each sub-range representing a respective partition. Thus, in such an example, any given partition key determined or supplied for a data record would be hashed to a corresponding 128-bit integer, and the contiguous sub-range of 128-bit integers to which that integer belongs may indicate the partition to which the data record belongs. Further details about partitioning policies and their use are provided below with respect to FIG. 15.

The set of nodes responsible for ingesting or accepting the data records of the particular partition, storing the data records, and responding to read requests for the particular partition, are collectively referred to as ISR (ingestion, storage and retrieval) nodes for the partition in FIG. 5. The notation Sj-Pk is used to indicate the kth partition of stream Si. In the illustrated embodiment, ISR nodes 520A are configured for ingesting, storing and retrieving records of partition S1-P1, ISR nodes 520B are set up for records of partition S1-P2, ISR nodes 520C are set up for records of partition S1-P3, ISR nodes 520K are set up for records of partition S2-P1, and ISR nodes 520L are set up for records of partition S2-P2. In some embodiments, a give node of an ingestion subsystem, a storage subsystem, or a retrieval subsystem may be configured to handle data records of more than one partition (or more than one partition of more than one stream). In some embodiments, the records of a single partition of a given stream may be ingested, stored or retrieved by more than one node. The number of ingestion nodes designated for a given partition Sj-Pk may in at least some cases differ from the number of ingestion nodes designated for a different partition Sj-P1, and may also differ from the number of storage nodes designated for Sj-Pk and/or the number of retrieval nodes designated for Sj-Pk. With respect to ingestion and/or retrieval, SMS control nodes may implement APIs (such as getStreamInfo) in some embodiments to allow clients to determine which nodes are responsible for which partitions. The mappings between data records and partitions, and between partitions and ISR nodes (or control nodes) configured, may be modified over time, as described below in the discussion regarding dynamic repartitioning.

In some embodiments, several different programmatic interfaces 580 may be implemented for retrieving or reading stream data records from a given partition. As shown in FIG. 5, some retrieval interfaces 581 may be implemented for non-sequential accesses, such as getIterator (to instantiate an iterator or read cursor at or after a data record with a specified sequence number) or getRecord (to read a data record with a specified sequence number). Other retrieval interfaces 582 may be implemented for sequential retrieval, such as getNextRecords (an interface requesting that N records be read from the current position of an iterator, in order of increasing sequence number). In rotating disk-based storage systems, as mentioned earlier, sequential I/O may in many cases be much more efficient than random I/O, because the number of disk head seeks required on average per I/O may typically be much lower for sequential I/O than for random I/O. In many embodiments, the data records of a given partition may be written in sequence number order, and as a result sequential read requests based on sequence number ordering (e.g., using getNextRecords or a similar interface) may be much more efficient than random read requests. In at least some embodiments, therefore, different billing rates may be set for sequential versus non-sequential retrieval interfaces—for example, clients may be charged more for non-sequential reads.

Ingestion Subsystem

Figure 6:
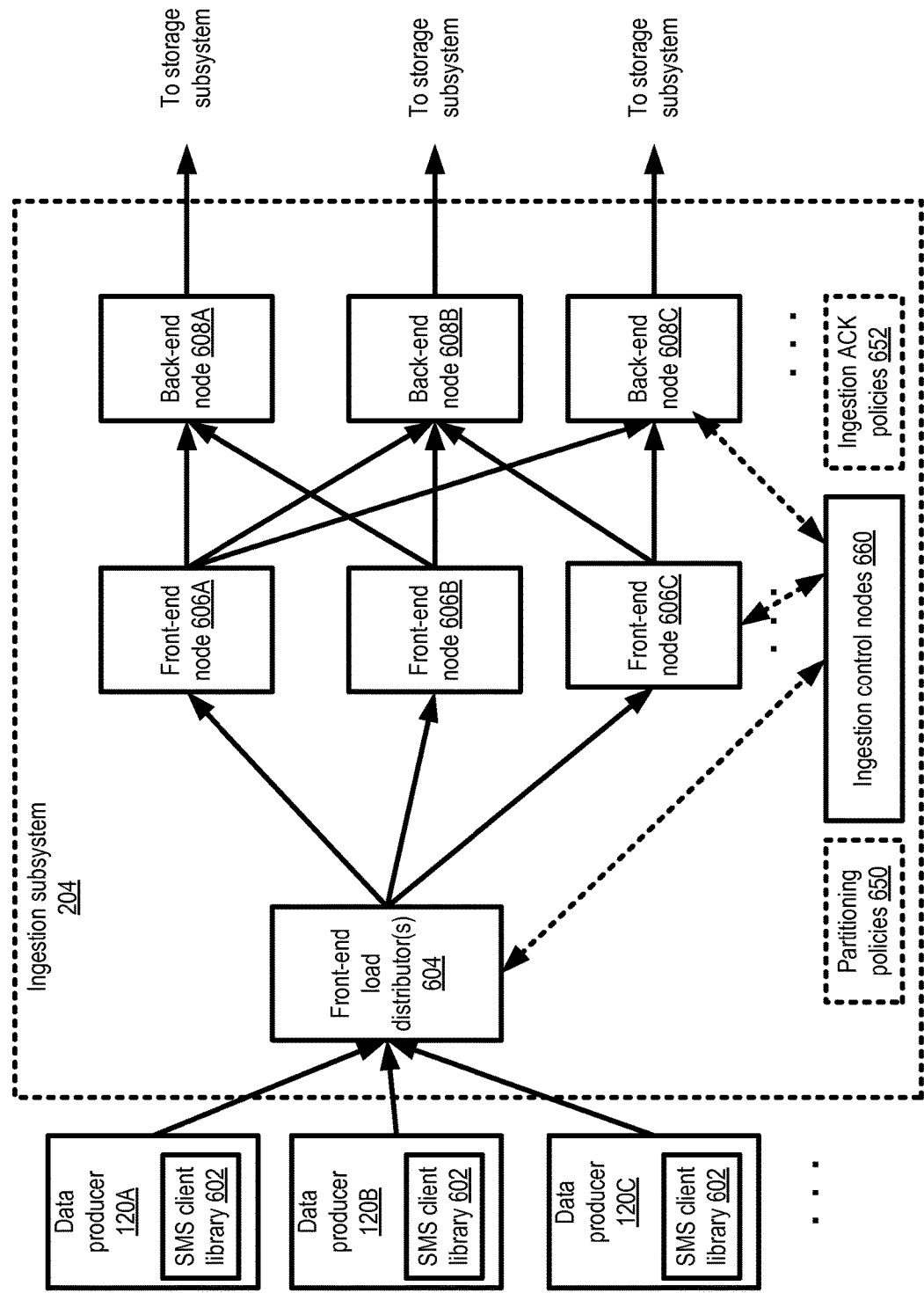
FIG. 6 illustrates example elements of an ingestion subsystem of an SMS, according to at least some embodiments.

FIG. 6 illustrates example elements of an ingestion subsystem 204 of an SMS, according to at least some embodiments. In the depicted embodiment, ingestion operations are logically divided into front-end and back-end functions, with the front-end functions involving interactions with data producers 120 (e.g., 120A, 120B or 120C), and back-end functions involving interactions with an SMS storage subsystem. Such a front-end/back-end split may have several advantages, such as enhancing the security of the storage subsystem and avoiding having to provide partitioning policy details to data producers. SMS client libraries 602 may be provided for installation at various data producers 120, and the data producers may invoke programmatic interfaces included in the libraries 602 to submit data for ingestion. For example, in one embodiment the data producers 120 may comprise logging or monitoring agents instantiated at hundreds or thousands of physical and/or virtual servers of a provider network. Such agents may collect various log messages and/or metrics at their respective servers and periodically submit the collected messages or metrics to a front-end load distributor 604 endpoint instantiated by one or more ingestion control nodes 660 of the SMS. In some embodiments, one or more virtual IP addresses (VIPs) may be established for the load distributors, to which the data producers may submit the stream data. In one implementation, a round-robin DNS (Domain Name System) technique may be used for a VIP to select a particular load distributor from among several equivalently configured load distributors to which data is to be sent by data producers 120.

The received data records may be directed to any of several front-end nodes 606 (e.g., 606A, 606B or 606C) in the depicted embodiment. In at least some embodiments, the load distributor 604 may not be aware of the partitioning policy 650 in use for the data records, and the front-end node 606 may therefore be chosen for a given data record using round-robin load balancing (or some other general-purpose load balancing algorithm) rather than partition-based load balancing. The front-end nodes 606 may be aware of the partitioning policies 650 for various streams, and may interact with the ingestion control nodes 660 to obtain the identities of the specific back-end ingestion node 608 (e.g., 608A, 608B or 608C) that is configured for a given partition's data records. Thus, in the depicted embodiment, the front-end nodes 604 may each transmit data records to a plurality of back-end nodes 606, based on the respective partitions to which the data records belong. As noted earlier, the partition to which a data record belongs may be determined based on any combination of various factors, such as a partition key supplied by the data producer, one or more other attributes such as the identity or address of the data producer, or the contents of the data.

The back-end nodes 606 may each receive data records belonging to one or more partitions of one or more streams, and transmit the data records to one or more nodes of the storage subsystem. The back-end nodes may be referred to as "PUT servers" in some embodiments in which the data is submitted via HTTP (HyperText Transfer Protocol) "PUT" web service APIs. A given back-end node may determine the set of storage subsystem nodes to which its data records are to be transmitted by submitting a query to a control node 660 (which in turn may submit a corresponding query to a control node of the storage subsystem in embodiments in which control functions for the different subsystems are handled by separate sets of nodes).

In at least some embodiments, a number of different ingestion acknowledgement policies 652 may be supported, such as an at-least-once ingestion policy or a best-effort ingestion policy. In an at-least-once policy, the data producers 120 may require positive acknowledgements for each data record submitted, and may repeatedly submit the same data record (if an acknowledgement of the first submission is not received) until an acknowledgement is eventually received. In the best-effort ingestion policy, positive acknowledgements may not be required for at least some data records submitted (although the ingestion subsystem may still provide occasional acknowledgements, or may respond to explicit requests for acknowledgements from the data producers). In some embodiments in which the ingestion subsystem 204 is required to provide acknowledgements to the data producers, the back-end ingestion node 608 responsible for a given data record may wait until the required number of replicas of the data records have been successfully created at the storage subsystem (e.g., in accordance with a persistence policy established for the stream), before generating an acknowledgement. In various embodiments, a sequence number may be generated by the ingestion subsystem for each data record received, e.g., indicative of the order in which that record was ingested relative to other records of the same partition or stream, and such a sequence number may be returned to the data producer as an acknowledgement, or as part of an acknowledgement. Further details regarding sequence numbers are provided below with reference to FIG. 13a and FIG. 13b. The acknowledgement and/or sequence number may be transmitted back to the data producer via a front-end node 606 in some implementations. In at least one implementation, the at-least-once policy may be implemented between the front-end and the back-end nodes of the ingestion subsystem itself—e.g., a given front-end node 606 may repeatedly submit a data record to the appropriate back-end node 608 until the back-end node provides an acknowledgement.

Ingestion control nodes 660 may be responsible for, among other functions, instantiating the front-end and back-end nodes, monitoring the health and workload levels of the nodes, orchestrating failovers as needed, providing responses to queries regarding which nodes are responsible for a given partition or to policy-related queries, for ingestion-related configuration operations resulting from dynamic repartitioning of streams. The number of ingestion control nodes designated for a given set of one or more streams may itself be changed over time in some embodiments, e.g., one or more master control nodes may be responsible for reconfiguring the control node pool as needed. In some embodiments in which redundancy groups are set up for ingestion front-end or back-end nodes, as described below in further detail with respect to FIG. 9 and FIG. 10, the control nodes 660 may be responsible for keeping track of which nodes are primaries and which are non-primary, for detecting the triggering conditions for failover, and for selecting replacements when failovers are required. It is noted that the multi-layered ingestion subsystem architecture illustrated in FIG. 6 may not be implemented in some embodiments, e.g., only a single set of ingestion nodes may be configured in some scenarios.

Storage Subsystem

Figure 7:
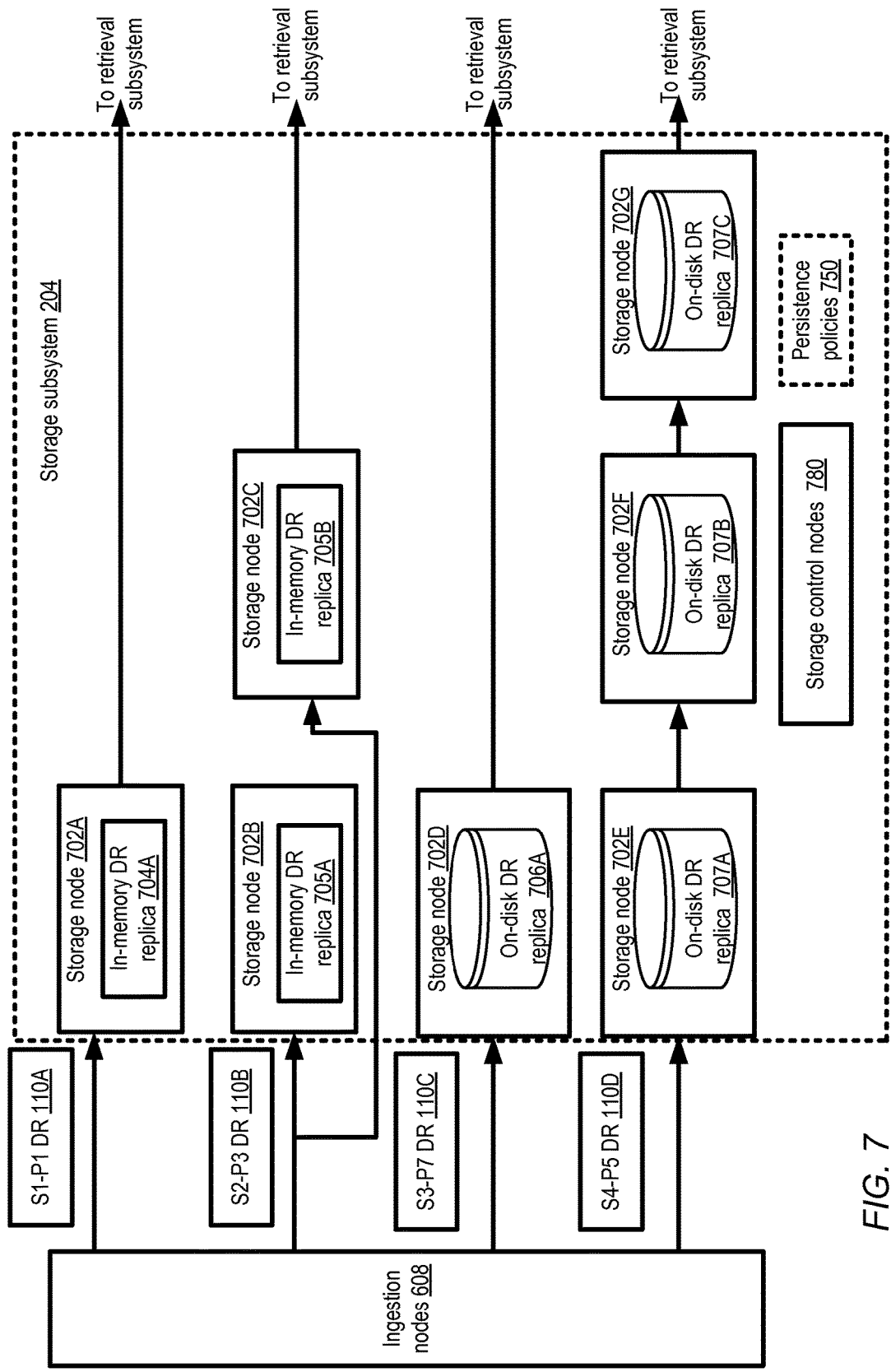
FIG. 7 illustrates example elements of a storage subsystem of an SMS according to at least some embodiments.

FIG. 7 illustrates example elements of a storage subsystem of an SMS, according to at least some embodiments. As shown, ingestion nodes 608 (e.g., back-end ingestion nodes in embodiments in which front-end and back-end ingestion responsibilities are handled by different sets of nodes) may transmit data records of one or more partitions of a stream to respective storage nodes 702 configured for those partitions. For example, data record 110A of partition S1-P1 is sent to storage node 702A, data record 110B of partition S2-P3 is sent to storage nodes 702B and 702C, data record 110C of partition S3-P7 is sent to storage node 702D, and data record 110D of partition S4-P5 is sent initially to storage node 702E. Storage control nodes 780 may be responsible for enforcing the persistence policies 750 that are applied to data records of the different streams, configuring and reconfiguring storage nodes as needed, monitoring storage node states, managing failovers, responding to storage configuration queries or storage policy queries, and various other administrative tasks in the depicted embodiment.

Persistence policies 750 may differ from one another in various ways in different embodiments. For example, a persistence policy P1 applied to stream Sj may differ from a policy P2 applied to stream Sk in (a) the number of replicas of each data record to be stored, (b) the type of storage device or system on which the replicas are to be stored (e.g., whether replicas are to be stored in volatile memory, non-volatile caches, rotating disk-based storage, solid-state drives (SSDs), storage appliances of various kinds, RAID (redundant arrays of inexpensive disks) of various kinds, in database management systems, at nodes of a storage service implemented by a provider network, and so forth), (c) the geographical distribution of the replicas (e.g., whether the stream data is to be made resilient to large-scale failures or certain types of disasters by placing replicas in different data centers), (d) the write acknowledgement protocol (e.g., if N replicas are to be stored, how many of the N copies have to be written successfully before an acknowledgement should be provided to the ingestion node), and/or (e) whether, in cases in which multiple replicas of data records are to be stored, the replicas should be created in parallel or sequentially. In some cases in which multiple replicas are to be stored, as in the case of data record 110D, a given storage node may transmit the data record to another storage node (e.g., storage node 702E sends data record 110D for further replication to storage node 702F, and storage node 702F sends it on to storage node 702G). In other cases in which a multiple-replica persistence policy is used, as in the case of data record 110B for which two in-memory replicas are to be stored, the ingestion node may initiate the multiple replications in parallel. In at least some embodiments, the client's chosen persistence policy may not specify the type of storage location to be used for stream data records; instead, the SMS may select the appropriate types of storage technology and/or locations based on various criteria, such as cost, performance, proximity to data sources, durability requirements, and so on. In one embodiment, either the client or the SMS may decide to use different storage technologies or storage location types for different partitions of a given stream, or for different streams.

In the example shown in FIG. 7, the persistence policy applied to stream S1 (or at least partition S1-P1 of stream S1) is a single-replica in-memory policy, while for stream S2 a two-parallel-replica in-memory policy is applied. Accordingly, an in-memory replica 704A of data record 110A is created at storage node 702A, while two in-memory replicas 705A and 705B corresponding to data record 110B are created in parallel at storage nodes 702B and 702C. For stream S3's data record 110C, a single on-disk replica 706A is created. For stream S4, a sequential three-replica-on-disk policy is applicable, and as a result respective on-disk replicas 707A, 707B and 707C are created sequentially at storage nodes 702E, 702F and 702G. Various other types of persistence policies may be applied to data streams in different embodiments. Nodes of the retrieval subsystem may obtain the data records from the appropriate storage nodes in response to invocations of various types of retrieval APIs by data consumers.

Retrieval Subsystem and Processing Stages

Figure 8:
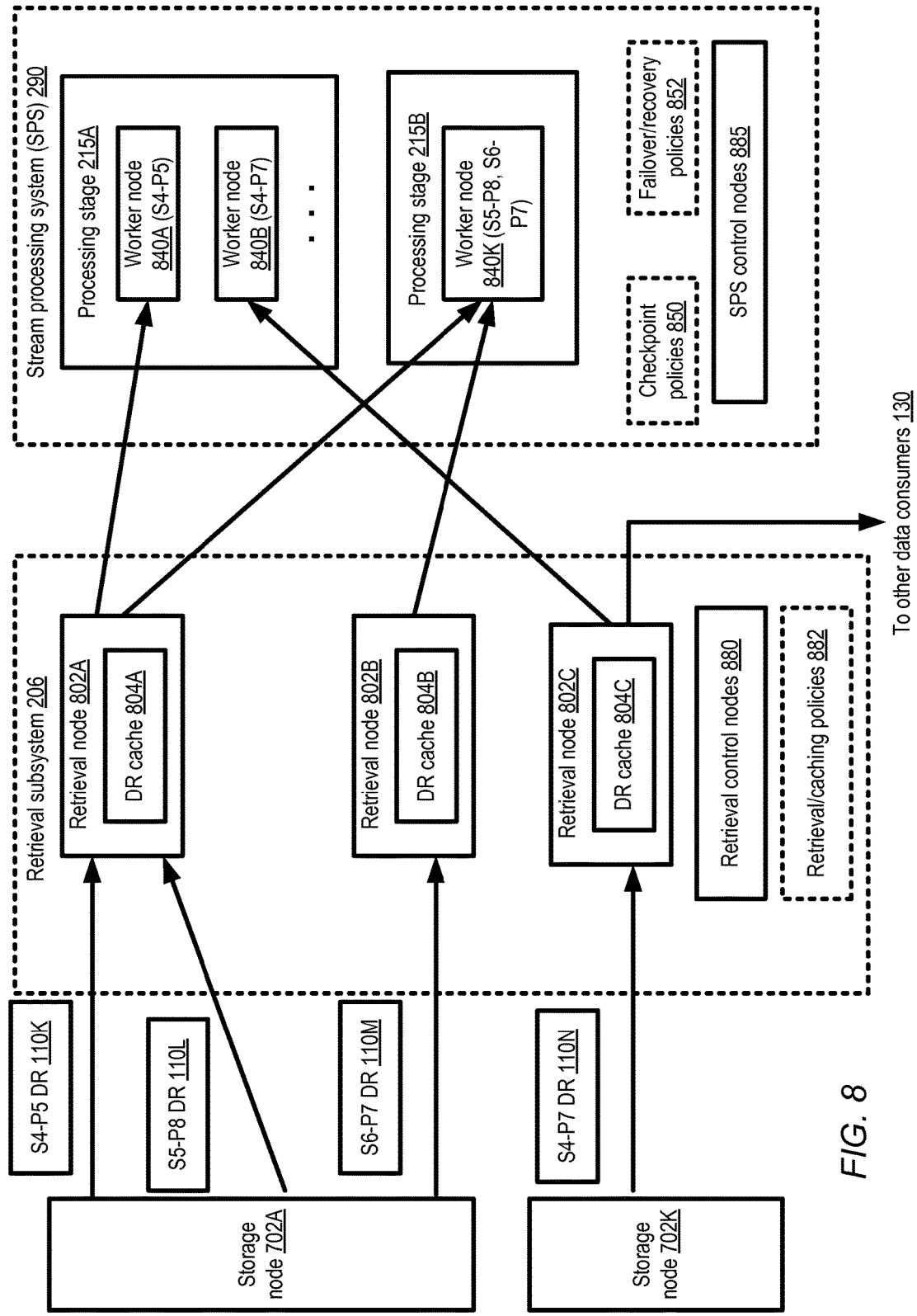
FIG. 8 illustrates example elements of a retrieval subsystem of an SMS and examples of interactions of the retrieval subsystem with an SPS, according to at least some embodiments.

FIG. 8 illustrates example elements of a retrieval subsystem of an SMS and examples of interactions of the retrieval subsystem with an SPS, according to at least some embodiments. As shown, retrieval subsystem 206 may comprise a plurality of retrieval nodes 802, such as retrieval node 802A, 802B and 802C, as well as a collection of retrieval control nodes 880. Each of the retrieval nodes 802 may be configured to respond to stream data retrieval requests from various clients or data consumers 130, such as worker nodes 840 of an SPS as described below. A variety of programmatic retrieval interfaces 802 may be implemented by the retrieval nodes in different embodiments, such as the non-sequential and sequential retrieval interfaces described earlier. In some embodiments, web services APIs such as HTTP GET requests may be used for data record retrieval, and the retrieval nodes 802 may accordingly be referred to as GET servers. A given retrieval node 802 may be configured, e.g., by a retrieval control node 880, to obtain data records of one or more stream partitions in the depicted embodiment from the appropriate set of storage subsystem nodes 702, such as storage nodes 702A and 702B.

In the depicted embodiment, a retrieval node 802 may interact with one or more storage nodes 702, and also respond to retrieval requests received from one or more SPS worker nodes 840. For example, data records of partitions S4-P5 (e.g., data record 110K) and S5-P8 (e.g., data record 110L) are read from storage node 702A by retrieval node 802A, and provided to worker nodes 840A and 840K respectively. Data records of partition S6-P7, such as 110M, are read by retrieval node 802B from storage node 702A and provided to worker node 840K. Data records of partition S4-P7 are read by retrieval node 802C from storage node 702B and provided to worker node 840B, and also to other data consumers 130 (e.g., data consumers that directly invoke SMS retrieval APIs instead of interacting with the SMS via an SPS).

In at least some embodiments, some or all of the retrieval nodes 802 may implement respective caches 804 (such as cache 804A at retrieval node 802A, cache 804B at retrieval node 802B, and cache 804C at retrieval node 802C) in which data records of various partitions may be retained temporarily in anticipation of future retrieval requests. Retrieval control nodes 880 may be responsible for implementing a number of retrieval policies 882, including for example caching policies (e.g., how large a cache should be configured for a given partition, how long data records should be cached), storage node selection policies (e.g., which particular storage node should be contacted first to obtain a given data record, in scenarios in which multiple replicas of data records are stored), and so on. In addition, retrieval control nodes may be responsible for instantiating and monitoring retrieval nodes 802, responding to queries regarding which retrieval nodes are responsible for which partitions, initiating or responding to re-partitioning operations, and so on.

In the illustrated example, SPS 290 comprises two processing stages, 215A and 215B. SPS control nodes 885 may be responsible for instantiating worker nodes 804 at the various processing stages 215, such as worker node 840A to process records of partition S4-P5, worker node 840B to process records of partition S4-P7, and worker node 840K to process records of partitions S5-P8 and S6-P7. The SPS control nodes 885 may implement programmatic interfaces (such as those illustrated in FIG. 3 and FIG. 4) enabling SPS clients to design processing workflows. Various checkpoint policies 850 may be implemented for different processing stages or workflows, indicating when or if worker nodes are to store progress records indicating how far along they are in processing their respective partitions, the types of storage devices to be used for the progress records, and so on. Failover/recovery policies 852 may indicate the triggering conditions or threshold that are to lead to replacing a worker node with a different node, and whether best-effort recovery is to be used or checkpoint-based recovery is to be used for a given processing stage. In at least some embodiments, the SPS control nodes 885 may interact with various types of SMS control nodes, e.g., to identify the retrieval nodes from which data records of a given stream are to be obtained, to establish new ephemeral or persistent streams that may be required for a particular processing workflow, and so on. In at least one embodiment, clients may interact with the SPS control nodes to instantiate streams—e.g., instead of utilizing SMS control interfaces, some clients may wish to invoke only higher-level SPS interfaces. It is noted that although separate sets of control nodes are shown in FIGS. 6, 7 and 8 for the SMS ingestion, storage, and retrieval subsystems, and for the SPS stages, in at least some embodiments a given control node may be used for several of the subsystems and/or the SPS.

Node Redundancy Groups

In at least some embodiments, redundant groups of nodes may be configured for one or more subsystems of an SMS. That is, instead of for example configuring one retrieval node for retrieving data records for a stream partition Sj-Pk, two or more nodes may be established for such retrievals, with one node being granted a "primary" or active role at a given point in time, while the other node or nodes are designated as "non-primary" nodes. The current primary node may be responsible for responding to work requests, e.g., requests received either from clients or from nodes of other subsystems. The non-primary node or nodes may remain dormant until a failover is triggered, e.g., due to a failure, loss of connectivity to the primary, or other triggering conditions, at which point a selected non-primary may be notified by a control node to take over the responsibilities of the previous primary. The primary role may thus be revoked from the current incumbent primary node during failover, and granted to a current non-primary node. In some embodiments, non-primary nodes may themselves take over as primary when a determination is made that a failover is to occur, e.g., explicit notifications may not be required. Such redundant groups of nodes may be set up for ingestion, storage, retrieval and/or control functions at an SMS in various embodiments, and a similar approach may also be taken for worker nodes at an SPS in at least some embodiments. Such groups comprising at least one primary node and at least one non-primary node for a given function may be referred to as "redundancy groups" or "replication groups" in some embodiments. It is noted that redundancy groups of storage nodes may be implemented independently of the number of physical copies of the data records that are stored—e.g., the number of replicas to be stored of a data record may be determined by a persistence policy, while the number of storage nodes that are configured for the corresponding partition may be determined based on redundancy group policies.

Figure 9:
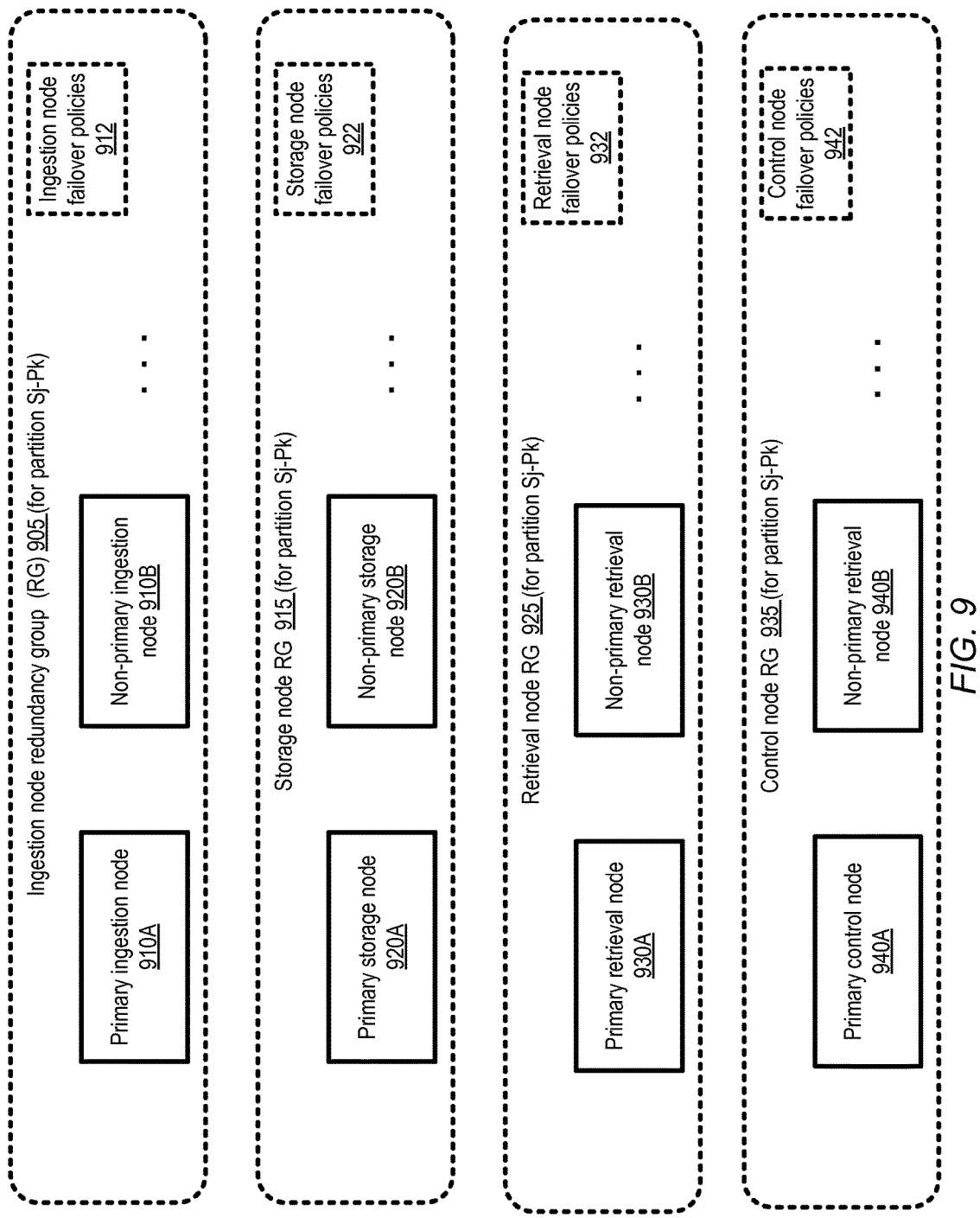
FIG. 9 illustrates examples of redundancy groups that may be set up for nodes of an SMS or an SPS, according to at least some embodiments.
Figure 10:
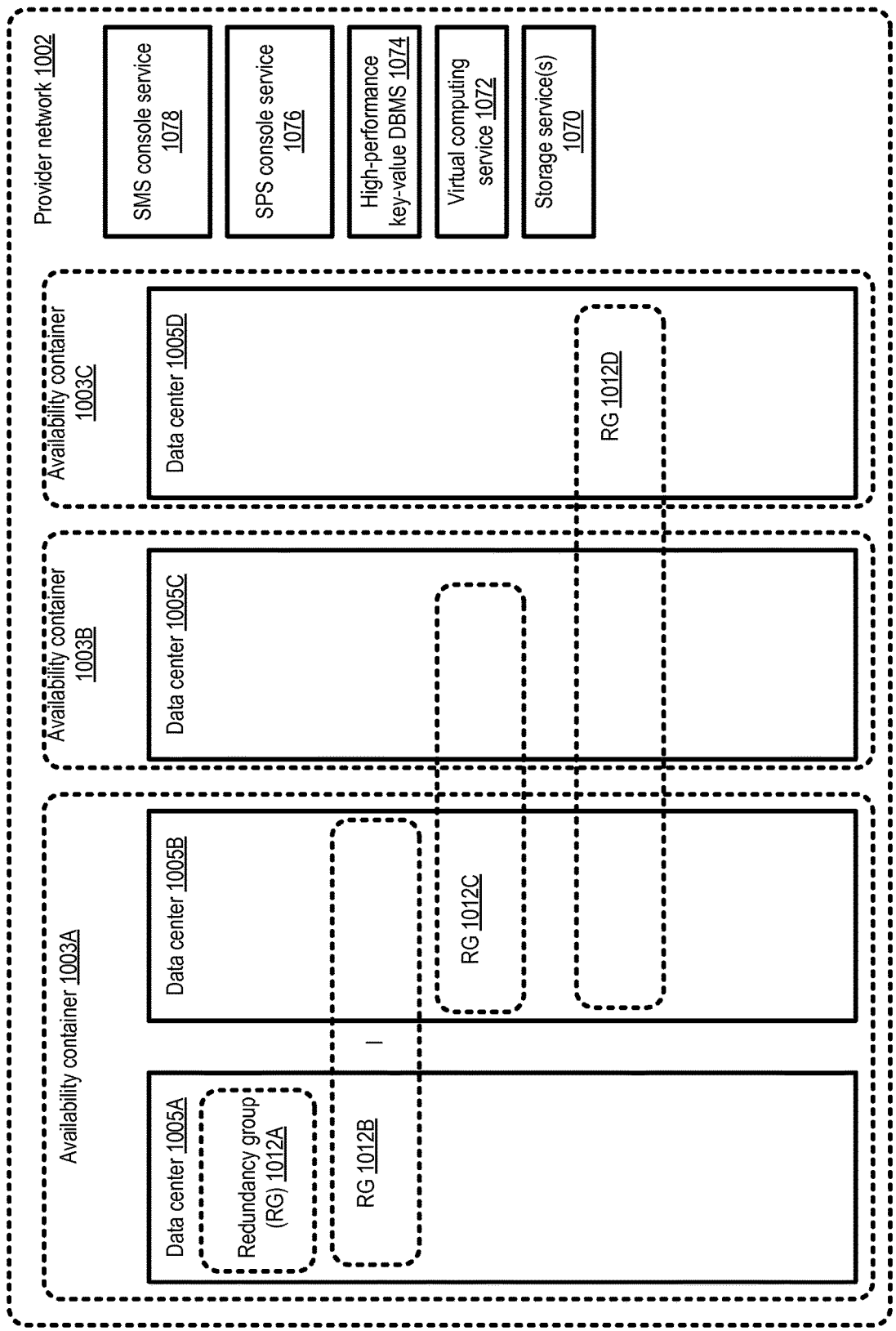
FIG. 10 illustrates a provider network environment in which the nodes of a given redundancy group may be distributed among a plurality of data centers, according to at least some embodiments.

FIG. 9 illustrates examples of redundancy groups that may be set up for nodes of an SMS or an SPS, according to at least some embodiments. In the depicted embodiment, for a given stream partition Sj-Pk, respective redundancy groups (RGs) 905, 915, 925 and 935 are set up for ingestion nodes, storage nodes, retrieval nodes, and control nodes. A common RG 935 for control nodes is implemented in the illustrated embodiment, although separate RGs for ingestion control nodes, storage control nodes, or retrieval control nodes may be implemented in some embodiments. Each RG comprises a primary node (e.g., primary ingestion node 910A, primary storage node 920A, primary retrieval node 930A, and primary control node 940A) and at least one non-primary node (e.g., non-primary ingestion node 910B, non-primary storage node 920B, non-primary retrieval node 920C, and non-primary retrieval node 920D). The primary role may be revoked and granted to a current non-primary in accordance with respective failover policies 912 (for ingestion nodes), 922 (for storage nodes), 932 (for retrieval nodes) and 942 (for control nodes). The failover policies may, for example, govern the triggering conditions that are to lead to a change in primary status, whether and how the health status of the primaries or non-primaries is to be monitored, the number of non-primaries that are to be configured in a given redundancy group, and so on. In at least some embodiments, a single RG may be established for multiple partitions—e.g., RG 905 may be responsible for handling ingestion of records of partition Sj-Pk as well as Sp-Pq. In some implementations, a node that is designated as primary for one partition may concurrently be designated as a non-primary for another partition. In one embodiment, multiple nodes may be designated concurrently as primary nodes within a given RG—e.g., the ingestion-related workload of a given partition may be distributed among two primary nodes, with one node designated as a non-primary in case of a failure at either primary. The number of nodes instantiated in a given RG may depend on the availability or resiliency level desired for the corresponding functions (e.g., on how many concurrent or overlapping failures the group is intended to be able to withstand). In some embodiments, in addition to or instead of being used for SMS nodes, redundancy groups may be set up for worker nodes of SPS processing stages. The members of a given RG may sometimes be distributed geographically, e.g., across several data centers, as illustrated in FIG. 10. Selected control nodes may be configured to detect failover-triggering conditions in some embodiments, e.g., using heartbeat mechanisms or other health monitoring techniques, and such control nodes may orchestrate the failover by selecting the appropriate non-primary node as the replacement for a failed primary, notifying/activating the selected replacement node, and so on.

In some embodiments a provider network may be organized into a plurality of geographical regions, and each region may include one or more availability containers, which may also be termed "availability zones" herein. An availability container in turn may comprise one or more distinct locations or data centers, engineered in such a way (e.g., with independent infrastructure components such as power-related equipment, cooling equipment, physical security components) that the resources in a given availability container are insulated from failures in other availability containers. A failure in one availability container may not be expected to result in a failure in any other availability container; thus, the availability profile of a resource instance or control server is intended to be independent of the availability profile of resource instances or control servers in a different availability container. Various types of applications may be protected from failures at a single location by launching multiple application instances in respective availability containers, or (in the case of some SMSs and SPSs) distributing the nodes of a given redundancy group across multiple availability containers. At the same time, in some implementations, inexpensive and low latency network connectivity may be provided between resources (such as the hosts or compute instances used for SMS and SPS nodes) that reside within the same geographical region, and network transmissions between resources of the same availability container may be even faster. Some clients may wish to specify the locations at which their stream management or stream processing resources are reserved and/or instantiated, e.g., at either the region level, the availability container level, or a data center level, to maintain a desired degree of control of exactly where various components of their applications are run. Other clients may be less interested in the exact location where their resources are reserved or instantiated, as long as the resources meet the client requirements, e.g., for performance, high availability, and so on. Control nodes located in one availability container (or data center)

may be able to remotely configure other SMS or SPS nodes in other availability containers (or other data centers) in some embodiments—that is, a particular availability container or data center may not need to have local control nodes to manage the SMS/SPS nodes.

FIG. 10 illustrates a provider network environment in which the nodes of a given redundancy group may be distributed among a plurality of data centers, according to at least some embodiments. Provider network 1002 comprises three availability containers 1003A, 1003B and 1003C in the depicted embodiment. Each availability container includes portions or all of one or more data centers—e.g., availability container 1003A comprises data centers 1005A and 1005B, availability container 1003B includes data center 1005C, and availability container 1003C includes data center 1005D. A number of different redundancy groups 1012 of SMS and/or SPS nodes are shown. Some RGs 1012 may be implemented entirely within a single data center, as in the case of RG 1012A located within data center 1005A. Other RGs may use resources of multiple data centers within a given availability container, such as RG 1012B, which spans data centers 1005A and 1005B of availability container 1003A. Yet other RGs may be implemented using resources spread across different availability containers. For example, RG 1012C uses resources located in data centers 1005B and 1005C of availability containers 1003A and 1003B respectively, and RG 1012D utilizes resources at data centers 1005B, 1005C and 1005D in availability containers 1003A, 1003B and 1003C respectively. In one example deployment, if RG 1012 comprises one primary and two non-primary nodes, each of the three nodes may be located in a different availability container, thus ensuring that at least one node is highly likely to remain functional even if large-scale failure events occur at two different availability containers concurrently.

Console services 1078 and 1076, associated with the SMS and SPS respectively, may provide easy-to-use web-based interfaces for configuring stream-related settings in provider network 1002 in the depicted embodiment. A number of additional services, at least some of which may be used by the SMS and/or the SPS, may be implemented in provider network 1002 using resources spread over one or more data centers or across one or more availability containers. For example, a virtual computing service 1072 may be implemented, enabling clients to utilize selected amounts of computing power packaged as compute instances of various different capability levels, and such compute instances may be used to implement SMS and/or SPS nodes. One or more storage services 1070 may be implemented, enabling clients to store and access data objects with desired data durability levels, e.g., either via a block-device volume interface or via a web-services interface. The storage objects may be attachable to, or accessible from, the compute instances of service 1072, and may be used to implement various stream persistence policies at SMS storage subsystems in some embodiments. In one embodiment, one or more database services such as a high-performance key-value database management service 1074 or a relational database service may be implemented at the provider network 1002, and such a database service may be used for storing stream data records by SMNS storage subsystems, and/or for storing metadata of control subsystems, ingestion subsystems, storage subsystems, retrieval subsystems, or processing stages.

Stream Security Options

Figure 11:
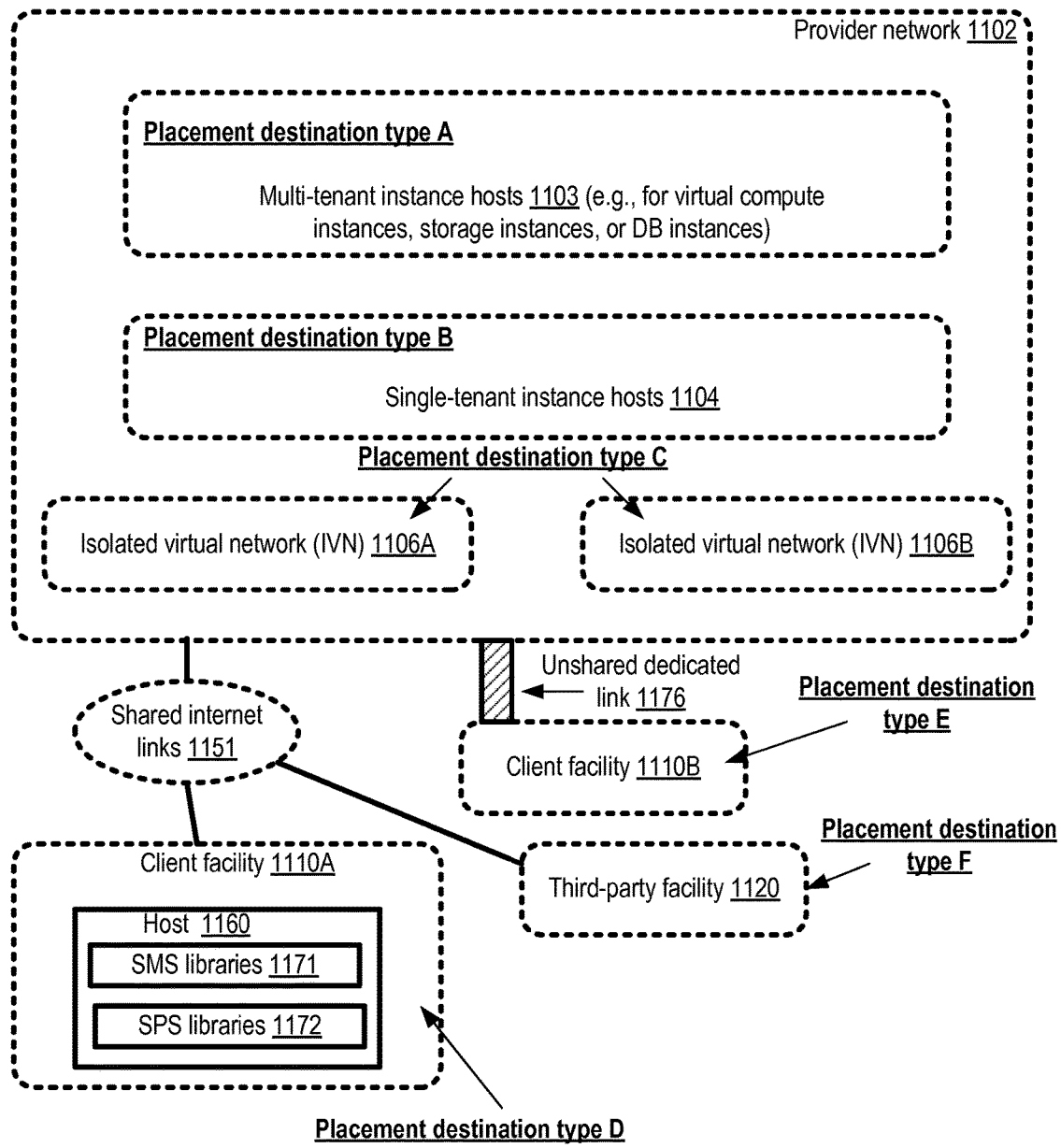
FIG. 11 illustrates a plurality of placement destinations that may be selected for nodes of an SMS or an SPS, according to at least some embodiments.

In at least some embodiments, the users of the SMS and/or the SPS may be provided a number of security-related options for data streams, enabling clients to select the security profiles of resources (e.g., virtual or physical machines) to be used for the various functional categories such as ingestion, storage, retrieval, processing and/or control. Such options may include, for example, choices regarding the types of physical locations of the resources used for various nodes (e.g., whether provider network facilities are to be used, or client-owned facilities are to be used, which may have different security characteristics than provider network facilities), choices regarding encryption of stream data, and/or network isolation choices in various parts of the stream-handling infrastructure. Some clients may be concerned about the possibility of intruders or attackers obtaining access to valuable proprietary business logic or algorithms, for example, and may wish to implement stream processing worker nodes using computing devices within client-owned promises. The types of resources to be used for implementing a set of SMS and/or SPS nodes may be referred to herein as the "placement destination types" for those nodes. FIG. 11 illustrates a plurality of placement destination types that may be selected for nodes of an SMS or an SPS, according to at least some embodiments.

Placement destinations may be selected within provider network 1102 for some types of SMS/SPS functional categories (e.g., ingestion, storage, retrieval, control or processing), and outside provider network 1102 for other types of SMS/SPS functional categories in the depicted embodiment. Within provider network 1102, some resources such as compute instances, storage instances, or database instances may be implemented using multi-tenant instance hosts 1103. Such multi-tenant instance hosts, at each of which SMS or SPS nodes for one or more clients may be instantiated, may form a first category "A" of placement destination types. To avoid having to share physical resources with other clients, some clients may request that their SMS/SPS nodes be implemented using instance hosts restricted to a single client. Such single-tenant instance hosts may form placement category type "B". Single-tenant instance hosts may be preferable from the perspective of some clients for several reasons. As multi-tenant instance hosts may include compute instances belonging to other clients, there may be a higher probability of security attacks from another client's instances in multi-tenant instance hosts than in single-tenant instance hosts. In addition, the "noisy-neighbor" phenomenon, in which one client's compute instance CI1 running on multi-tenant host experiences a surge in workload and starts consuming a large proportion of the host's compute cycles or other resources, thus potentially impacting the performance of another client's applications running on a different compute instance CI2, may also be avoided when single-tenant instance hosts are used.

Isolated virtual networks (IVNs) 1106, such as IVN 1106A and 1106B may represent another category "C" of placement destination types in the depicted embodiment. An IVN 1106 may be created at the request of a provider network client in some embodiments as the logical equivalent of a private network, built using provider network resources but with network configuration being controlled largely by the client. For example, the client may decide the IP addresses to be used within an IVN 1106, without having to be concerned about the possibility of duplicating IP addresses that may already be in used outside the IVN. Implementing various types of SMS and SPS nodes in one or more IVNs may add an extra level of network security to the management and/or processing of a client's stream data in the depicted embodiment. In some cases, a given client may wish to place one functional category of SMS/SPS nodes in one IVN 1106, and a different functional category in a different IVN. A given IVN 1106 may comprise either single-tenant instance hosts, multi-tenant instance hosts, or both types of instance hosts in various embodiments. In some embodiments, another set of placement destination type choices (or security profile choices) using resources of the provider network, not shown in FIG. 11, may be available to at least some clients. In embodiments in which clients can acquire and use compute instances from a provider network's virtualized computing service for stream-related operations, the compute instances may be used in one of two modes. In one mode, a client may provide, to an SPS or an SMS, the executable program or programs to be run at compute instances configured as SPS worker nodes (or at ingestion, storage or retrieval nodes), and let the SMS or SPS run the programs and manage the nodes. This first mode may be referred to as a "stream service managed" mode of using compute instances for stream operations. In the other mode, a client may wish to run the executable programs and manage the compute instances, with less support from the SPS or SMS. This second mode may be referred to as a "client-managed" mode of using compute instances for stream operations. These two modes of operation may thus represent additional choices with respect to client-selectable placement destination types or security profiles. A client may opt for the client-managed mode if, for example, the executable program is likely to require debugging (including single-stepping) that can best be performed by subject-matter experts from the client's organization, while the stream-service-managed mode may be a reasonable choice for more mature code that is not likely to require debugging. In some embodiments, different pricing policies may apply to these two modes.

Figure 12A:
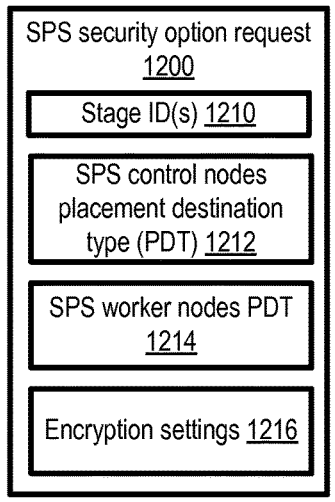
FIGS. 12a and 12b illustrate examples of security option requests that may be submitted by SPS clients and SMS clients, respectively, according to at least some embodiments.
Figure 12B:
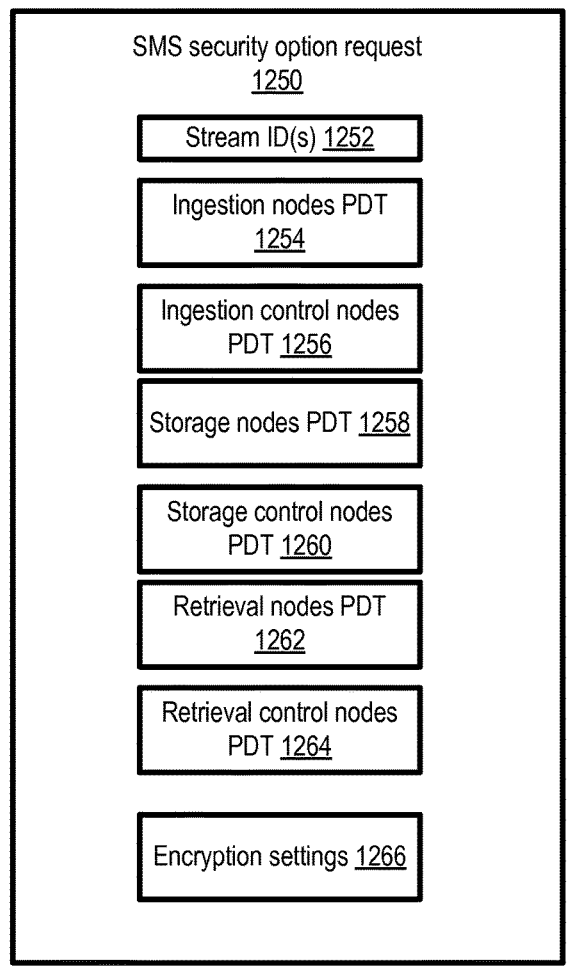

A number of placement options may be supported at facilities external to the provider network in the embodiment shown in FIG. 11. For example, hosts 1160 on which SMS libraries 1171 and/or SPS libraries 1172 are installed may be used for stream management or processing from within client facilities (e.g., client-owned data centers or premises) 1110A or 1110B, with the two types of client facilities differing in their manner of connectivity to the provider network. Client facility 1110A is linked to provider network 1102 via at least some shared Internet links 1151 (i.e., the network traffic of other entities may also flow over some of the links between client facility 1110A and the provider network 1102). In contrast, some client facilities (such as 1110B) may be linked to the provider network via special unshared dedicated physical links 1106 (which may sometimes be referred to as "direct connect" links) These two different types of client premises comprise placement destination options "D" and "E" respectively in the terminology used in FIG. 11. In some embodiments, portions of the SMS and/or SPS may also be implementable at third-party facilities (e.g., data centers used but not owned or managed by clients of the SMS/SPS), and such third-party premises may be designated as placement destination type "F". In at least some of the client and/or third-party premises, the SMS and/or SPS libraries may have to be obtained from the provider network and installed on the hosts to be used for the SMS/SPS nodes. In at least one embodiment, nodes of all the different functional categories may be implemented externally to the provider network with the help of the appropriate libraries. The different placement destination types may differ from one another in various security-related aspects in different embodiments, such as the network isolation features implemented, intrusion detection functionality supported, physical security policies implemented, supported encryption levels, and so on. Accordingly, each of the various destination types may be considered to have a respective security profile, which may differ from the security profile of the other placement destinations in one or more ways. In some embodiments, clients of the SMS and/or SPS may select respective placement destination types for different subsystems or node sets programmatically, e.g., by sending a request to one or more control nodes of the SMS or SPS, as illustrated in FIGS. 12a and 12b. It is noted that in some embodiments and for certain types of stream applications, clients may wish to control placement destination types not just for security reasons, but also for performance and/or functionality reasons. For example, the noisy-neighbor phenomenon described above may be avoided by using dedicated client-premise resources or single-tenant instance hosts. In some embodiments, clients may have special-purpose or proprietary hardware and/or software that they wish to use for SPS stages or SMS nodes, where the functional capabilities or performance levels achievable using such components cannot easily be replicated at a provider network, or are simply not supported at the provider network. A client may have access at an external data center to a computer server with supercomputer-level processing capabilities, for example, which may be able to perform SPS processing at a much higher rate than would be possible using provider network resources alone. Enabling a client to select the placement destinations for various nodes may allow such special-purpose devices or software to be used.

FIGS. 12a and 12b illustrate examples of security option requests that may be submitted by SPS clients and SMS clients, respectively, according to at least some embodiments. FIG. 12a illustrates an SPS security option request 1200 in which a client indicates, for one or more processing stages with identifiers 1210, the placement destinations types (PDTs) requested for control nodes of the stage (element 1212), and the PDTs requested for worker nodes (element 1214). In at least one embodiment, clients may also be able to submit requests to configure encryption settings for their stream data records or stream processing results, e.g., by requesting that data records be encrypted using a specified algorithm or protocol prior to their transmission over various network links, or that various control or administrative interactions be encrypted. For example, in FIG. 12a, the encryption settings for the stage may indicate encryption techniques to be applied to the results of the stages processing operations, and/or the encryption used for the communications between the control nodes of the stage and the worker nodes of the stage.

Similarly, in FIG. 12b, a client's SMS security option request 1250 comprises a number of elements that indicate the client's security preferences for one or more streams with specified identifiers 1252. Placement destination type preferences for ingestion nodes, storage nodes, and retrieval nodes may be indicated in elements 1254, 1258 and 1262 respectively. PDT preferences for ingestion control nodes, storage control nodes and retrieval control nodes may be indicated by elements 1256, 1260 and 1264 respectively. Encryption preferences for data records, e.g. whether and/or how encryption is to be implemented for the data records as they are transmitted from one category of node to another, may be indicated via element 1266. Using security option requests such as those shown in FIGS. 12a and 12b, clients may be able to choose the locations (e.g., within the provider network or external to the provider network) and various other security profile components for different parts of their stream management and processing environment.

It is noted that the choice of node placement destinations may be offered for other reasons than security in at least some embodiments. For example, a client may wish to have some types of SMS or SPS nodes implemented at single-tenant hosts for performance reasons (e.g., to avoid the "noisy-neighbor" problems indicated earlier rather than primarily for security reasons. Placement choices may be changed in at least some embodiments during the lifetime of a stream—e.g., a client may initially allow SMS nodes to be instantiated at multi-tenant instance hosts, but may wish to move at least some subset of the nodes to single-tenant instance hosts later. Different pricing policies may be applied to the different security-related options in at least some embodiments—e.g., it may cost more to implement SMS nodes of a particular functional category at a IVN than at multi-tenant instance hosts outside IVNs, or it may cost more to implement SMS nodes at single-tenant instance hosts than at multi-tenant instance hosts.

Sequential Storage and Retrieval of Stream Records

Figure 13A:
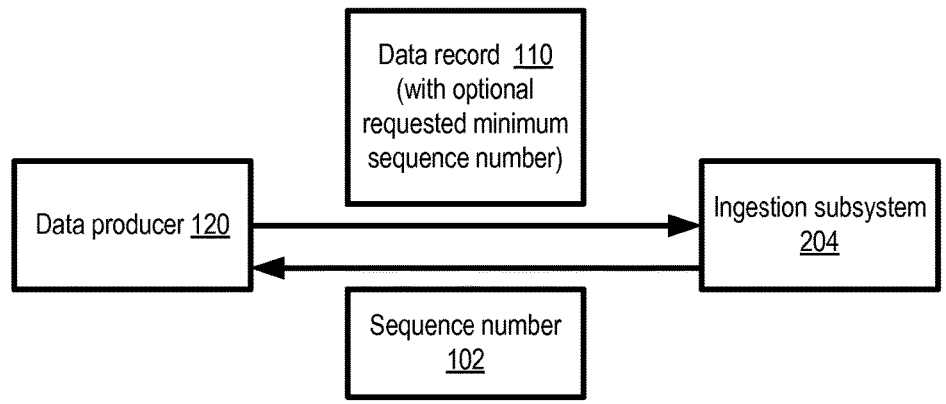
FIG. 13a illustrates example interactions between a stream data producer and an ingestion node of an SMS, according to at least some embodiments.

For many types of stream applications, data records may be received at the SMS at very high rates from a plurality of data producers 120, and data consumers may typically wish to access stored data records in the order in which the records were generated. Especially in environments in which rotating magnetic disks are used as the storage devices for stream data records, as mentioned earlier, sequential I/O access patterns (for both reads and writes) may have significant performance advantages over random I/O access patterns. In several embodiments, stream-specific or partition-specific sequence numbers may be assigned to data records as they are received by the SMS, and sequential retrieval operations based on sequence numbers may be supported. FIG. 13a illustrates example interactions between a stream data producer and an ingestion subsystem of an SMS, according to at least some embodiments. The stream data producer may submit a data record 110 to an ingestion subsystem, and in the depicted embodiment, the ingestion subsystem may respond with a sequence number 102 that has been chosen for the submitted record. In at least some embodiments, an ingestion node may obtain a portion of the sequence number from the storage subsystem—e.g., the sequence number 102 may be determined subsequent to the storage of the received data record in accordance with the applicable persistence policy in such embodiments, and the storage subsystem may generate a numerical sequence indicator of its own for the data record and provide that indicator for inclusion in the larger sequence number assigned to the data record by the ingestion node.

Sequence numbers may be implemented in various embodiments to provide a stable, consistent ordering of data records, and to enable repeatable iteration over records by data consumers. Sequence numbers assigned to the data records of a particular partition may increase monotonically over time, although they need not be consecutive in at least some implementations. In various embodiments, sequence numbers may be assigned with at least some subset of the following semantics: (a) sequence numbers are unique within a stream, i.e., no two data records of a given stream may be assigned the same sequence number; (b) sequence numbers may serve as indexes into the stream's data records, and may be used to iterate over data records within a given stream partition; (c) for any given data producer, the order in which the data producer successfully submitted data records is reflected in the sequence numbers assigned to the data records; and (d) sequence numbering for data records with a given partition key value retain the monotonically increasing semantics across dynamic repartitioning operations—e.g., the sequence numbers assigned to data records with a partition key value K1 after a repartitioning may each be larger than any of the sequence numbers that were assigned to data records with that partition key value K1 prior to the dynamic repartitioning. (Dynamic repartitioning is described in further detail below with respect to FIG. 16.)

In some embodiments, a data producer may wish to influence the selection of the sequence number 102 selected for at least some data records. For example, a data producer 120 may wish to demarcate boundaries or separators within the assigned sequence numbers of a stream, so that it becomes easier for data consumers of that stream to submit read requests targeted at particular subsets of the stream. In some implementations, the data producer 120 may submit an indication of a minimum sequence number together with a record, and the SMS may select a sequence number in accordance with the requested minimum that also conforms to the sequence number semantics discussed above.

Figure 13B:
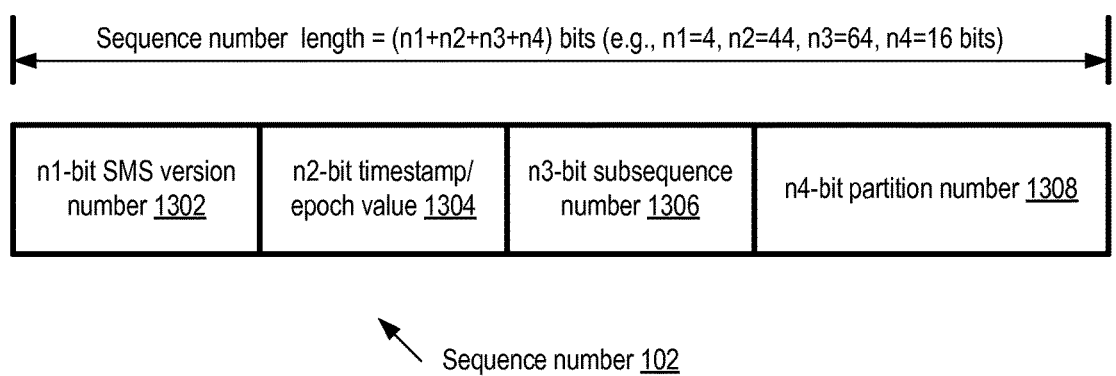
FIG. 13b illustrates example elements of a sequence number that may be generated for an ingested data record at an SMS, according to at least some embodiments.

FIG. 13b illustrates example elements of a sequence number that may be generated for an ingested data record at an SMS, according to at least some embodiments. The sequence number may comprise four elements in the depicted embodiment: an n1-bit SMS version number 1302, an n2-bit timestamp or epoch value 1304, an n3-bit subsequence number 1306, and an n4-bit partition number 1308. In some implementations, 128 bit sequence numbers may be used, e.g., n1, n2, n3 and n4 may be 4, 44, 64 and 16 bits respectively. The version number 1302 may be used simply to avoid confusion across SMS software version rollouts, e.g., so that it is easy to tell which version of the SMS software was used to generate the sequence number. Version number 1302 may not be expected to change frequently in at least some implementations. The timestamp value 1304 may be obtained, for example, from a local clock source or a globally accessible clock source (e.g., a state management system of a provider network that implements a getCurrentEpoch or getCurrentTime API) by an ingestion subsystem node. In at least some implementations, an offset from a well-known point in time (e.g., the number of seconds that have elapsed since 00:00:00 AM UTC on Jan. 1, 1970, which can be obtained by invoking various time-related system calls in Unix™-based operating systems) may be used for the timestamp value 1304. In some embodiments, the subsequence number 1036 may be generated by the storage subsystem and may indicate the order in which data records of a particular partition are written to a storage device. Thus, in an implementation in which numerous data records are received within a given second and the timestamp values 1304 only change at approximately one-second intervals, the subsequence numbers 1306 may serve as indicators of the record arrival (or storage) order for data records that happen to have arrived within the same second and therefore are assigned the same timestamp value. The partition number 1308 may uniquely identify a partition within a given stream in some embodiments. In at least some implementations in which the sequence number timestamps indicate (at least approximately) the clock times at which the corresponding data records were ingested, the sequence numbers may be used for an indexing mechanism for certain types of time-based retrieval requests. For example, a client may wish to retrieve stream records generated or ingested on a particular day or during a specified time range, and the sequence numbers may be used as keys of an implicit secondary index to retrieve the appropriate set of data records. Thus, in at least some embodiments, the use of sequence numbers that contain timestamps for ordered storage and retrieval may have an additional benefit of providing a temporal index into the set of stored data records.

Figure 14:
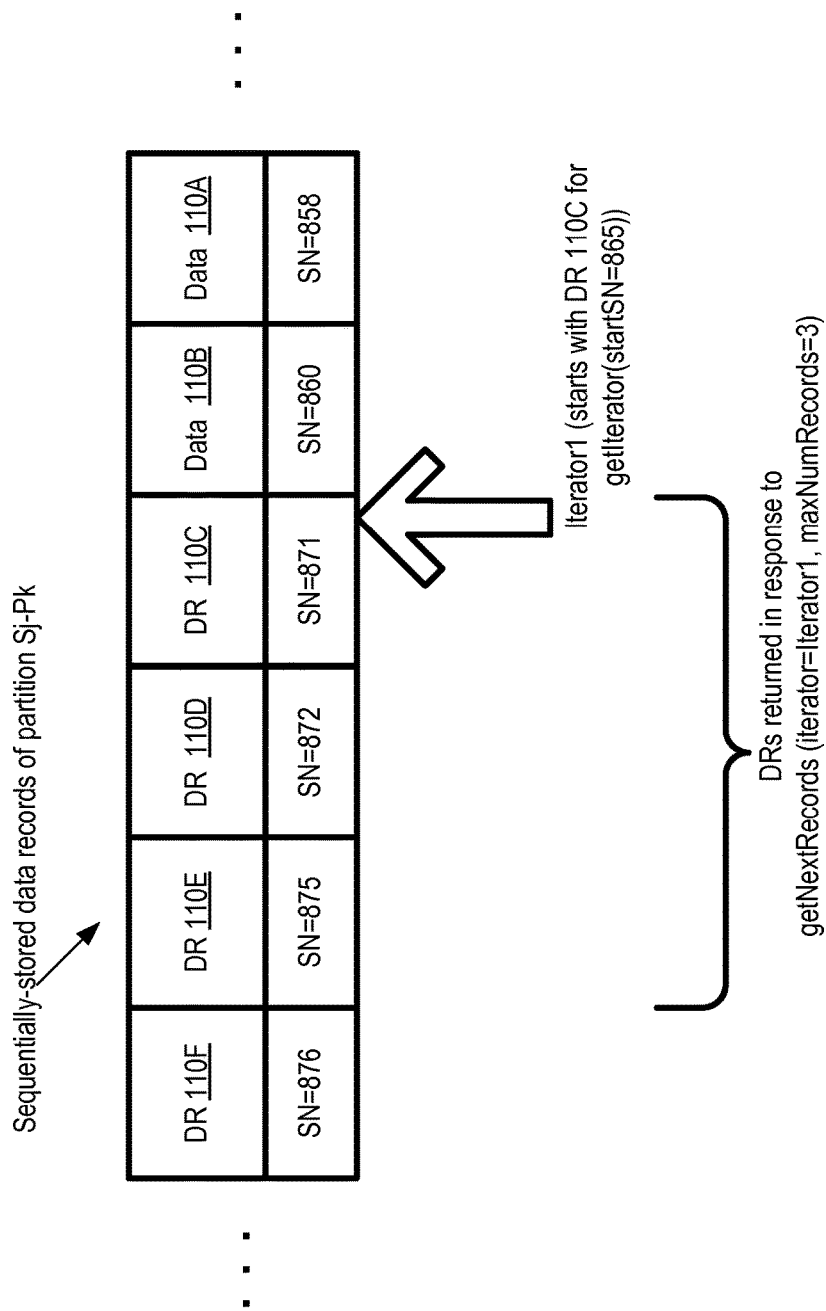
FIG. 14 illustrates examples of ordered storage and retrieval of stream data records at an SMS, according to at least some embodiments.

Data records of a given partition may typically be written (e.g., to disk) in sequence number order, often using large sequential write operations. In some embodiments, as indicated earlier, iterator-based programmatic interfaces may be implemented to allow data consumers to read data records in sequence number order. FIG. 14 illustrates examples of ordered storage and retrieval of stream data records at an SMS, according to at least some embodiments. Six data records 110A-110F of a partition Sj-Pk (the kth partition of a stream Sj) are shown stored in sequence number order. As illustrated, the sequence numbers may not be consecutive in at least some embodiments, e.g., because the manner in which the values are assigned to the timestamp portions 1304 or the subsequence numbers 1306 discussed above may not always result in consecutive values for those elements.

In the example shown in FIG. 14, a data consumer has requested an iterator to be created, specifying a starting sequence number "865". In response to the request, the SMS has initialized Iterator1, positioned at the data record with the nearest sequence number that is higher than or equal to the requested starting sequence number. In this case, data record 110C with sequence number 870 has been selected as the iterator's starting position, as the next lower sequence (860, assigned to data record 110B) is smaller than the starting sequence number in the consumer's request. The getIterator interface may be considered the logical equivalent of a request to set a cursor at a requested position within the partition, and the getNextRecords interface may be used to then read data records starting from the cursor position, e.g., to move the cursor along the stream in sequence number order. In the illustrated example, a data consumer has invoked the getNextRecords interface with parameter "iterator" set to Iterator1 and "maxNumRecords" (the maximum number of data records to return) set to 3. Accordingly, the SMS retrieval subsystem returns the data records 110C, 110D and 110E in that order to the data consumer. The iterator Iterator1 may be moved to a new position, e.g., to data record 110F, after the getNextRecords call completes, and subsequent getNextRecord invocations for the same iterator may return data records starting with 110F. The semantics of the getIterator call may differ in some embodiments—e.g., instead of positioning the iterator at the data record with the nearest sequence number higher than or equal to the specified sequenced number, the iterator may be positioned at the nearest data record with highest sequence number equal to or lower than the requested sequence number in some embodiments. In another embodiment, clients may have to specify an existing sequence number in the getIterator call—e.g., an error may be returned if a record with the requested sequence number doesn't exist in the stream.

Partition Mappings

Figure 15:
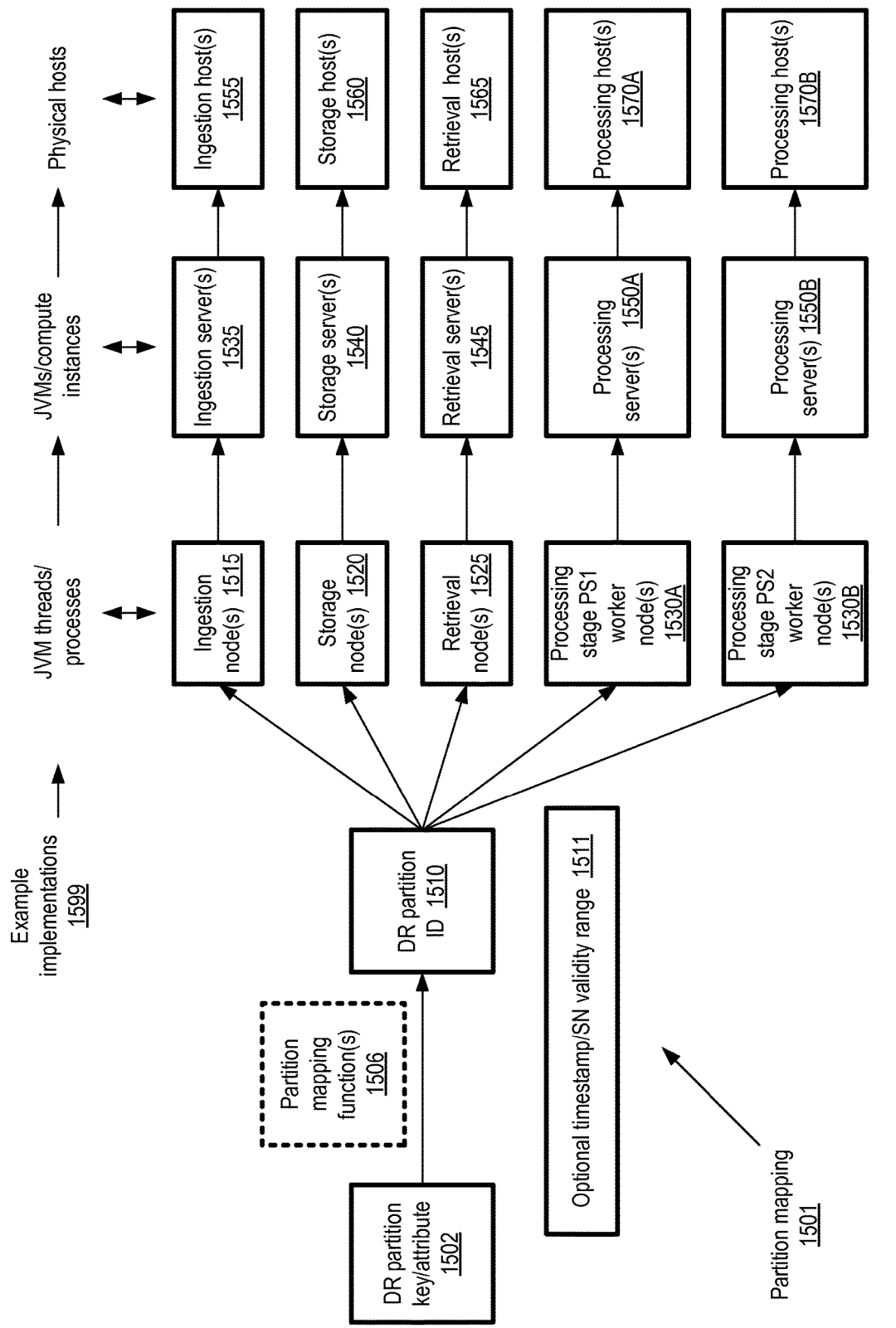
FIG. 15 illustrates an example of a stream partition mapping and corresponding configuration decisions that may be made for SMS and SPS nodes, according to at least some embodiments.

As described earlier, the workload related to ingestion, storage, retrieval and processing of the records of a given stream may be subdivided and distributed among several nodes in various embodiments in accordance with various partitioning and repartitioning policies. FIG. 15 illustrates an example of a stream partition mapping 1501 and corresponding configuration decisions that may be made for SMS and SPS nodes, according to at least some embodiments. When a particular data stream is created or initialized, e.g., in response to a client's invocation of a createStream API, a partitioning policy may be activated for the stream, which may be used to determine the partition of which any given data record of the stream is to be considered a member. The particular nodes of the ingestion subsystem 204, the storage subsystem 206, the retrieval subsystem 208 and any relevant SPS stages 215 that are to perform operations for a given data record may be selected on the basis of the record's partition. In one embodiment, at least a subset of the control nodes used for a given data record may be selected based on the partition as well. In at least some embodiments, dynamic repartitioning of a data stream may be supported as part of the partitioning policy, e.g., in response to triggering conditions indicated in the policy or in response to explicit requests.

In various embodiments, the partition selected for a given data record may be dependent on a partitioning key for the record, whose value may be supplied by the data producer either directly (e.g., as a parameter of a write or put request), or indirectly (e.g., the SMS may use metadata such as the identifier or name of the data producer client, an IP address of the data producer, or portions of the actual contents of the data record as a partition key). One or more mapping functions 1506 may be applied to the data record partition key or attribute 1502 to determine the data record partition identifier 1510 in the embodiment shown in FIG. 15. In one implementation, for example, a given partition identifier 1510 may represent a contiguous range over the space of 128-bit integer values, such that the union of the ranges for all the partitions of the stream may cover all possible values a 128-bit integer can assume. In such an example scenario, one simple mapping function 1506 may generate a 128-bit hash value from the partition key value(s) or selected attribute value(s) of the data record, and the partition identifier may be determined based on the particular contiguous range within which the hash value happens to lie. In some implementations, the contiguous ranges may at least initially be equal in size; in other implementations, different partitions may correspond to contiguous ranges that may differ in size from one another. Repartitioning may also result in adjustments to the range boundaries in one implementation. Other partitioning functions 106 may be used in different implementations.

If the data stream undergoes dynamic repartitioning (as discussed below in further detail), the partition to which records with a particular key are mapped may change. Thus, in at least some embodiments, SMS and/or SPS control nodes may have to keep track of several different mappings that apply to a stream during the lifetime of the stream. In some embodiments, metadata such as a timestamp validity range 1511 or a sequence number validity range may be stored by the control nodes for each partition mapping. The timestamp validity range 1511 may, for example, indicate that a particular mapping M1 applies from the stream's creation time until time T1, that a different mapping M2 applies from T1 to T2, and so on. When responding to read requests directed at a stream, the retrieval nodes may have to first determine which mapping is to be used (depending for example on the sequence number indicated in a read request), and then use that mapping to identify the appropriate storage nodes.

The SMS and SPS control nodes may be responsible for mapping partitions to resources at several different granularities in at least some embodiments. For example, as shown in example implementations 1599 of FIG. 15, in one implementation, each ingestion, storage, retrieval or processing (worker) node may be implemented as a respective process or a respective thread of execution within a server virtual machine such as a Java™ Virtual Machine (JVM) or a compute instance, and each JVM or compute instance may be instantiated at a particular physical host. In some embodiments, multiple JVMs may be launched within a single compute instance, adding another layer of resource mapping decisions. Thus, for a given partition, one or more control nodes may select which particular resources are to be used as ingestion nodes 1515, storage nodes 1520, retrieval nodes 1525, or processing stage worker nodes 1530 (e.g., nodes 1530A or 1530B for stages PS1 or PS2 respectively). The control nodes may also determine the mappings of those nodes to servers (such as ingestion servers 1535, storage servers 1540, retrieval servers 1545, or processing servers 1550), and the mappings between servers and hosts (such as ingestion hosts 1555, storage hosts 1560, retrieval hosts 1565 or SPS hosts 1570A/1570B). In some implementations, a partition mapping may be considered to comprise identification information (e.g., resource identifiers) at each of various resource granularities (e.g., node, server and host granularities) illustrated, an indication of the data record attributes being used as input to the function or functions 1506, as well as the functions 1506 themselves. The control servers may store representations of the partition mapping in a metadata store, and in some embodiments may expose various APIs (such as getPartitionInfo APIs) or other programmatic interfaces to provide the mapping information to data producers, data consumers, or to the nodes of the SMS subsystems or the SPS.

The mappings of data records to partitions, and from the partitions to the resources, may be further complicated in some embodiments by various factors such as: (a) a given node, server or host may be designated responsible for multiple partitions in some embodiments, or (b) failures or other triggers may result in new nodes, servers or hosts being assigned to a given partition or set of partitions. In addition, as indicated above and described below, partition mappings for a given stream may be modified dynamically over time while the stream records continue to be handled by the SMS and/or SPS nodes. As a result several versions of mapping metadata may be retained for a given stream at least temporarily in some embodiments, each corresponding to a different period of time.

Dynamic Stream Repartitioning

Figure 16:
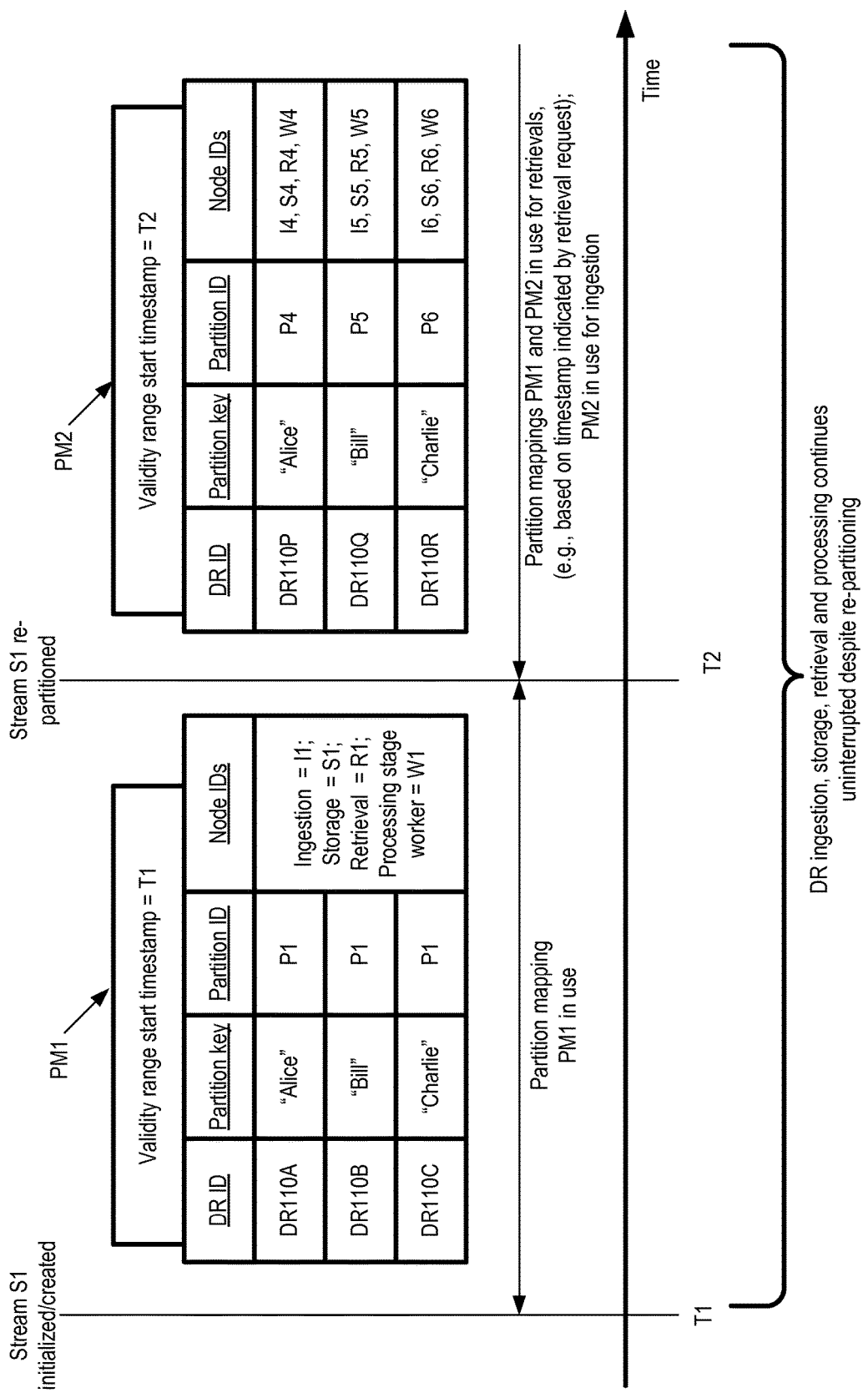
FIG. 16 illustrates an example of dynamic stream repartitioning, according to at least some embodiments.

FIG. 16 illustrates an example of dynamic stream repartitioning, according to at least some embodiments. At time T1 of the timeline illustrated in FIG. 16, a stream S1 is created or initialized. A partition mapping PM1 is created for the stream S1, and remains in effect during the time interval T1 through T2. Three data records received by an SMS between T1 and T2 are shown by way of example. Data record 110A (DR110A) is submitted with a client-supplied partition key value "Alice", DR110B is submitted with a client-supplied partition key value "Bill" and DR110C is submitted with a client-supplied partition key value "Charlie". In the initial mapping PM1, all three data records 110A, 110B and 110C are mapped to the same partition with a partition identifier "P1". For P1 data records, a single node Ii is configured to handle ingestion, a single node S1 is configured to handle storage, a single node R1 is configured to handle retrieval, and a single worker node W1 is configured to handle SPS processing. The start timestamp for a validity range of the mapping PM1 is set to T1.

At time T2, stream S1 is dynamically repartitioned in the example timeline of FIG. 16. Data records continue to arrive and be handled by the SMS and the SPS in the depicted embodiment, irrespective of when the repartitioning occurs; neither the SMS nor the SPS need to be taken offline. The repartitioning may be initiated as a result of any of a number of factors—e.g., in response to a detection of an overload condition at an ingestion, storage, retrieval or processing node, in response to a detection of a skew or imbalance between workload levels at different hosts of the various subsystems, or in response to a request from a data consumer or a data producer client. In the depicted embodiment, a new mapping PM2 takes effect at time T2 (or shortly after T2), as indicated by the validity range start timestamp setting shown for PM2. In at least some implementations, a different set of data record attributes may be used for partitioning data records than were used before the repartitioning. In some cases, an additional partitioning attribute may be submitted by the data producer (e.g., at the request of the SMS), while in other cases the additional attribute may be generated by an SMS ingestion node. Such additional attributes may be referred to as "salted" attributes, and the technique of using additional attributes for repartitioning may be referred to as "salting". In one example implementation, an overloaded ingestion server may indicate to a data producer (e.g., to the SMS client library code being executed by the data producer) that, for repartitioning, a randomly selected small integer value be provided in additional to the previously-used partition key. The combination of the original partition key and the salted additional integer may subsequently be used to distribute the ingestion workload among a different set of ingestion nodes. In some embodiments, the retrieval nodes and/or data consumers may have to be informed regarding the additional attributes being used for repartitioning. Such additional attributes may not be used for repartitioning in at least some implementations.

In the embodiment shown in FIG. 16, the new partition mapping results in different partitions being selected for at least some of the data records received after T2, relative to the partition selected for the same key before T2. DR110P is submitted after T2 with the partition key value "Alice", DR110Q is submitted after T2 with the partition key value "Bill", and DR110R is submitted after T2 with the partition key value "Charlie". Using the PM2 mapping, DR110P is designated a member of partition "P4", DR110Q is designated a member of partition "P5", while DR110R is designated a member of partition "P6" in the illustrated example scenario. In the depicted embodiment, none of the example data records shown as being received after T2 are designated as members of the previously-used partition "P1"; instead, completely new partitions may be used after the repartitioning. In some embodiments, at least some previously used partitions may continue to be used after repartitioning. For each of the new partitions P4, P5 and P6, different nodes may be designated for ingestion, storage, retrieval and/or processing. For example, nodes 14, S4, R4 and W4 may be configured for partition P4, nodes IS, S5, R5 and P5 may be configured for partition P5, and nodes 16, S6, R6 and P6 may be configured for partition P6. In some embodiments, the same storage node may be used for a record with a particular partition key or attribute after repartitioning as was used for such records before repartitioning, but a different storage location within that node (e.g., a different disk, a different disk partition, or a different SSD) may be used after the repartitioning.

During at least some time period after the dynamic repartitioning at T2, retrieval requests may continue to be retrieved for data records that were processed by the SMS ingestion and/or storage subsystems prior to the repartitioning. In at least some cases, the requested data records may have to be retrieved based on the PM1 mapping which was in effect at the time that the data records were ingested. Accordingly, as indicated in FIG. 16, for the purposes of data retrieval, both PM1 and PM2 may continue to be used for some time after T2. In at least some implementations, data records may eventually be deleted from the stream as they age, and the older partition mappings may also be discarded eventually, e.g., when all the corresponding data records have themselves been deleted. In some embodiments, instead of (or prior to) being deleted, stream records may be archived (e.g., based on client-selected archival policies) to a different set of storage locations or devices, such that the partition mappings used by the SMS may still be usable to retrieve the records after archival. In such embodiments, partition mappings such as PM1 and PM2 may be retained for as long as they are needed to support retrieval requests directed to the archival storage. In some archival implementations, different retrieval approaches may be used that do not require the stream partition mappings to be retained (e.g., new indexes may be created for the archived data records). In some embodiments a partition such as P2 that was being used prior to a repartitioning, but to which writes are no longer directed after the repartitioning, may at some point after the repartitioning be "closed" for reads—e.g., the equivalent of an "end of partition reached" error message may be provided in response to retrieval requests.

In some implementations, a given data stream may be divided into numerous (e.g., hundreds or thousands) of partitions. Consider an example case in which a stream S1 is initially divided into 1000 partitions, P1, P2, . . . , P1000. In the event that an overload condition corresponding to one partition, say P7, is detected, it may be worthwhile to change the initial mapping of data records to P7, but the mapping of the other partitions need not need to be changed. In one approach, two new partitions P1001 and P1002 may be created via a repartitioning operation. Records received after the repartitioning, whose attributes would originally (i.e., on the basis of the original mapping) have resulted in their membership in P7, may be mapped to either P1001 or P1002 after the repartitioning, thus distributing the workload of P7 among two partitions. The remaining partitions, e.g., P1-P6 and P8-P1000, may not need to be modified. As only a small subset of partitions are affected by such a repartitioning, in at least some embodiments a combined data structure such as a directed acyclic graph of partition entries (or a tree of partition entries) may be generated and stored. Each entry may indicate a partitioning function output range, and a validity time range (the time period during which the entry's partitioning information is to be considered valid). Assume, in the example above, that the repartitioning involving P7 was performed at time T2, while the stream S1 (and its initial mapping) was created at time T1. In such a scenario, the validity time period for the entry regarding P7 would be "T1 to T2", the validity time periods for P1001 and P1002 would be "T2 onwards", and the validity time time periods for the remaining partitions would be "T1 onwards". Using such a combined data structure may lead to a substantial reduction in the amount of memory or storage used for partition mapping metadata in at least some implementations. In the above example, a split of partition P7 into two new partitions was discussed. In at least some implementations, partitions may also be merged during repartitioning—e.g., two adjacent partitions for which relatively few retrieval requests were received, or relatively few records were submitted, may be merged into a single partition. For any given point in time, the partition to which a data record belongs may be determined unambiguously using the partitioning function and the validity time range information. Over time, the combined data structure may evolve as more splits and/or merges are performed, but the total space required for the partitioning metadata may (depending of course on how often splits occur, and how many partitions are affected by the splits on average) not increase dramatically. In contrast, in a different implementation, each time a repartitioning occurs, the entire set of unchanged metadata for a stream may be replicated and combined with entries for the partitions affected by repartitioning. The storage and memory requirements for partition mapping metadata may increase at a much faster rate in the latter implementation, especially if the older mappings may have to be retained for at least some time after repartitioning as described above.

In at least some embodiments in which sequence numbers that comprise timestamp values (such as the timestamp value 1304 shown in FIG. 13b) are used, a special type of sequence number transition may be implemented for dynamic repartitioning. Assume by way of example that a timestamp-based sequence number scheme, similar to that shown in FIG. 13b, is being used for a stream S1, in which new timestamp values are generated every second for inclusion in the sequence numbers. In at least some implementations in which dynamic repartitioning is supported, the sequence numbers assigned after the dynamic repartitioning may all use a different set of timestamp values (starting with a selected initial timestamp value corresponding to the repartition event) than were used before the dynamic repartitioning. For example, if the timestamp value in use at the time the dynamic repartitioning is committed (i.e., put into effect) was Tk, any new sequence numbers issued after the commit may be required to use timestamp values Tk+1 onwards. Since sequence number values encode the timestamp value in at least some of their higher-order bits in the scheme used in FIG. 13b, ensuring that repartition events correspond to timestamp boundaries as described may in turn simplify the bookkeeping involved in identifying the mappings to be used in response to a retrieval request. Thus, in such implementations, when a retrieval request specifying a particular sequence number is received, the timestamp value may be extracted from that sequence number, and it may be easily determined whether the post-repartitioning mapping should be used, or the pre-repartitioning mapping should be used. If the extracted timestamp value is lower than the initial timestamp selected for the repartition, the pre-repartitioning mapping may be used, and if the extracted timestamp value is equal to or higher than the initial timestamp value selected for the reparation, the post-repartitioning mapping may be used.

Methods for Stream Management and Processing

Figure 17:
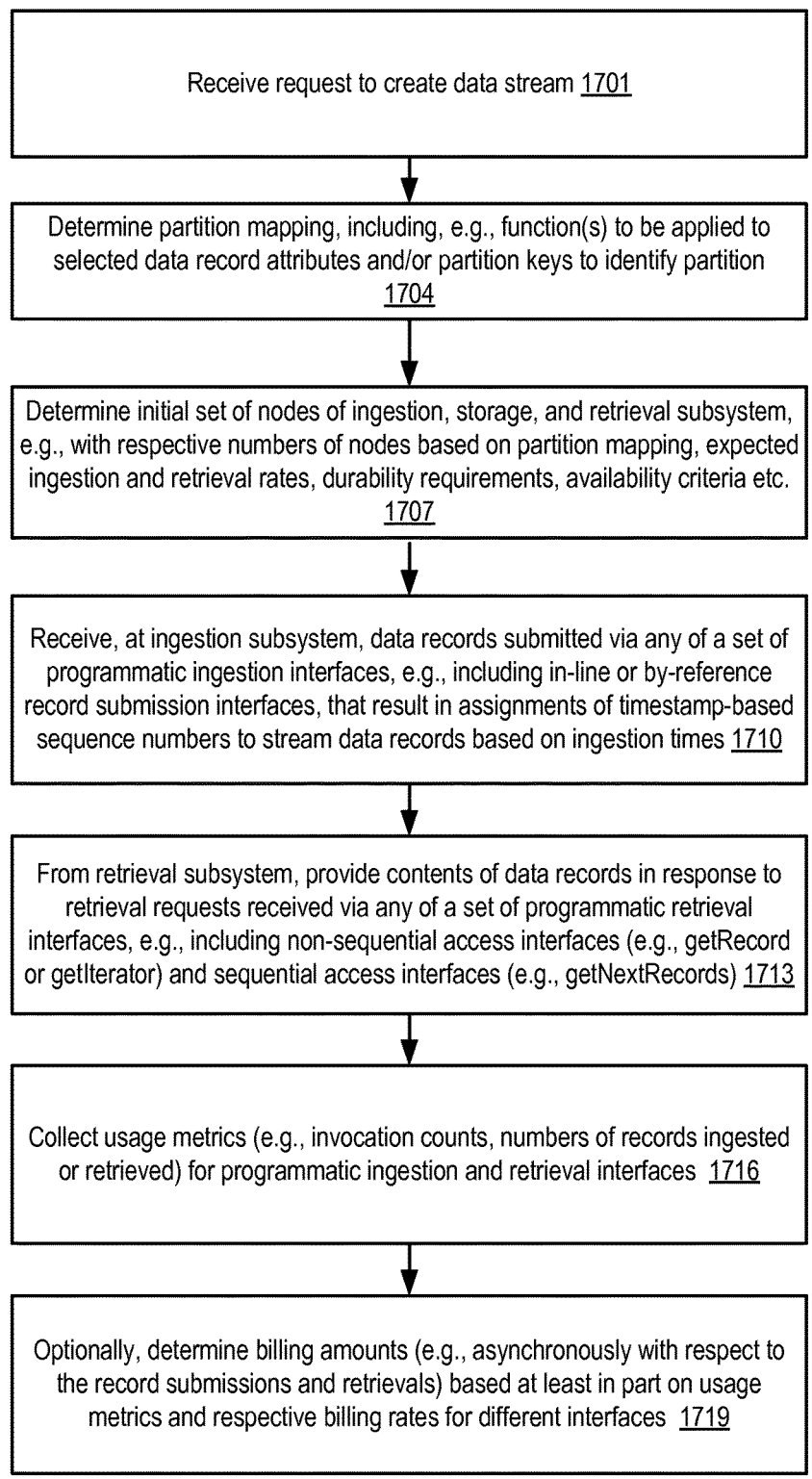
FIG. 17 is a flow diagram illustrating aspects of operations that may be performed to support respective sets of programmatic interfaces for stream record ingestion and stream record retrieval, according to at least some embodiments.

FIG. 17 is a flow diagram illustrating aspects of operations that may be performed to support respective sets of programmatic interfaces for stream record ingestion and stream record retrieval, according to at least some embodiments. As shown in element 1701, a request to create or initialize a data stream may be received, e.g., from an SMS client or a data producer client. The initial partition mapping to be used for the stream may be determined (element 1704), e.g., the function(s) to be used to identify the partition to which a particular data record belongs, and the input parameters to be used for the function(s), may be identified based on a partitioning policy. As mentioned earlier, control components of the SMS may be responsible for receiving and responding to stream creation requests in various embodiments. The manner in which stream creation and initialization (as well as other control-plane operations) are implemented may differ from one embodiment to another. In one embodiment, for example, a redundancy group of control servers may be established, and the primary control server of that redundancy group may respond to a stream creation request by generating and storing the appropriate metadata for a new stream (e.g., the initial partition mapping, the initial sets of nodes of the ingestion, storage and retrieval, and so on) in a persistent storage location. Responses to subsequent queries regarding the stream (e.g., a request from a front-end ingestion node regarding the back-end node responsible for a given partition) may be generated by the primary control server using the stored metadata. In another implementation of the SMS control-plane functionality, stream configuration metadata may be stored in a database that is directly accessible by at least some nodes of the ingestion, storage, or retrieval subsystems. After a stream has been created and initialized, data-plane operations such as record submission, storage and retrieval may commence, and may be handled by respective components of the corresponding subsystems, typically without additional interactions with the control components.

In some embodiments, data producers may be required to submit explicit partition keys with write requests, while in other embodiments, the inputs to be used for the partitioning functions may be determined based on metadata associated with the write requests, such as the identity of the data producers, the IP addresses from which the data records are received, or from the contents of the data records themselves. In at least one implementation, clients may optionally supply partition identifiers in the data record submissions, and additional partitioning functions may not be required in such an implementation.

A number of different factors may be taken into account when determining or configuring the initial set of nodes for ingestion, storage and retrieval functions for the stream (element 1707). For example, the partition mapping itself (which may determine how many partitions the stream is divided into, and the relative expected sizes of the partitions), information about the expected ingestion rates and/or retrieval rates if such information is available, durability/persistence requirements for the stream data records, and/or high availability requirements for the various subsystems (which may result in the setting up of redundancy groups similar to those illustrated in FIGS. 9 and 10) may influence the number and placement of the nodes of the different subsystems. In addition, in embodiments in which clients may indicate placement destination type preferences for various categories of nodes (as illustrated in FIGS. 11, 12*a* and 12*b*), such preferences may also play a role in determining the resources to be used for the SMS and/or SPS nodes. In at least some embodiments, respective pools of nodes capable of performing ingestion, storage and/or retrieval functions may be set up in advance, and control components may assign selected members of such pools to each new stream that is created. In other embodiments, at least in some cases new ingestion, storage or retrieval nodes may have to be instantiated when a stream is created or initialized.

At the ingestion nodes in the depicted embodiment, records may be received via any of a set of programmatic interfaces implemented for data record submission (element 1710), including for example in-line submission interfaces (in which the data is included in the submission requests) and by-reference submission interfaces (in which an address is provided in the submission requests, from which the data can be retrieved by the SMS ingestion nodes or the SMS storage nodes, e.g., using web service requests or other interfaces). Any of a number of different types of programmatic interfaces may be provided in different embodiments for each of the ways of submitting records, e.g., respective application programming interfaces (APIs) may be supported for in-line versus by-reference submission, web pages or web sites may be established, graphical user interfaces may be implemented, or command-line tools may be developed. In at least some embodiments, the SMS may assign a sequence number to each ingested record, e.g., indicative of the order in which the records are ingested or stored, and the sequence numbers may be usable for retrieval requests by data consumers. At the retrieval subsystem nodes, record retrieval requests may be received via any of a set of implemented programmatic retrieval interfaces, and contents of the requested data records may be provided in response (element 1713). For non-sequential access, the interfaces may include, for example, getIterator (requesting an iterator to be instantiated at a position selected within a partition based on a sequence number indicated in the getIterator invocation) or getRecordWithSequenceNumber (to obtain a data record with a specified sequence number). For sequential access, interfaces such as getNextRecords (requesting a number of records in order, starting from a current position of an iterator or from a specified sequence number) may be implemented. In at least some embodiments, different retrieval interfaces may have different billing rates associated with them—e.g., the per-record billing rates for sequential retrieval may be set lower than the per-record billing rates for non-sequential retrieval. The different submission interfaces may also have different billing rates in some embodiments—e.g., by-reference submissions may cost more per record than inline submissions.

Over time, control nodes or specialized billing servers may collect usage metrics for the different programmatic interfaces implemented at the various subsystems of the stream management service (element 1716). The metrics may include, for example, invocation counts of the different programmatic interfaces, the total number of records ingested or retrieved (which may differ from invocation counts for at least some interfaces such as getNextRecords that can be used to retrieve multiple records with a single invocation), the total amount of data ingested or retrieved, and so on. Billing amounts to be charged to the clients that own the stream, or clients that produce and/or consume data from the stream, may optionally be generated based at least in part on the usage metrics and the respective billing rates associated with the programmatic interfaces (element 1719). In at least some embodiments, the billing activities may be asynchronous with respect to the stream ingestion/retrieval operations—e.g., a bill may be generated at the end of a monthly billing period based on the metrics collected during the month.

Figure 18A:
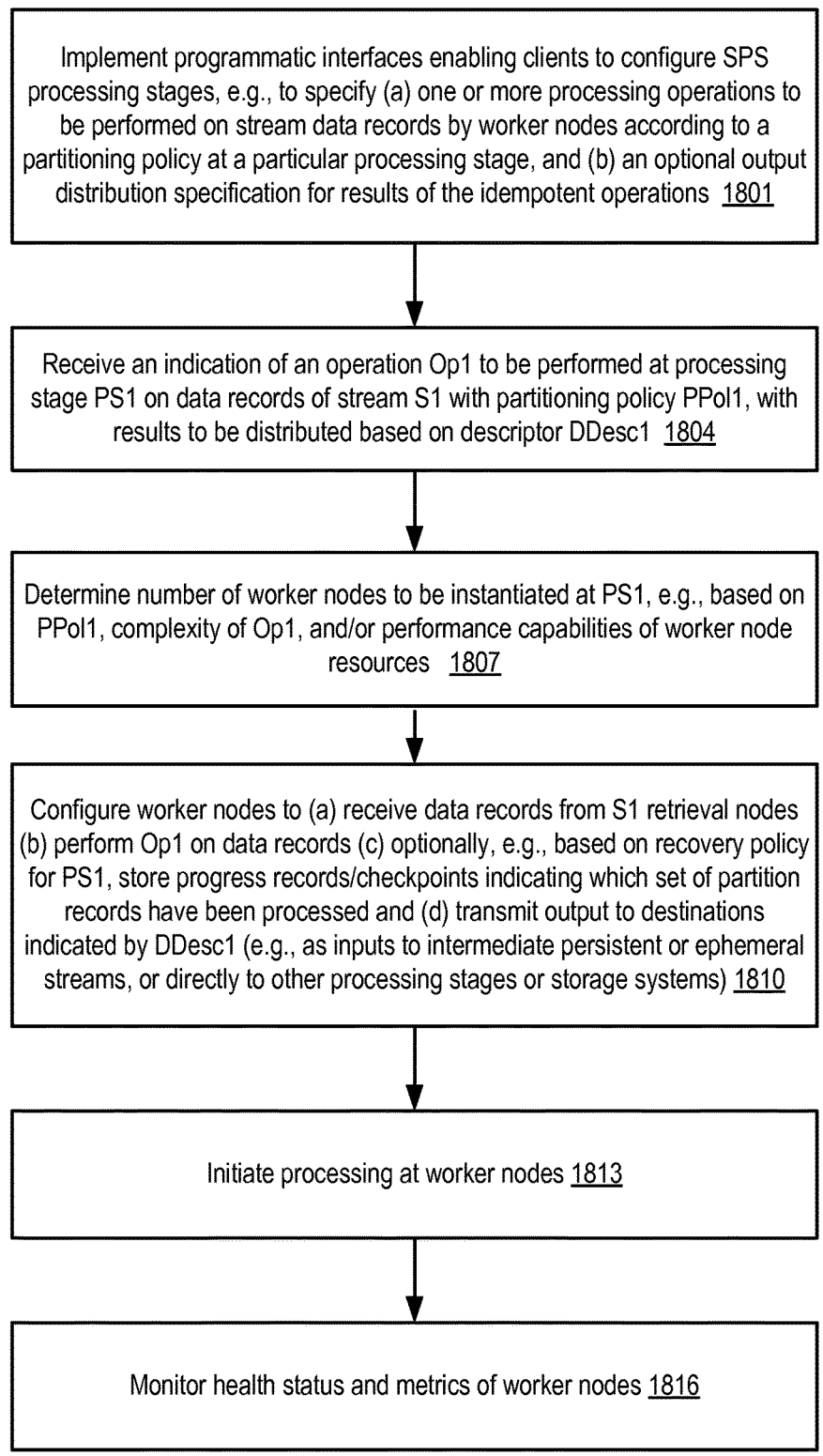
FIG. 18a is a flow diagram illustrating aspects of operations that may be performed to configure stream processing stages, according to at least some embodiments.

FIG. 18*a* is a flow diagram illustrating aspects of operations that may be performed to configure stream processing (SPS) stages, according to at least some embodiments. As shown in element 1801, programmatic interfaces may be implemented enabling clients to configure a number of processing stages for stream data records. To configure a particular stage, for example, a client may indicate the processing operation(s) to be performed on partitioned stream data records at the stage, the distribution policy for the output of the processing operations, as well as other parameters such as the identity of the input streams from which the data to be processed is to be obtained. In some embodiments, processing operations at SPS stages may be required to be idempotent. In other embodiments, non-idempotent operations may also be supported for at least some stages. If the processing to be performed at a given stage is non-idempotent, a client may still be able to obtain recovery-related benefits of idempotency in some embodiments by configuring worker nodes to periodically flush the output of the operations to some persistent external location, recording when the flush operations were performed with respect to the record retrieval sequence, and later configuring replacement worker nodes to replay the flush operations during recovery. In at least some embodiments, clients may be able to configure directed acyclic graphs (DAGs) or other graphs of processing stages, with several different states operating on stream data in parallel, and results of some stages being used as input streams for other stages. In some embodiments, one or more ephemeral rather than persistent streams may be created between different stages, e.g., the data records output from one stage need not necessarily be stored on persistent storage devices before being fed as input to a different stage.

Any of a number of different recovery policies may be implemented for SPS stages in some embodiments, including for example a checkpoint-based recovery policy or a best-effort recovery policy. In one embodiment, a client may use a programmatic interface to select recovery policies for different SPS stages. At stages for which a checkpoint-based recovery is used, worker nodes may be configured to store progress records or checkpoints at intervals, indicating how far along in a stream partition they have reached (for example, the sequence numbers of the most recently processed records may be stored as indicators of the progress). The progress records may be used later during recovery operations after failures, as described below with reference to FIG. 19. In a best-effort recovery policy, progress records need not be stored, and replacement worker nodes configured in response to a failure may simply process new data records as they are received. Within a given SPS stage graph or workflow, in some embodiments different recovery policies may be applied to different stages.

An SPS control server may receive, e.g., via one of the programmatic interfaces indicated in element 1801, an indication of the idempotent operation Op1 to be performed at a particular stage PS1 of a stream S1 in accordance with a partitioning policy PPol1, with the results of the processing to be distributed in accordance with output distribution descriptor DDesc1 (element 1804). The number of worker nodes to be configured for state PS1, and the virtual or physical resources needed for the nodes, may be determined, e.g., based on various factors such as the Ppol1, the complexity of the idempotent operations Op1, and the performance capabilities of the resources to be used for the worker nodes (element 1807).

The worker nodes may then be instantiated and configured (element 1810), e.g., as processes or threads at selected virtual or physical machine resources. In one simple implementation, for example, one worker node may initially be assigned for each partition of S1. A given worker node may be configured to (a) receive data records from the appropriate subset of S1's retrieval nodes, (b) perform Op1 on the received data records, (c) optionally, e.g., based on the recovery policy for PS1, store progress records/checkpoints indicating which set of partition records have been processed, and (d) transmit output to destinations indicated by DDesc1 (e.g., as inputs to intermediate persistent or ephemeral streams, or directly to other processing stages or storage systems). It is noted that at least in some embodiments, the SPS processing may not necessarily generate any output that has to be transmitted elsewhere on an ongoing basis. For example, some SPS applications may simply serve as temporary repositories of data records, and/or may implement query interfaces enabling users to view the data records. Such an application may manage its own output, e.g., output may be generated in response to received queries and not in accordance with a distribution descriptor. A logging-related SPS application may retain the last day's log records collected from a large-scale distributed system, for example, enabling clients to view logging data for debugging or analysis purposes. Accordingly, in some embodiments, output distribution descriptors need not be specified for at least some stages of an SPS, for at least some streams, or for at least some partitions. The worker nodes may then initiate retrieving and processing data records as per their respective configuration settings (element 1813). The SPS control nodes may monitor the health status (e.g., using responsiveness checks such as a heartbeat protocol) of the worker nodes, as well as various other metrics such as the resource utilization levels at the resources being used for the worker nodes (element 1816) in at least some embodiments. The information collected from the worker nodes may be used to determine whether a failover is required, e.g., if a worker node should be replaced and a recovery policy implemented as described below.

Figure 18B:
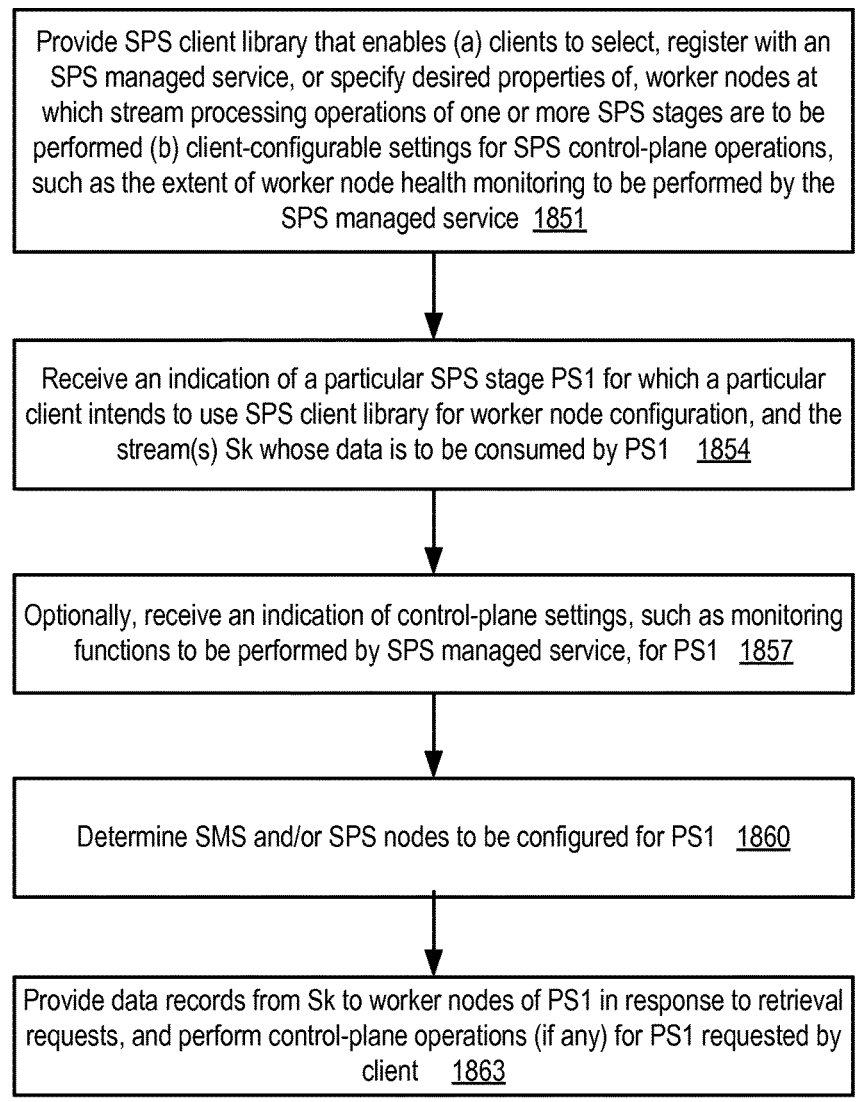
FIG. 18b is a flow diagram illustrating aspects of operations that may be performed in response to invocations of components of a client library for configuration of stream processing worker nodes, according to at least some embodiments.

In some embodiments, an installable SPS client library may be provided to those clients that wish to implement SPS worker nodes at client-owned premises, and/or at client-selected resources of the provider network. The client library may also allow SPS clients to select the extent to which they wish to use various control-plane features of an SPS managed service, such as health monitoring functions, automated workload monitoring and balancing, security management, dynamic repartitioning and the like. FIG. 18*b* is a flow diagram illustrating aspects of operations that may be performed in response to invocations of components of a client library for configuration of stream processing worker nodes, according to at least some embodiments. As shown in element 1851, an SPS client library may be provided (e.g., via download from a web site of a multi-tenant SPS managed service configurable to perform the kinds of operations illustrated in FIG. 18*a*). The library may include a number of executable components, and/or components that can be linked to client applications. Some library components may enable clients to select, register with the SPS managed service, or specify desired properties of, various worker nodes at which stream processing operations of one or more SPS stages are to be performed. For example, one client may wish to use their own set of compute instances implemented at a virtual computing service of a provider network for the worker nodes, while another client may wish to use computing devices located at the client's own data center (such as special purpose devices not supported by the provider network) for processing stream records. Clients may bring worker nodes online on an as-needed basis at their own premises, or using compute instances of the virtual computing service, as desired. In addition to or instead of such an on-demand instantiation of worker nodes, in some embodiments clients may preconfigure pools of potentially reusable worker nodes that can be deployed when needed. In some implementations, a library component may be executed or invoked to allow a client to register, with the SPS managed service, a particular process or thread instantiated by the client as a worker node of a specified stage, for which subsequent control-plane operations may be handled by the SPS managed service. In one embodiment, the client may also be able to select from among different levels of control-plane responsibilities to be handled by the SPS managed service for the worker nodes—for example, one client may wish to use their own custom modules to monitor worker node health, while another client may wish to utilize the SPS managed service for monitoring worker node health and taking the appropriate actions if a failure is detected.

The SPS managed service may receive an indication that a particular client wishes to use the client library for configuring worker nodes and/or control plane operations of a particular SPS stage PS1 (element 1854). (PS1 itself may be designed using programmatic interfaces included in the library, or using programmatic interfaces exposed by the SPS managed service similar to the web-based interface illustrated in FIG. 4.) The client may also indicate the streams whose data is to be retrieved for use as input by PS1. Optionally, in at least some embodiments, the client may indicate control-plane settings for PS1, e.g., whether the client wants to use the service's health monitoring capabilities for the nodes, or is willing to use custom health monitoring tools (element 1857). Depending on the preferences indicated by the client, one or more nodes of the SMS and/or SPS to be configured for the client's use may be determined (element 1860). Network connectivity may be established between the client's worker nodes to the SMS/SPS nodes, and/or other configuration operations may be performed to enable the flow of data records and processing results as desired. Data records may be provided to SP1 worker nodes upon receiving retrieval requests, and desired control-plane operations (if any were requested by the client) may be performed as needed. It is noted that at least in some embodiments, a similar approach enabling clients to control the extent to which they wish to use the control-plane functionality of various subsystems of an SMS managed service may also or instead be implemented.

Figure 19:
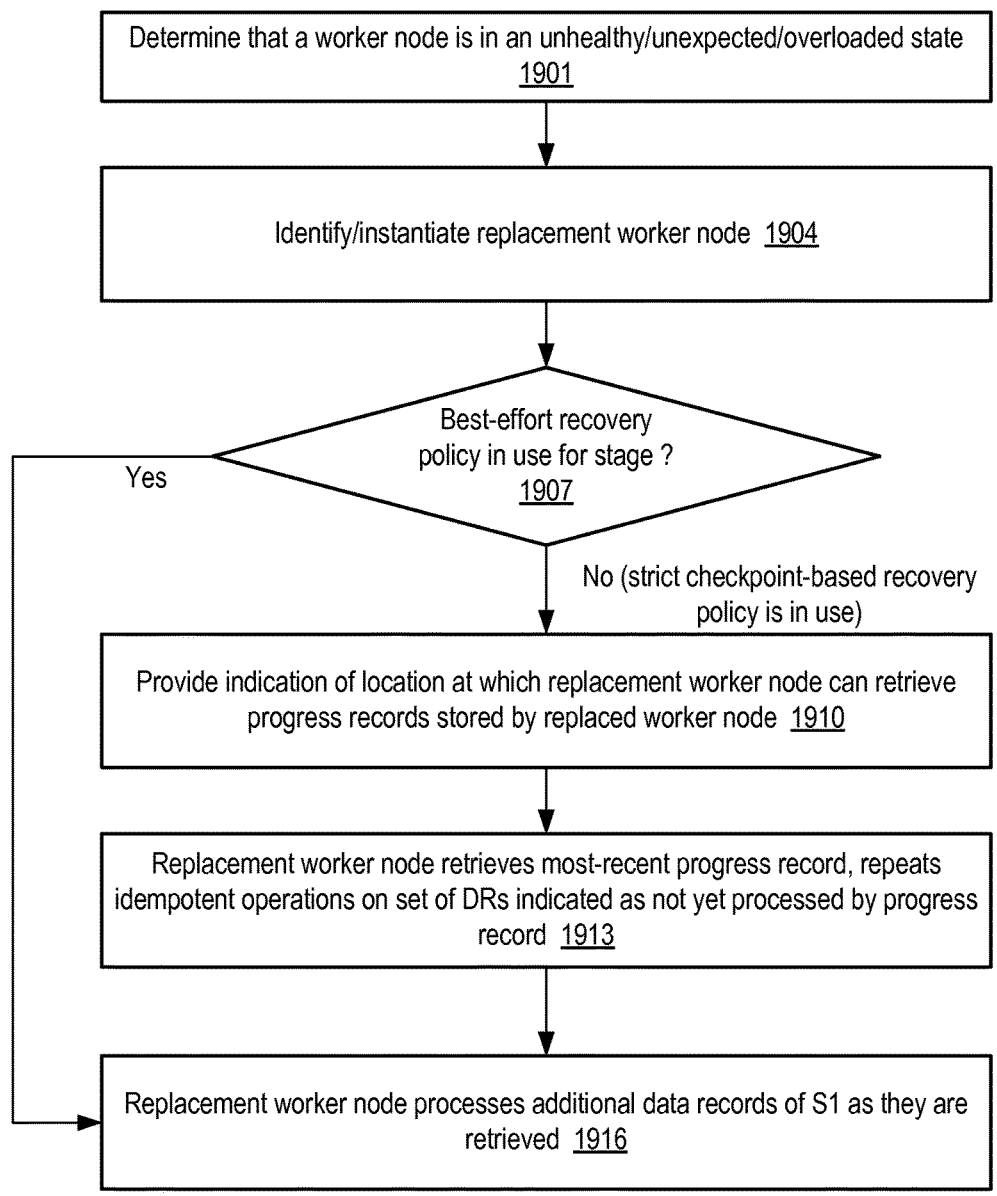
FIG. 19 is a flow diagram illustrating aspects of operations that may be performed to implement one or more recovery policies for stream processing, according to at least some embodiments.

FIG. 19 is a flow diagram illustrating aspects of operations that may be performed to implement one or more recovery policies for stream processing, according to at least some embodiments. As shown in element 1901, an SPS control node may determine that triggering criteria for replacing a particular worker node have been met—e.g., the worker node may have become unresponsive or unhealthy, the workload levels of the current node may have reached a threshold value for failover, the number of errors detected at the worker node may have exceeded a threshold, or some other unexpected state of a worker node may be identified. A replacement worker node may be identified or instantiated (element 1904). In some embodiments, a pool of available worker threads may be set up, from which one may be selected as a replacement, for example, or a new thread or process may be launched.

If a best-effort recovery policy is to be used at the SPS stage at which the particular worker node was active (as determined in element 1907), the replacement worker node may simply start processing additional data records as they become available (element 1916), e.g., no record of the replaced worker node's progress need be examined. If a checkpoint-based recovery policy is to be used, an indication of the location (e.g., a storage device address or a URL) at which the replacement worker node may access the progress records stored by the replaced worker node may be provided (element 1910). The replacement worker node may retrieve the most recent progress record stored by the replaced node, and use the progress record to determine the set of data records on which the replacement worker node should perform the idempotent operations of the stage (element 1913). In such a checkpoint-based recovery policy, depending on the duration between the last progress record and the time at which the replacement worker node is instantiated, as well as on the rate at which the replaced worker node had processed additional records subsequent to the progress record being stored, some number of data records may be processed more than once. If the operations being performed are idempotent, such repeat operations may have no negative effects in at least some embodiments. After the replacement worker node has performed the repeat recovery operations based on the earlier-stored progress record, in at least some embodiments the replacement worker thread may store its own progress record indicating that recovery is complete, and may start normal worker thread operations on newly-received data records (element 1916).

Figure 20:
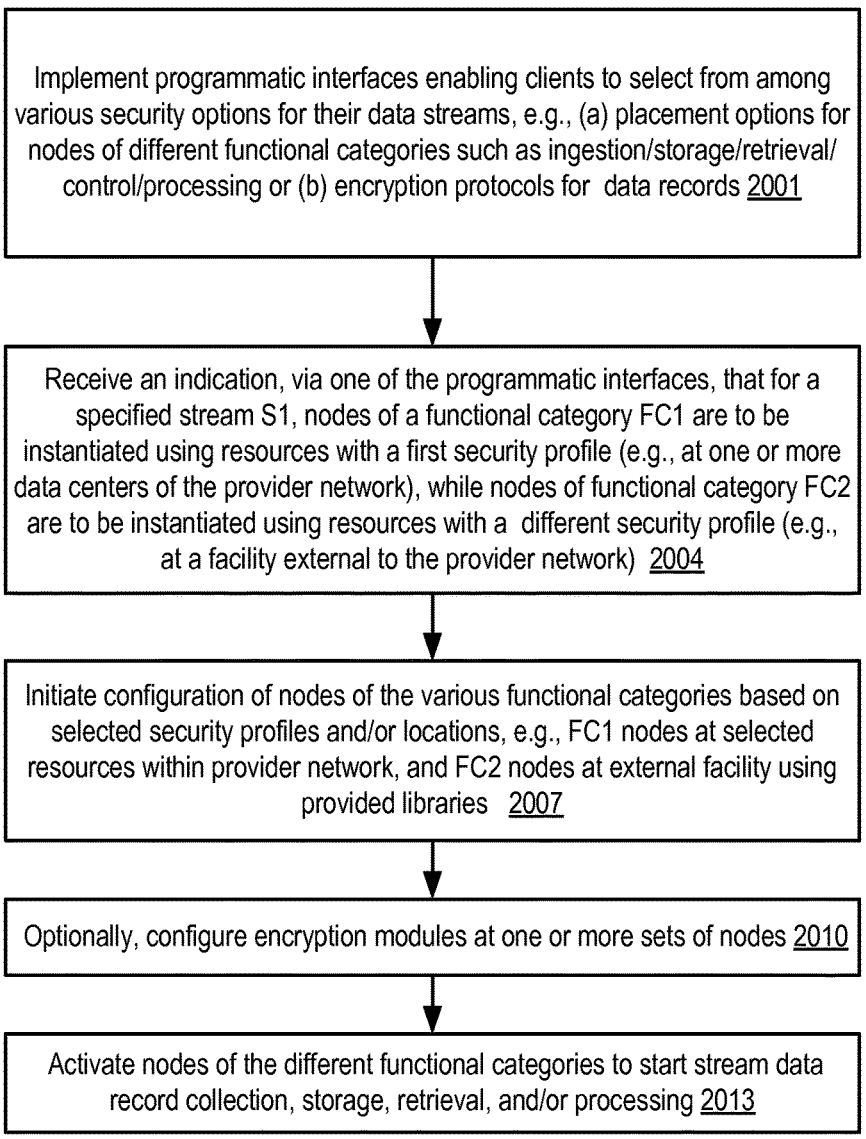
FIG. 20 is a flow diagram illustrating aspects of operations that may be performed to implement a plurality of security options for data streams, according to at least some embodiments.

FIG. 20 is a flow diagram illustrating aspects of operations that may be performed to implement a plurality of security options for data streams, according to at least some embodiments. As shown in element 2001, one or more programmatic interfaces may be implemented that enable clients to select from a variety of security options for data stream management and processing, including for example placement destination type options for the nodes of different functional categories (e.g., ingestion, storage, retrieval, processing or control nodes). The placement destination types may differ from one another in various aspects of their security profiles. The physical location of the resources to be used for the SMS or SPS nodes may differ from one destination type to another in some embodiments. For example, resources such as instance hosts located at provider network data centers may be used for the nodes, or resources at client-owned facilities may be used, or third-party resources may be used. The network isolation levels or other networking characteristics may differ from one destination type to another in at least some embodiments—e.g., some SMS or SPS nodes may be instantiated within isolated virtual networks, or at client-owned facilities connected to the provider network via dedicated isolated physical links. In one embodiment, clients may indicate that certain types of SMS or SPS nodes are to be established at single-tenant instance hosts of a provider network, instead of using multi-tenant instance hosts that may also be available. In at least some embodiments, various types of encryption options may also be selectable via the security-related programmatic interfaces.

A client's security profile choices or preferences regarding nodes of one or more functional categories for a stream S1 may be received via the security-related programmatic interfaces. For example, the client may select one security profile for nodes of functional category FC1 (e.g., the client may wish to implement SPS worker nodes at client-owned premises) and a different security profile for nodes of a different functional category FC2 (e.g., the client may be willing to implement SMS ingestion nodes or storage nodes at provider network data centers) (element 2004). In some cases, a client may decide to set up nodes of all the different functional categories with the same security profile. The SMS and/or the SPS may define default placement destination types for the various functional categories in some embodiments—e.g., unless a client indicates otherwise, nodes of all the functional categories may be set up within isolated virtual networks of a provider network.

The nodes of the different functional categories may then be configured based on the client's preferences for security profiles and/or locations (or based on default settings for the functional categories for which the client does not provide preferences) (element 2007). The configuration may involve, for example, selecting the appropriate physical hosts or machines, and instantiating the appropriate compute instances, virtual machines, processes and/or threads for the nodes of the different functional categories, and establishing the appropriate network connections between the nodes. In some embodiments, executable library components for the different stream management and processing functions may be provided for installation at hosts external to the provider network as part of the configuration.

According to at least some embodiments, encryption modules may be activated at one or more categories of the nodes, e.g., in accordance with the client's expressed encryption preferences or based on default encryption settings (element 2010). The nodes of the various functional categories may then be activated, so that the stream data is ingested, stored, retrieved and/or processed as desired by the client (element 2013).

Figure 21:
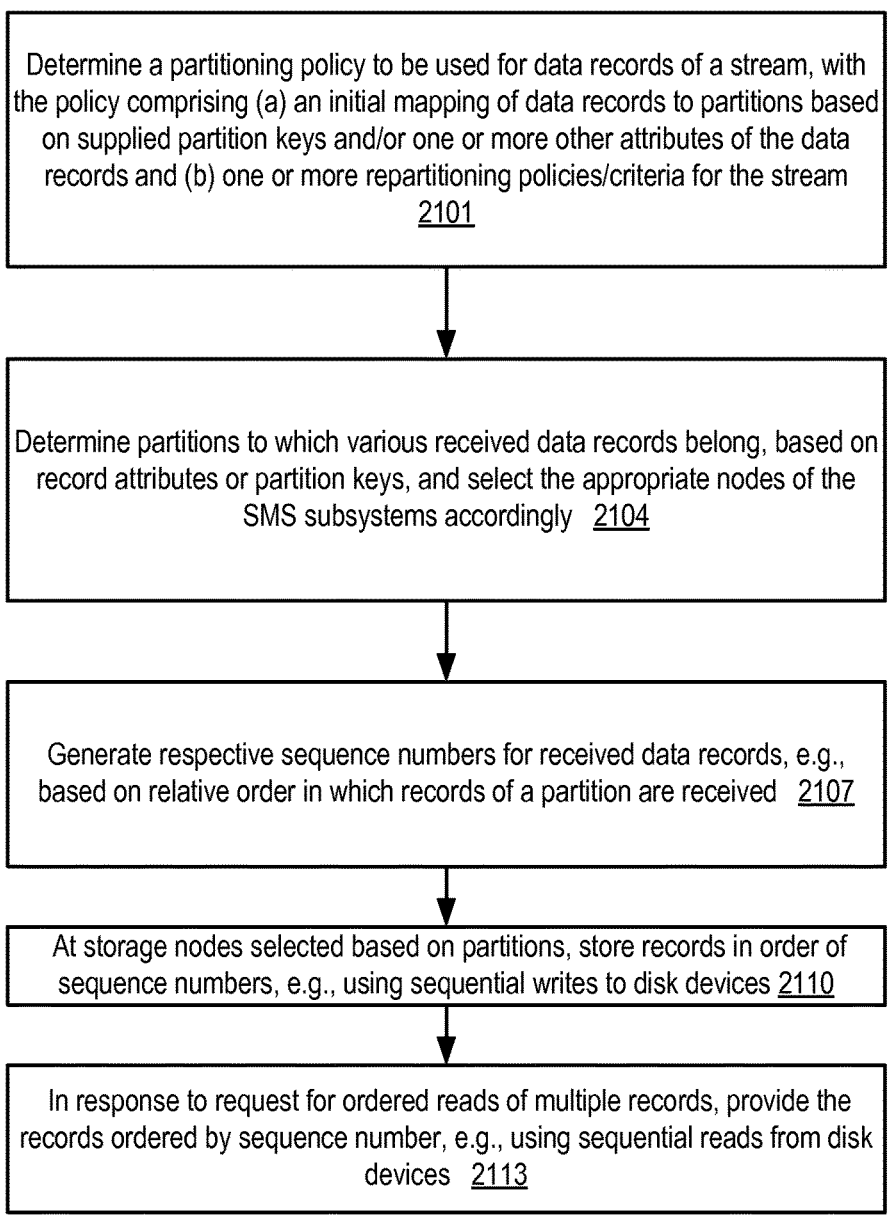
FIG. 21 is a flow diagram illustrating aspects of operations that may be performed to implement a partitioning policy for data streams, according to at least some embodiments.

FIG. 21 is a flow diagram illustrating aspects of operations that may be performed to implement a partitioning policy for data streams, according to at least some embodiments. As shown in element 2101, a partitioning policy may be determined for a data stream. The policy may comprise, for example, an initial mapping of data records to partitions based on keys supplied by data producers or based on various attributes of the submitted data records, as well as one or more triggering criteria for repartitioning the data stream. In some embodiments, for example, a hash function may be applied to the partition key or keys, yielding a 128-bit integer hash value. The range of possible 128-bit integers may be divided into N contiguous sub-ranges, each representing one of N partitions of the stream. The number of partitions and/or the relative sizes of the sub-ranges may vary from one stream to another in some embodiments. In at least some embodiments, the client on whose behalf a stream is being configured may provide input regarding the partitioning scheme to be used, e.g., the number of partitions desired, or desired characteristics of the partitioning function to be used. In at least one embodiment, clients may provide the partition identifiers or names for some subset or all of the submitted data records.

As the data records of the stream are received, their respective partitions may be determined based on the supplied keys and/or other attributes, and the appropriate set of ingestion, storage and retrieval nodes may be selected for the identified partition (element 2104). In at least some embodiments, respective sequence numbers may be generated for the data records, e.g., indicative of the sequence in which the records of a given partition were received (element 2107). The sequence numbers may comprise a number of elements in some implementations, such as timestamp values (e.g., the number of seconds elapsed since a well-known epoch such as 00:00:00 UTC Jan. 1 1970), subsequence values obtained from a storage subsystem, version numbers of the SMS software, and/or the partition identifiers. The sequence numbers may be provided to the data producers in some embodiments, e.g., to acknowledge the successful ingestion of the submitted data records. The sequence numbers may also be used by data consumers to retrieve the data records of a stream or a partition in ingestion order in some embodiments.

The data records may be stored in sequence number order in at least some embodiments at the storage nodes to which they are directed based on the partitioning policy (element 2110). In embodiments in which rotating magnetic disks storage devices are used, sequential writes may typically be used to save the received data records to disk, thereby avoiding disk seek latencies. In at least some implementations, non-volatile buffers may be used as write caches prior to storing the records to disk, e.g., to further decrease the probability of disk seeks. In response to requests for reads of multiple data records ordered by sequence number (e.g., invocations of getNextRecords or similar interfaces), the data records may later be read using sequential reads from the storage devices (element 2113).

Figure 22:
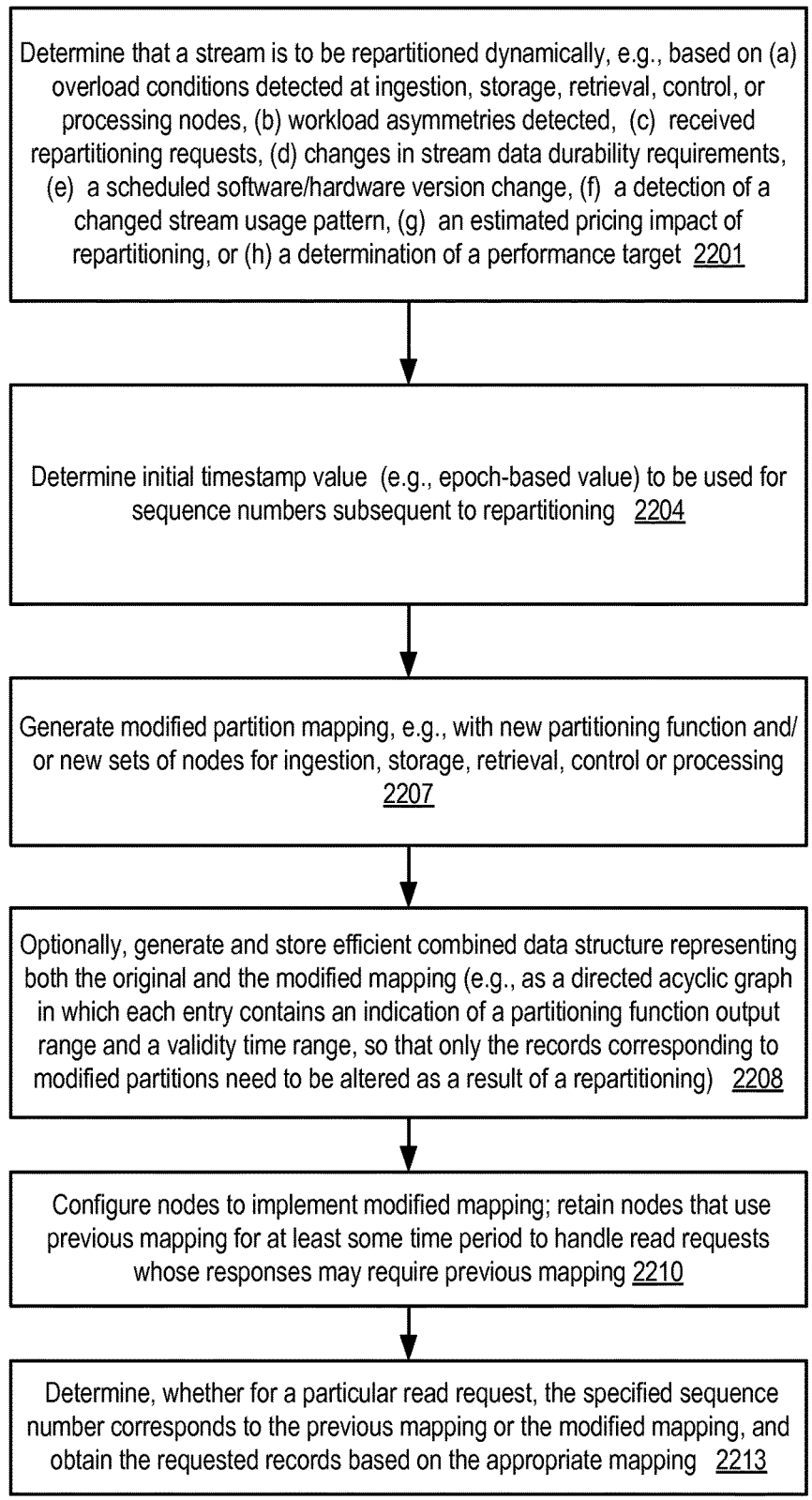
FIG. 22 is a flow diagram illustrating aspects of operations that may be performed to implement dynamic repartitioning of data streams, according to at least some embodiments.

FIG. 22 is a flow diagram illustrating aspects of operations that may be performed to implement dynamic repartitioning of data streams, according to at least some embodiments. As shown in element 2201, a determination may be made (e.g., at a control component of an SMS or an SPS) that a stream is to be dynamically repartitioned. A number of different triggering conditions may lead to a decision to repartition a stream, such as a detection of overload at one or more of the ingestion, storage, retrieval, processing or control nodes, or a detection of an imbalance in the workload levels of different nodes, or a repartitioning request that may be received from a client (e.g., a data producer or data consumer). Client repartitioning requests may include specific details of the requested repartitioning in some implementations, such as various parameters of the modified mapping to be generated (e.g., the number of partitions to be added or removed, which specific partitions should be combined or split, and so on). In one implementation, a client repartitioning request may indicate a problem state (such as a load imbalance) that the client wishes to resolve, and the SMS or SPS may be responsible for translating the description of the problem state into the appropriate repartitioning operation. In some cases, instead of requesting a repartitioning or describing a problem state, a client may specify the triggering criteria to be used for repartitioning. A determination of a change to a data durability requirement of the data stream may trigger repartitioning in some embodiments, which may for example result in the selection of a different set of storage devices or a different storage technology for the stream records. A detection of a change to a usage pattern of the data stream (e.g., the rate at which data records are being produced or consumed) may also lead to repartitioning in some cases, and may also lead to the use of a different storage technique or a different set of storage devices that is more appropriate for the changed usage pattern. For example, a decision to reparation may be based on the determination that, for the rate of reads and writes expected for a given partition or an entire stream, SSDs may be a more appropriate storage technology than rotating magnetic disks. Scheduled or impending software and/or hardware version changes may trigger repartitioning in one embodiment. In some cases, pricing or billing concerns may trigger repartitioning, as when a client indicates a budget constraint that can be met more effectively using a different partitioning approach or a different approach to storage. Changed performance targets may also trigger repartitioning in at least some embodiments. In the embodiment depicted in FIG. 22, an initial timestamp value (such as an offset in seconds from 00:00:00 UTC Jan. 1 1970, an epoch value typically available via a system call in several operating systems) to be used for sequence numbers assigned after the repartitioning may be selected (element 2204). In some implementations, a global state manager implemented at a provider network may support a getEpochValue API, for example, enabling various components of the SMS and/or SPS to obtain consistent timestamp values to be used for sequence number generation. In other implementations, other time sources may be used—e.g., an SMS or SPS control node may be designated to provide consistently-ordered timestamp values to other components, or a local system call invocation may be used. In some embodiments, the timestamp values need not necessarily correspond to the wall clock time at any particular host—e.g., a monotonically increasing integer counter value may simply be used.

A modified partition mapping, different from the mapping in use at the time of the repartitioning decision, may be generated for the stream (element 2207). The changed mapping may map data records with a particular partition key to a different partition than data records with the same key were mapped to before the repartitioning in at least some embodiments. Some partitions (typically, heavily-used partitions) may be split, while other (typically lightly-used) partitions may be merged, depending on the triggering conditions for the repartitioning and/or on observed workload metrics. A different partitioning function may be used after the repartitioning than before the repartitioning in some embodiments—e.g., a different hash function, or a different approach to the subdivision of hash function results into partitions may be used. In some implementations, for example, in which the partitions correspond to contiguous ranges of 128-bit integers, the 128-bit integer space may be divided into a different set of sub-ranges after the repartitioning. In at least some embodiments, new sets of ingestion, storage, retrieval, processing or control nodes may be assigned to the newly-created partitions. In some implementations a space-efficient combined data structure may be used to represent both the initial mapping and the modified mapping (element 2208). For example, a directed acyclic graph or tree structure may be stored, in which each entry contains an indication of a partitioning function output range (e.g., the range of a partitioning hash function's results that correspond to a given partition) and a validity time range, so that only the records corresponding to modified partitions need to be altered as a result of a repartitioning. Entries for partitions that remain unaltered during a repartitioning may not need to be modified in the data structure. The new nodes may be configured to implement the modified partition mapping (element 2210). In at least some embodiments, since retrieval requests for data records stored on the basis of the earlier mapping may continue to be received for at least some time, the previous nodes and the previous mapping may be retained for some time. When a read request specifying a particular sequence number or timestamp is received (element 2213), a determination may be made (e.g., at a control node or at a retrieval node) as to whether the read request is to be satisfied using the new partition mapping or the previous partition mapping. The selected mapping may then be used to identify the appropriate storage node from which the requested data is to be obtained.

Figure 23:
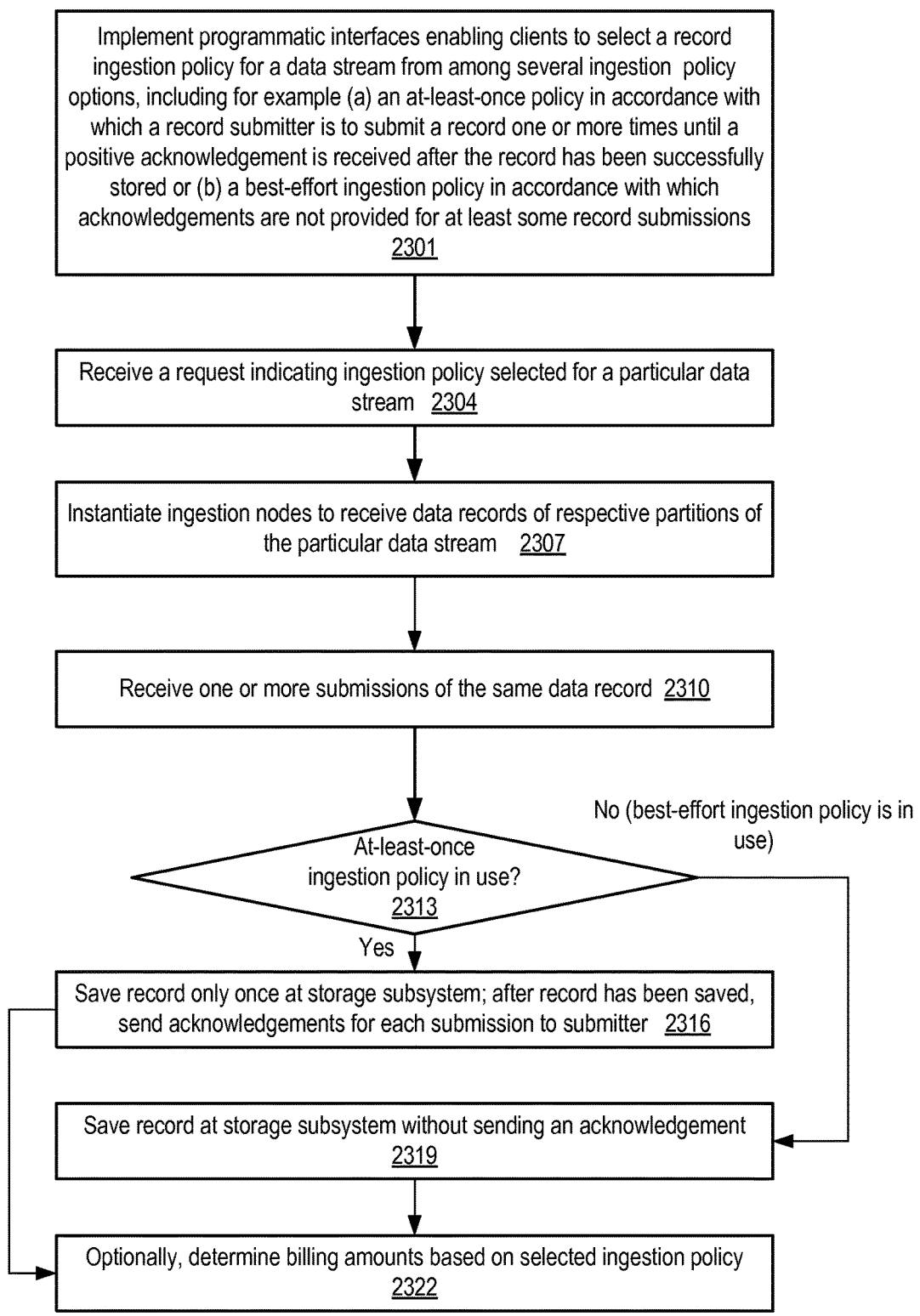
FIG. 23 is a flow diagram illustrating aspects of operations that may be performed to implement an at-least-once record ingestion policy for data stream records, according to at least some embodiments.

FIG. 23 is a flow diagram illustrating aspects of operations that may be performed to implement an at-least-once record ingestion policy for data stream records, according to at least some embodiments. As shown in element 2301, one or more programmatic interfaces may be implemented to enable clients to select a record ingestion policy for a data stream from among several ingestion policy options, including for example (a) an at-least-once policy in accordance with which a record submitter is to submit a record one or more times until a positive acknowledgement is received or (b) a best-effort ingestion policy in accordance with which acknowledgements are not provided for at least some record submissions. Some data producing clients may not be as concerned about the potential loss of a small fraction of their records as others, and may therefore opt for the best-effort ingestion approach. In some implementations, even for streams configured for best-effort ingestion, the SMS may still provide acknowledgements for some subset of the data records, or may even attempt to provide acknowledgements for all the data records, even though the best-effort policy does not require acknowledgements for every data record.

A request may be received via one of the programmatic interfaces, indicating a particular ingestion policy to be used for a specified stream (element 2304). Ingestion nodes may be instantiated in accordance with the partitioning policy in effect for the stream (element 2307). When one or more submissions of the same data record are received at an ingestion node (element 2310), different actions may be taken dependent on the ingestion policy in effect. If the at-least-once ingestion policy is in use (as determined in element 2313), an acknowledgement may be sent to the data producer for each of the one or more submissions, but the data record may be saved only once at the storage subsystem (2316). (It is noted that in accordance with the persistence policies in effect for the stream, N replicas of a given record may be stored in some cases, but if a given data record is submitted M times, the replicas may be generated only for one of the submissions—i.e., the total number of record replicas stored would still be N, and not N×M.) If a best-effort ingestion policy were in effect (as also detected in element 2313), the data record may still be saved once at a storage device, but no acknowledgement need be sent to the data producer (element 2319). In at least some embodiments, client billing amounts may optionally be determined based at least in part on the ingestion policy selected (element 2322). As noted earlier, in some embodiments, two versions of an at-least-once ingestion policy may be supported. In one version, similar to that illustrated in FIG. 23, the SMS may be responsible for de-duplicating data records (i.e., ensuring that data is stored at the SMS storage subsystem in response to only one of a set of two or more submissions). In a different version of at-least-once ingestion, duplication of data records by the SMS may be permitted. The latter approach may be useful for stream applications in which there are few or no negative consequences of data record duplication, and/or for stream applications that perform their own duplicate elimination.

Figure 24:
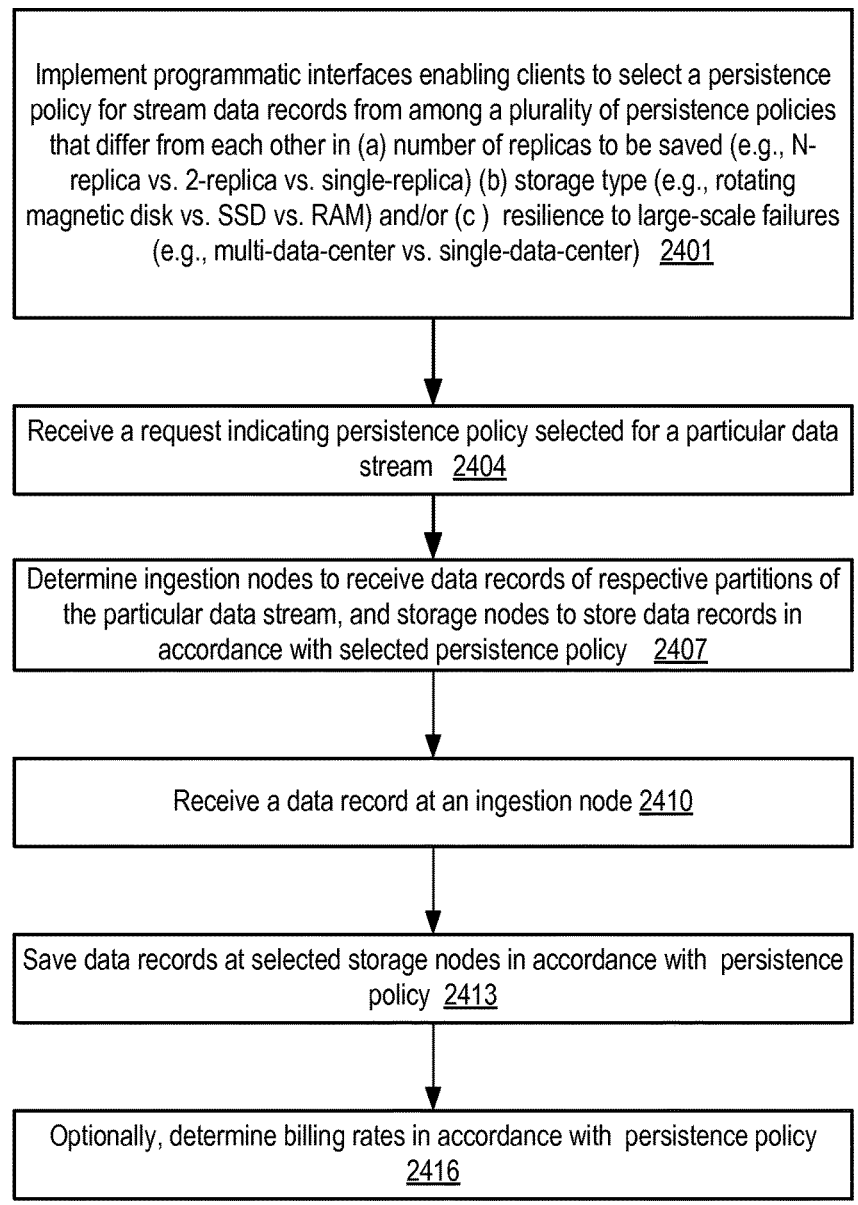
FIG. 24 is a flow diagram illustrating aspects of operations that may be performed to implement a plurality of persistence policies for data streams, according to at least some embodiments.

FIG. 24 is a flow diagram illustrating aspects of operations that may be performed to implement a plurality of persistence policies for data streams, according to at least some embodiments. As shown in element 2401, one or more programmatic interfaces enabling clients to select a persistence policy for stream data records from among a plurality of persistence policies may be implemented. The persistence policies may differ from each other in any of various respects: e.g., (a) the number of replicas to be saved may differ (e.g., N-replica vs. 2-replica vs. single-replica policies may be supported) (b) storage location/device types to be used may differ (e.g., rotating magnetic disk vs. SSD vs. RAM vs. a database service or a multi-tenant storage service) and/or (c) the policies may differ in the expected extent of resilience to large-scale failures (e.g., multi-data-center vs. single-data-center policies may be supported). A request may be received indicating a client's selection of a particular persistence policy for a specified stream (element 2404). In some embodiments, the persistence policy selected by a client may result in the use of different storage location types or device types for respective partitions of a given stream. In one embodiment, the SMS rather than the client may select the storage location type or device types, either at the stream level or at the partition level. Clients may indicate data durability goals and/or performance goals (such as desired read or write throughput or latency) in some embodiments when selecting the persistence policy in some embodiments, and these goals may be used by the SMS to select the appropriate storage devices types or locations. For example, if low latencies are desired, SSDs may be used instead of rotating magnetic disks to store the data records of one or more partitions or streams.

A set of ingestion nodes may be determined or configured to receive the data records of the selected stream from data producers, and a set of storage nodes may be configured to implement the selected persistence policy (element 2407). When a data record is received at an ingestion node (element 2410), one or more copies of the data record may be stored, based on the selected persistence policy, at selected storage devices by the storage nodes responsible for the partition to which the data record belongs (element 2413). In at least some implementations, billing amounts may optionally (and/or asynchronously) be determined based on the specific persistence policies selected by the client (element 2416).

Decentralized Workload Management for Stream Processing

In some embodiments, a substantial portion or all of the control-plane functionality of an SPS may be implemented in a decentralized manner, e.g., by the worker nodes within a given SPS stage coordinating various control operations (such as partition assignment to the worker nodes, responses to dynamic repartitioning, health monitoring and/or load balancing) via a shared data structure such as a database table. A given worker node W1 may inspect entries within the shared data structure to determine, for example, which partitions of the stage's input streams (if any) are currently not being processed. If such a partition P1 is found, W1 may update an entry in the shared data structure to indicate that W1 will perform the stage's processing operations on P1's records. Other worker nodes may learn that W1 is assigned to process P1 records, and may therefore assign different partitions to themselves. Worker nodes may periodically or occasionally submit queries to the SMS control plane to determine the current partition maps in effect for the input stream, and update the shared data structure to indicate map changes (e.g., as a result of repartitioning) as necessary. Load balancing and other operations may also be coordinated via the shared data structure in various embodiments, as described below. In some such decentralized implementations, dedicated control nodes may not be required for the SPS, thereby reducing the overhead required to implement SPS workflows. Such decentralized SPS control plane implementations may be especially popular with budget-conscious customers that utilize SPS client libraries to implement various aspects of stream processing, e.g., at compute instances within the provider network that are assigned to the customers, or at locations outside the provider network. Decentralized SPS control-plane techniques may also be used in embodiments in which client libraries are not used, e.g., when all the resources used for the SMS and SPS are configured within a provider network. An SPS at which the worker nodes implement some or all of the SPS control plane functions for at least some processing stages may be referred to herein as a "decentralized-control SPS".

Figure 25:
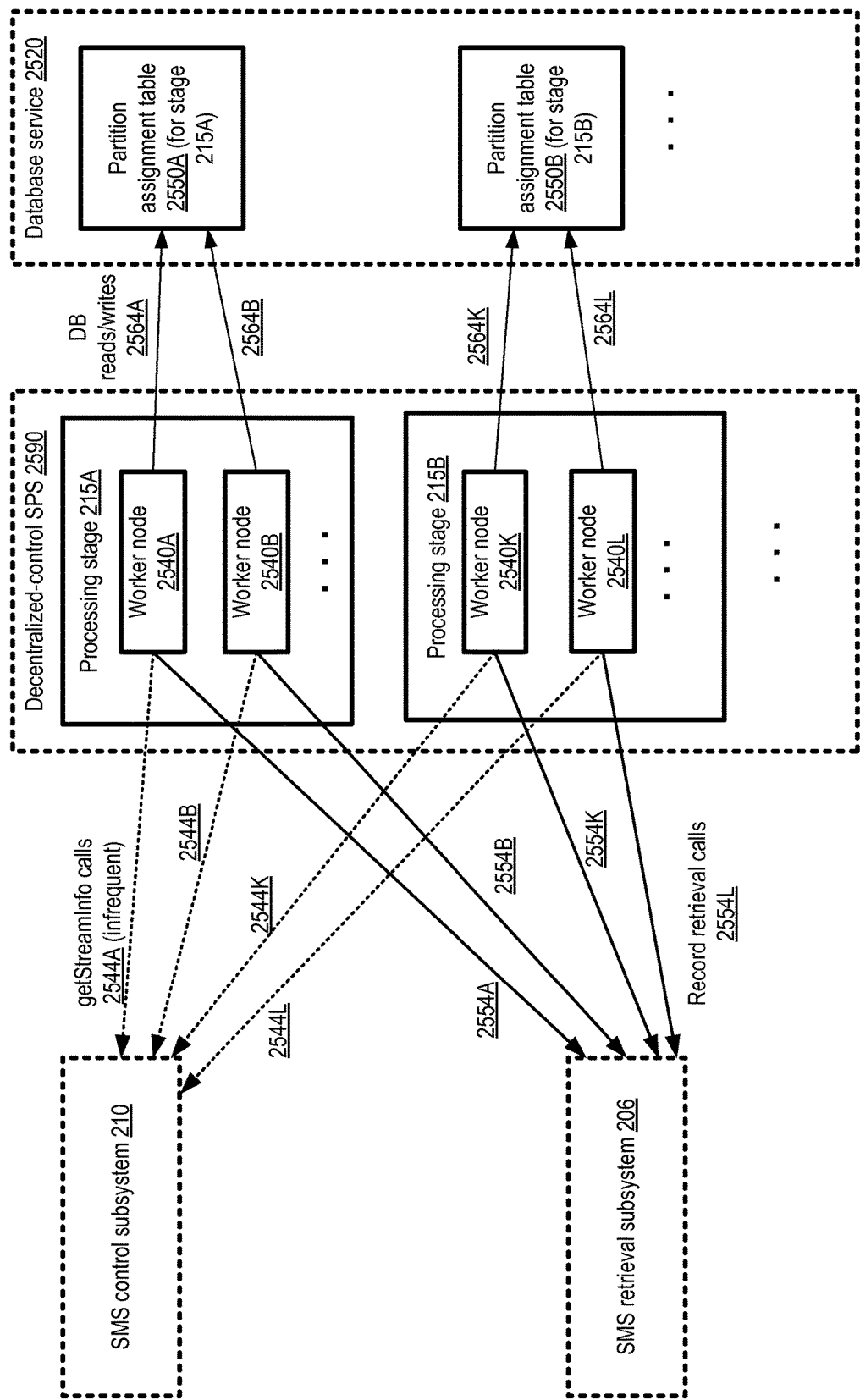
FIG. 25 illustrates an example of a stream processing system in which worker nodes of a processing stage coordinate their workloads using a database table, according to at least some embodiments.
Figure 26:
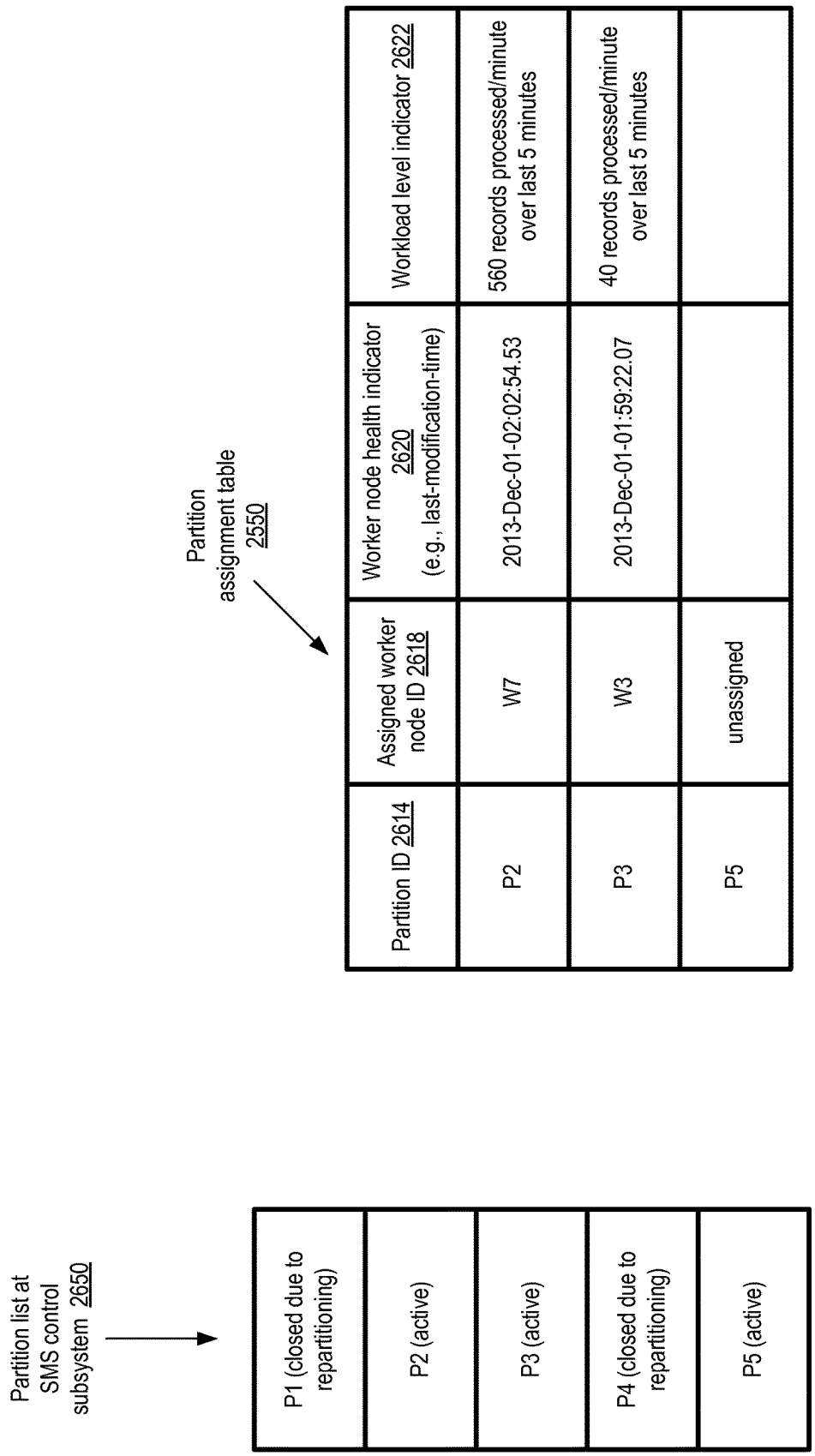
FIG. 26 illustrates example entries that may be stored in a partition assignment table used for workload coordination, according to at least some embodiments.

FIG. 25 illustrates an example of a stream processing system in which worker nodes of a processing stage coordinate their workloads using a database table, according to at least some embodiments. Within a decentralized-control SPS 2590, two stages 215A and 215B are defined, each with a respective set of worker nodes. Stage 215A comprises worker nodes 2540A and 2540B, while stage 415B comprises worker nodes 2540K and 2540L. For each stage 215A and 215B, a corresponding partition assignment (PA) table 2550 is created at a database service 2520, such as PA table 2550A for stage 215A and PA table 2550B for stage 215B. The PA table 2550 for a given stage may be created during stage initialization in some embodiments, e.g., in response to an invocation of a client library component or function. Each PA table 2550 may be populated with an initial set of entries or rows representing unassigned partitions of the input streams of the stage (i.e., partitions to which no worker node is currently assigned). Example columns or attributes of the PA table entries are shown in FIG. 26 and described below. The worker nodes 2540 (e.g., processes or threads launched at compute instances or other servers) that are launched for the stage may be granted read/write access to the stage's PA table. Reads and writes directed to the PA tables from the worker nodes are represented in FIG. 25 by arrows 2564A, 2564B, 2564K and 2564L for worker nodes 2540A, 2540B, 2540K and 2540L respectively.

A given worker node 2540 may be configured to select, by examining the entries in the PA table, a particular partition on which to perform the processing operations of the stage. In one implementation, the worker node 2540A may scan the entries in the PA table 2550A until it finds an entry of an unassigned partition Pk, and may attempt to assign the partition Pk to itself by updating the entry, e.g., by inserting the worker node's identifier into one of the columns of the entry. Such an insertion may be considered analogous to locking the partition by the worker node. Depending on the type of database service being used, different approaches to managing potentially concurrent writes to PA table entries (e.g., by two or more worker nodes that happen to identify an unassigned partition at close to the same time) may be used.

In one embodiment, a non-relational multi-tenant database service of a provider network may be used, which supports strong consistency and conditional write operations without necessarily supporting relational database transaction semantics. A conditional write operation may be used in such a case for the updates by the worker nodes. Consider an example in which a column "worker-node-ID" is used to indicate the identifier of the particular worker node assigned to a partition in the PA table, and that the column's value is set to "null" if no worker node is assigned to the partition. In such a scenario, a worker node with identifier WID1 may request the logical equivalent of the following: "if, in the entry for partition Pk, worker-node-ID is null, then set worker-node-ID for that entry to WID1". If such a conditional write request succeeds, the worker node with identifier WID1 may assume that partition Pk is assigned to it. The worker node may then start retrieving data records of partition Pk, e.g., using record retrieval interfaces of SMS retrieval subsystem 206, as indicated by arrows 2554 (e.g., arrows 2554A, 2554B, 2554K and 2554L for worker nodes 2540A, 2540B, 2540K and 2540L respectively), and performing the processing operations on the retrieved records. If the conditional write fails, the worker node may resume a search for a different unassigned partition. In other embodiments, database services (such as relational databases) that support transactions may be used, and the transaction functionality may be used to implement the equivalent of the conditional write operations—e.g., to ensure that only one of a plurality of concurrent (or near-concurrent) attempts to assign a partition to a worker node succeeds, and that the worker nodes involved in such concurrent attempts are reliably informed of their success or failure. Synchronization techniques that rely neither on conditional writes nor on transaction support may be used in some embodiments. In some implementations a database service may not be used; instead, a locking service may be used by the worker nodes to acquire exclusive access for updates to the entries in persistent data structures analogous to the PA tables.

Other worker nodes 2540 may examine the entries in the PA table, determine which partitions are unassigned, and may eventually succeed in assigning one or more partitions to themselves. In this way, the processing workload for the partitions of the stage's input stream or streams may eventually be distributed among themselves by the stage's worker nodes.

The initial partition mapping of any given stream may change over time, e.g., as a result of the dynamic repartitioning operations described earlier. Accordingly, in the embodiment depicted in FIG. 25, one or more of the worker nodes 2540 may occasionally (or in response to triggering conditions as described below) submit requests to the SMS control subsystem 210 of their stage's input stream(s) to obtain the current partition metadata. In some implementations, such requests may comprise invocations of SMS control plane APIs, such as the invocations of a getStreamInfo API indicated by arrows 2544A, 2544B, 2544K, and 2544L. The SMS control subsystem may, for example, respond with an up-to-date list of partitions of the stream, and/or other details such as the validity time periods of the partitions. If the partition information provided by the SMS control subsystem 210 does not match the entries in the PA table, the PA table may be modified by the worker node, e.g., by inserting or deleting entries for one or more partitions. Such requests 2554 to the SMS control subsystem may typically be much less frequent than the record retrieval requests 2554 (and/or the database read or write operations 2564) in at least some embodiments, as indicated by the label "infrequent" of arrow 2554A. For example, once it is assigned a partition, a worker node may typically keep retrieving and processing that partition's data records until the partition data is fully consumed (e.g. if the owner of the stream closes the stream, or if the partition is closed as a result of dynamic repartitioning), or until some other low-probability circumstance is encountered (e.g., if a different worker node requests a transfer of the partition due to detected load imbalance, as discussed below). Thus, the overhead associated with invoking the getStreamInfo or similar APIs may typically be quite small in various embodiments, even if a substantial amount of information is provided in response to any given invocation (as might be the case if hundreds or thousands of partitions are defined for a stage's input stream).

Some of the key workload-management operations of a decentralized-control SPS environment may thus be summarized as follows in the embodiment depicted in FIG. 25: (a) selecting, based at least in part on accessing a database table by a first worker node of a stream processing stage, a particular partition of an input data stream of the stream processing stage on which to implement a set of processing operations defined for that stage; (b) writing, into a particular entry stored in the table, an indicator of an assignment of the particular partition to the first worker node; (c) retrieving, by the first worker node, records of the particular partition using programmatic record retrieval interfaces implemented at a multi-tenant stream management service; (d) implementing, by the first worker node, the set of processing operations on the records of the particular partition; (e) determining, by a second worker node, based at least in part on the particular entry in the particular database table, that the first worker node is assigned to perform the set of processing operations on the particular partition; and (f) selecting, by the second worker node a different partition on which to perform the set of processing operations. If and when a worker node determines that no more records remain in a partition assigned to it, the worker node may request metadata on the input stream from the SMS control subsystem, and may update the PA table if the metadata indicates a discrepancy.

FIG. 26 illustrates example entries that may be stored in a partition assignment table 2550 used for workload coordination, according to at least some embodiments. As shown, table 2550 may comprise four columns: partition identifier column 2614, assigned worker node identifier column 2618, a worker node health indicator column 2620, and a workload level indicator column 2622. Other column sets may be implemented in other implementations—for example, a column that indicates a partition creation time or a partitioning function output value range may be used in some embodiments, or the workload level indicator column may not be used.

It is noted that the partition list 2650 maintained by the SMS control subsystem (e.g., as part of the partition entry tree, graph or other combined data structure described earlier) may, at least at some points in time, include more partitions than are included in the PA table 2550 in some embodiments. In the depicted example, the partition list 2650 includes partitions P1, P2, P3, P4 and P5, of which P1 and P4 are shown in a closed state as a result of repartitioning, while P2, P3 and P5 are shown as active (i.e., partitions whose data records are currently being retrieved and processed). The PA table 2650 includes entries for the active partitions in the depicted embodiment, and does not include entries for the closed partitions (which may have been deleted by worker nodes when they obtained responses to getStreamInfo invocations after the repartitioning took place, for example). At least in some implementations, not all the currently open partitions of the stream may necessarily have respective entries in the PA table at a given point in time; instead, for example, only a subset of those partitions that are currently assigned or being processed may be represented.

In the example scenario illustrated in FIG. 26, partitions P1 and P2 are assigned to worker nodes with identifiers W7 and W3 respectively, while P5 is currently unassigned. The health indicator column 2620 may store different types of values in different implementations. In some implementations, the worker nodes may be responsible for periodically (e.g., once every N seconds, or according to a schedule based on some set of heuristics) updating the contents of the health indicator columns in the PA entries of their assigned partitions to indicate that the worker nodes are active and able to continue their retrieval and processing operations. In FIG. 26, an indication of the most recent time that the worker node for that entry updated the health indicator column ("last-modified-time") may be stored—e.g., worker W7 is shown as having modified the entry at 02:24:54 and 53 seconds on Dec. 1 2013. Other worker nodes may use the last-modified time value to determine whether the assigned worker node is healthy or not in some embodiments—e.g., if X seconds or minutes have elapsed, as defined in a failover policy for the stage, the assigned worker node may be assumed to be unhealthy or inaccessible and the partition may be reassigned. In other implementations, a counter may be used as a health indicator (e.g., if the counter value has not changed in Y seconds, the assigned worker node may be deemed a candidate for failover), or a "last-read-time" value indicating when the assigned worker node last read the entry may be used.

Figure 27:
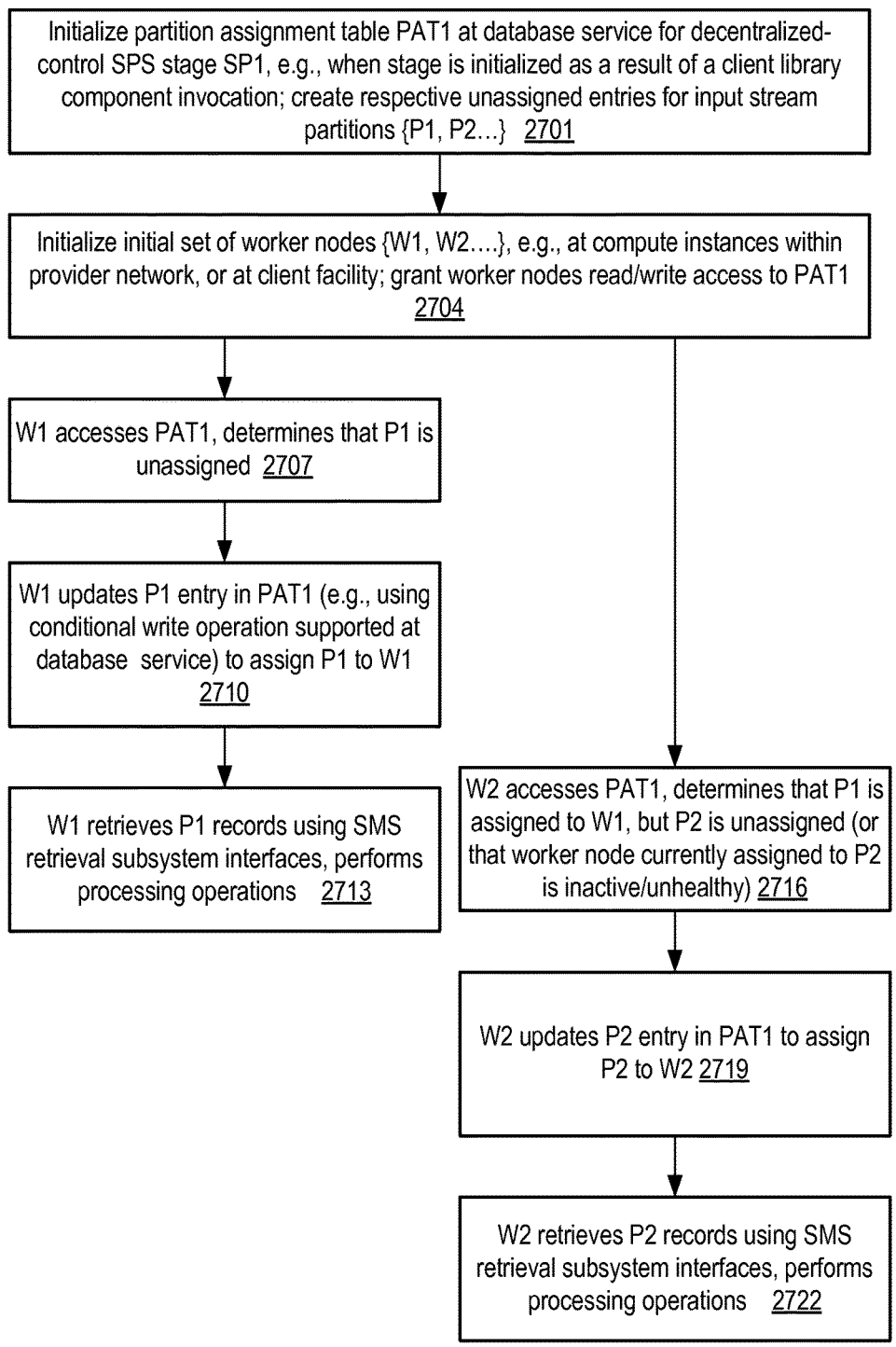
FIG. 27 illustrates aspects of operations that may be performed by worker nodes of a stream processing stage to select partitions on which to perform processing operations, according to at least some embodiments.

In at least some embodiments, a workload level indicator value 2622 may be stored in the entry, e.g., by the assigned worker node, such as the number of records processed during some recent time interval (e.g., in the five minutes prior to the last-modified-time), recent performance-related metrics of the worker node such as CPU utilization, memory utilization, storage utilization and the like. Such workload level indicator values may be used in some embodiments by the worker nodes to determine whether load imbalances exist, as described below with respect to FIG. 29, and to take actions in response to detected imbalances. For example, a worker node Wk may determine that its workload level is above the average workload level, and may un-assign one of its partitions, or may request a dynamic repartitioning; alternatively, the worker node Wk may determine that its workload is too low relative to that of other worker nodes or partitions, and may assign additional partitions to itself. Thus, using the columns of the PA table indicated in FIG. 26, worker nodes may perform some of the same types of control-plane functions in the depicted embodiment that may typically be performed by dedicated SPS control nodes in centralized-control SPS implementations FIG. 27 illustrates aspects of operations that may be performed by worker nodes of a stream processing stage to select partitions on which to perform processing operations, according to at least some embodiments. As shown in element 2701, a PA table PAT1 may be initialized at a database service for a decentralized-control SPS processing stage SP1. The table may be created, for example, when an SPS client library component is invoked, e.g., from a host at a client facility or from a compute instance at a provider network data center. The client library may be used for various purposes: for example, to provide an executable component such as a JAR (Java™ archive) file for the particular processing operations to be implemented at the SPS stage, to indicate a label (such as a program name, a process name or a compute instance name) that can be used to identify the worker nodes, to indicate the stream to be used as the input for the stage, to indicate the output destinations (if any) of the stage, and so on. PAT1 may initially be populated in some embodiments with entries or rows for at least a subset of the partitions {P1, P2, ... } defined for the input stream(s) of the stage. In some implementations, the table may be left empty initially, and one or more of the worker nodes may populate the table with rows for unassigned partitions, e.g., as a result of obtaining partition metadata from an SMS control subsystem. A initial set of worker nodes {W1, W2, ... } may be started up, e.g., at various compute instances within a provider network or at client-owned computing devices (element 2704). The worker nodes may be granted read and write access to PAT1 in the depicted embodiment.

As the worker nodes come online, they may each access PAT1 to try to find partitions that are unassigned. For example, worker node W1 may examine PAT1 and find that partition P1 is unassigned (element 2707). W1 may then update P1's entry in PAT1, e.g., using a conditional write request or a transactional update request depending on the type of database service being used, to indicate that P1 is assigned to W1 (element 2710). Having updated the table, W1 may initiate retrieval of data records of P1 using SMS retrieval subsystem interfaces (element 2713), and may perform the processing operations of the stage PS1 on the retrieved records.

Meanwhile, at some point in time, a different worker node W2 may access PAT1 in its own attempt to find unassigned partitions (element 2716). W2 may determine, based on W1's earlier update, that P1 is already assigned, but that a different partition P2 is not assigned. In some embodiments, a determination by W2 that the current assignee worker node of P2 is unhealthy or inactive (e.g., based on the health indicator column in P2's entry) may also lead W2 to select P2. Thus, in at least some embodiments, either an unassigned state, or a determination of an unhealthy state of a current worker node may be used to select a given partition for reassignment (or initial assignment). W2 may then attempt to update PAT1 to assign P2 to itself (element 2719). If the update succeeds, W2 may start retrieving P2 records using SMS retrieval interfaces (element 2722) and performing the appropriate processing operations defined for the stage.

Figure 28:
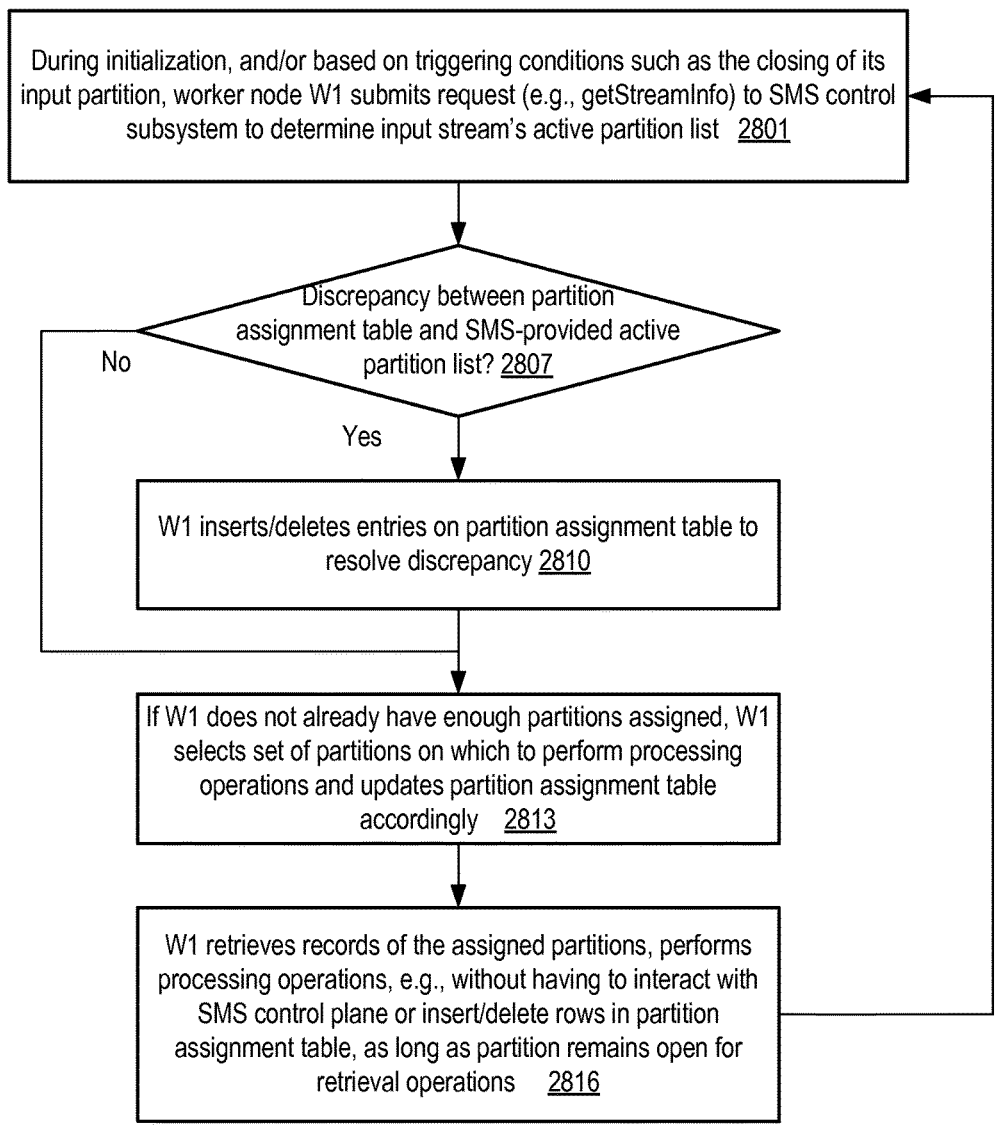
FIG. 28 illustrates aspects of operations that may be performed by worker nodes of a stream processing stage to update a partition assignment table based on information obtained from a stream management service control subsystem, according to at least some embodiments.

As mentioned earlier, the worker nodes in a decentralized-control SPS may (typically infrequently) obtain partition mapping information from the SMS, and use such information to update the PA table if necessary. FIG. 28 illustrates aspects of operations that may be performed by worker nodes of a stream processing stage to update a partition assignment table based on information obtained from a stream management service control subsystem, according to at least some embodiments. As shown in element 2801, during worker node initialization or in response to various triggering conditions such as the closing of one of the partitions assigned to it, a worker node W1 may submit a request to the SMS control subsystem to obtain the latest or current partition list, or the active partition list. In some implementations, a getStreamInfo or similar API may be invoked for this purpose. Other triggering conditions may be used in some embodiments: e.g., the worker nodes may each be configured to obtain fresh partition lists after random amounts of time, or in response to unexpected drops or increases in workload levels. The partition list returned by the SMS may be compared with the entries in the PA table for the partition (element 2807). If a discrepancy is found (e.g., if there is some partition in the freshly-obtained partition list that is not in the PA table, or if there is an entry in the PA table that is not in the SMS's list), the worker node may insert or delete entries in the PA table to resolve the discrepancy in the depicted embodiment (element 2810). (Additional coordination may be required if an entry that is targeted for deletion currently has an assigned worker node in some implementations—e.g., the assigned worker node may be notified, either directly or via the PA table itself.)

After the discrepancy is rectified, or if no discrepancy was detected, the worker node W1 may select a set of partitions on which it should perform the stage's processing operations (element 2813), and may update the PA table accordingly. In some cases, depending on the triggering condition that led to the partition list being retrieved, W1 may already have one or more partitions assigned to it, and may not need to make changes to its assignments or update the PA table. W1 may then proceed to retrieve the data records of its assigned partition or partitions, and process the records, without having to interact with the SMS control subsystem or changing the number of entries in the PA table (element 2816). Eventually, when a triggering condition is detected (e.g., when the equivalent of an "end of partition reached" response is received to a retrieval request, indicating that the a partition is closed), W1 may again send a request to the SMS control subsystem for fresh partition information, and the operations of elements 2801 onwards may be repeated.

Figure 29:
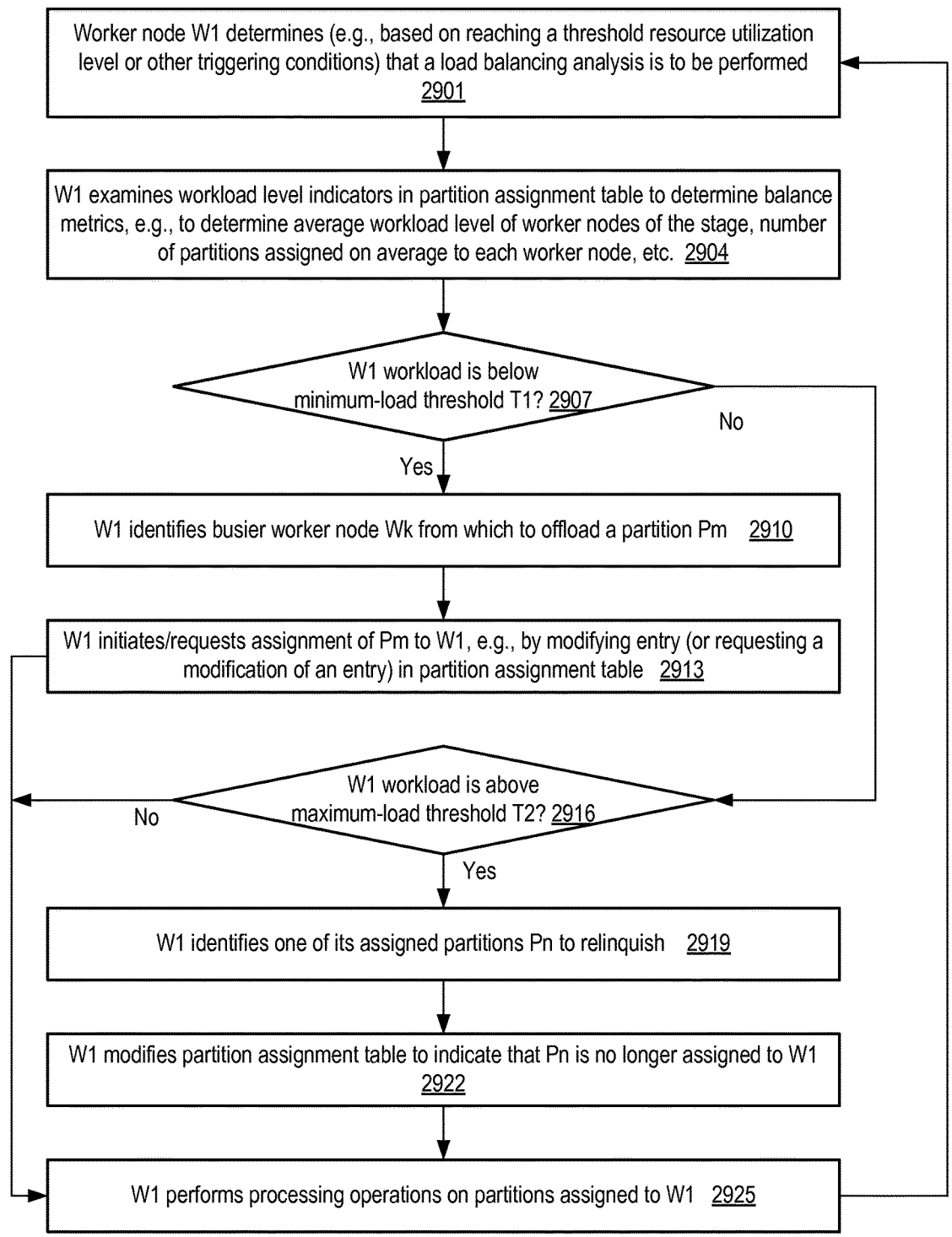
FIG. 29 illustrates aspects of load balancing operations that may be performed by worker nodes of a stream processing stage, according to at least some embodiments.

FIG. 29 illustrates aspects of load balancing operations that may be performed by worker nodes of a stream processing stage, according to at least some embodiments. As shown in element 2901, a worker node W1 may determine that a load balancing analysis is to be performed on its stage upon a detection of any of a variety of triggering conditions, such as a detection of a high resource utilization level, or based on a configurable schedule. W1 may examine the entries in the PA table (element 2904) to determine various workload metrics for the stage. Such metrics may include the average number of partitions assigned to worker nodes, the average workload level of the worker nodes or of different partitions (in embodiments in which workload level indicators are saved in the table), a range or distribution of the per-worker-node workload, and so on.

W1 may then compare its own workload (based for example on the number of partitions assigned to W1, and/or the per-partition workload level indicators) to some or all of the metrics. In general, any of three types of conclusions may be drawn: that W1 is overloaded, that W1 is underloaded, or that W1's workload is neither too high nor too low. Workload levels that are "too high" or "too low" may be defined by policies selected by the clients on whose behalf the stage is configured in some embodiments, or using some default set of heuristics in other embodiments. If W1 determines that its workload is too low (element 2907), e.g., below some minimum-load threshold T1, a busier or more highly-loaded worker node Wk may be identified (element 2910). W1 may then initiate a process of transferring one or more partitions Pm from Wk to itself (element 2913), e.g., by attempting to modify the Pm entry in the PA table, requesting such a modification (which may result in a notification being generated for Wk), or by requesting Wk directly.

If W1 determines that its workload is too high (element 2916), e.g., above a maximum-threshold T2, it may identify one or more of its assigned partitions Pn to relinquish (i.e., to release for assignment by other worker nodes) (element 2919). W1 may then modify the appropriate entries in the PA table, e.g., by removing its identifier from the assignee column of the entry for Pn (element 2922). If W1's workload was neither too high nor too low, or after W1 has taken the kinds of actions described above to increase or decrease its workload, W1 may resume processing records of the partitions to which it is assigned (element 2925). Operations corresponding to elements 2901 onwards may be repeated when and if conditions triggering another load balancing analysis are met. It is noted that in the operations illustrated in FIG. 29, W1 is shown as initiating workload changes only when it detects an imbalance with respect to its own workload. In other embodiments, W1 may initiate rebalancing actions if it detects imbalances among other worker nodes than itself—e.g., if it determines that W2 has a much lower workload level than W3. In some implementations, W1 may request or initiate dynamic repartitioning (e.g., by invoking a repartitionStream SMS API such as that shown in FIG. 3, or its equivalent) if and when it detects workload imbalances. In some embodiments, the kinds of operations illustrated in FIG. 29 may be performed by a newly-configured worker node—e.g., when new nodes are added to a stage after the stage has already been in operation for some time, the new nodes may indirectly notify the existing nodes of their presence by requesting reassignment of partitions from heavily loaded existing nodes. In some embodiments, decentralized control techniques similar to those described above for SPS worker nodes may also or instead be used at one or more SMS subsystems, e.g., the nodes of the ingestion, storage or retrieval subsystems may coordinate their workloads using shared data structures similar to the PA tables.

Partition Level De-Duplication at SMS Ingestion Nodes

For some types of stream applications, clients may prefer that if the same data is submitted more than once by a data producer, the SMS should recognize and eliminate duplicates. In large scale streaming environments in which hundreds or thousands of data producers submit their data records over network paths with potentially varying levels of reliability and varying transfer latencies, a given data producer may end up submitting the same data again if, for example, a timely acknowledgement is not received for a previous submission. If the SMS is able to detect and remove duplicates, less storage may be used for the stream as a whole, and data consumers (such as SPS applications) may not have to devote resources to de-duplication. A number of different approaches to de-duplication at one or more SMS subsystems may be taken in different embodiments.

Figure 30:
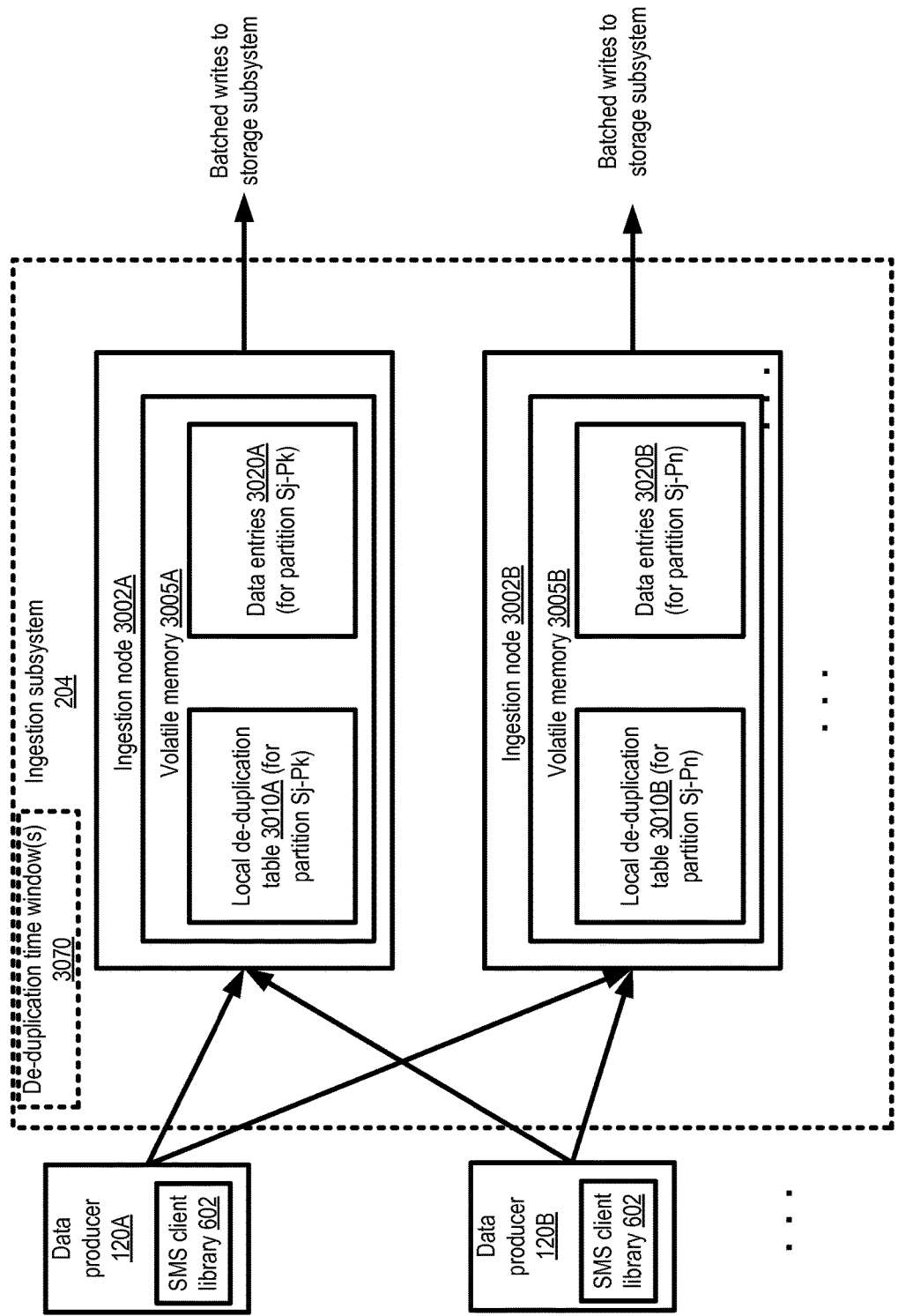
FIG. 30 illustrates aspects of a decentralized de-duplication mechanism that may be employed at the ingestion subsystem of a stream management system, according to at least some embodiments.

As indicated above, a number of SMS ingestion nodes may be configured to receive stream data records in accordance with various stream partitioning policies in some embodiments. FIG. 30 illustrates aspects of a decentralized de-duplication mechanism that may be employed at the ingestion subsystem of a stream management system, according to at least some embodiments. The mechanism may be considered decentralized in that duplicate detection and elimination may be performed at a per-partition granularity, without having to access stream-wide data structures. As shown, ingestion subsystem 204 may comprise ingestion nodes 3002 (e.g., 3002A and 3002B), each responsible for handling data submission requests for one or more partitions of one or more streams submitted by data producers 120 (e.g., 120A or 120B) using SMS client library 602. For example, ingestion node 3002A may be responsible for handling submissions of at least partition Sj-Pk (the kth partition of stream Sj) in the depicted embodiment, while ingestion node 3002B may be configured to receive data records of at least partition Sj-Pn (the nth partition of stream Sj). Both data producers may submit data belonging to any partition in the depicted embodiment.

Each of the ingestion nodes 3002 may instantiate one or more local de-duplication tables 3010, e.g., local de-duplication table 3010A for partition Sj-Pk at node 3002A, and local de-duplication table 3010B for partition Sj-Pn at node 3002B. Each local de-duplication table may include respective de-duplication signature entries for some number of data records of the corresponding partition. Since the data records of a given partition would always be directed to the same ingestion node in accordance with the stream's partitioning policy (at least in the absence of failovers, which may be dealt with by reconstructing de-duplication tables at newly-configured replacement ingestion nodes as described below) in the depicted embodiment, the local de-duplication tables 3010 may generally suffice for duplicate detection, and a centralized repository of de-duplication information is not required. Different types of de-duplication signatures may be employed in various implementations to efficiently detect duplicate submissions. A de-duplication signature may, for example, comprise a result of a function applied to at least a portion of the data indicated by a data producer in a given submission request, or a result of a function applied to a de-duplication key included in a submission request. In at least one embodiment, data producers 120 may simply include a de-duplication signature as an element of a submission request, and the supplied signature may be stored in the de-duplication table. In order to check whether a submission request comprises duplicate data, the ingestion node 3002 may check whether the signature corresponding to the request is already present in the local de-duplication table 3010 (subject to certain caveats with respect to de-duplication time windows or session-specific high-water-marks, as described below). If the signature is present, and if the previously-submitted data record with the same signature has been saved at the SMS storage subsystem, the submission request may be rejected as a duplicate. If the signature is not found in the local de-duplication table 3010, a corresponding data entry 3020 for the data submitted by the data producer may be generated and (either immediately or eventually, as part of a batched write) written to the storage subsystem of the SMS. De-duplication signatures (e.g., part or all of the entries of the local de-duplication tables) may also be written to the storage subsystem, e.g., as part of the sequence records described below or separately from the sequence records. As also described below, the saved de-duplication signatures may be used during recovery in the event of a failure of an ingestion node. In some embodiments, a log of the write requests (and/or other requests) submitted by the ingestion nodes to the storage subsystem may be maintained at a different storage location (or locations) than the sequence records. In some such embodiments, de-duplication signatures may be saved as part of such a log instead of being saved together with the sequence records. The separate log may be used to reconstruct de-duplication tables subsequent to a replacement of a failed or unreachable ingestion node, instead of having to extract the de-duplication signatures from the SMS storage subsystem. In at least some embodiments, the data entries 3020 (e.g., data entries 3020A and 3020B at ingestion node 3002A and 3002 respectively) may be written in batches rather than individually to the storage subsystem, thus reducing the number of network transfers needed and also allowing more of the data to be written using efficient sequential write operations. It is noted that in embodiments in which a layered architecture similar to that shown in FIG. 6 is used for the ingestion subsystem 204, the ingestion nodes 3002 that perform de-duplication operations may correspond to the back-end nodes 608 of FIG. 6.

In at least some implementations, the local de-duplication tables 3010 (and/or the data records 3020) may be stored in volatile memory 3005 (e.g., volatile memory 3005A and volatile memory 3005B) at the ingestion nodes 3002—e.g., in portions of the main memories of respective computing devices being used for the ingestion nodes. Maintaining de-duplication signatures within fast main memory may help reduce the time taken to perform de-duplication checks (e.g., relative to implementations in which disk-based storage is used for the de-duplication tables) in such embodiments.

Several approaches may be used to limit the amount of the de-duplication metadata that has to be stored at any given time at an ingestion node. In one embodiment, de-duplication time windows 3070 may be defined for various data streams, which enable the ingestion nodes to reject submission requests that are "too old" according to the time windows. For example, for at least some stream S1, the local clocks at data producers 120 and the ingestion nodes 3002 may be assumed to be at least loosely synchronized, and each data submission request SR may indicate a corresponding submission time ST from the perspective of the data producer. When an ingestion node receives SR at a receive time RT (with RT being determined using the ingestion node's clock), the difference (RT-ST) may be computed. If the difference exceeds a de-duplication time window DTW1 defined for S1 (or at least for the partition to which the data submission is directed), the submission may be rejected as "stale", without checking the local de-duplication table. If the difference does not exceed the de-duplication time window, the de-duplication table may be checked to ascertain whether the submission is a duplicate, and the submission may still be rejected if it is a duplicate; otherwise, if it is not deemed a duplicate, the submission may be accepted Thus, in such an embodiment, the ingestion nodes may in effect be required to store de-duplication signatures only for records received within the applicable de-duplication time window 3070, and may be able to prune or discard older signatures. In this way, the amount of memory or storage that has to be used for the local de-duplication tables 3010 may be kept within reasonable limits. The de-duplication time windows 3070 may be defined at different granularities in different embodiments—e.g., a single window may be used by default for all streams, respective windows may be defined for different streams, or respective windows may be defined for respective partitions. In some implementations, the de-duplication time windows 3070 may be set to a few hours, e.g., to encompass the time it may take a given failed data producer to be restarted and complete recovery operations. The durations of the de-duplication time windows may also be estimated based on other factors in some embodiments, such as the size of main memory available for the de-duplication tables at ingestion nodes 3002, the sizes of the de-duplication signatures, the expected rate of submissions, and so on. In embodiments in which de-duplication time windows 3070 are used, the de-duplication tables may be pruned (i.e., entries that were stored at a time that no longer lies within the time window, as measured from the current time, may be removed) using one or more asynchronous cleaner processes or threads. In some embodiments, in addition to or instead of using de-duplication time windows 3070, per-session sequence numbers may be used to prune local de-duplication tables 3010, as described below in the context of FIG. 32.

Figure 31:
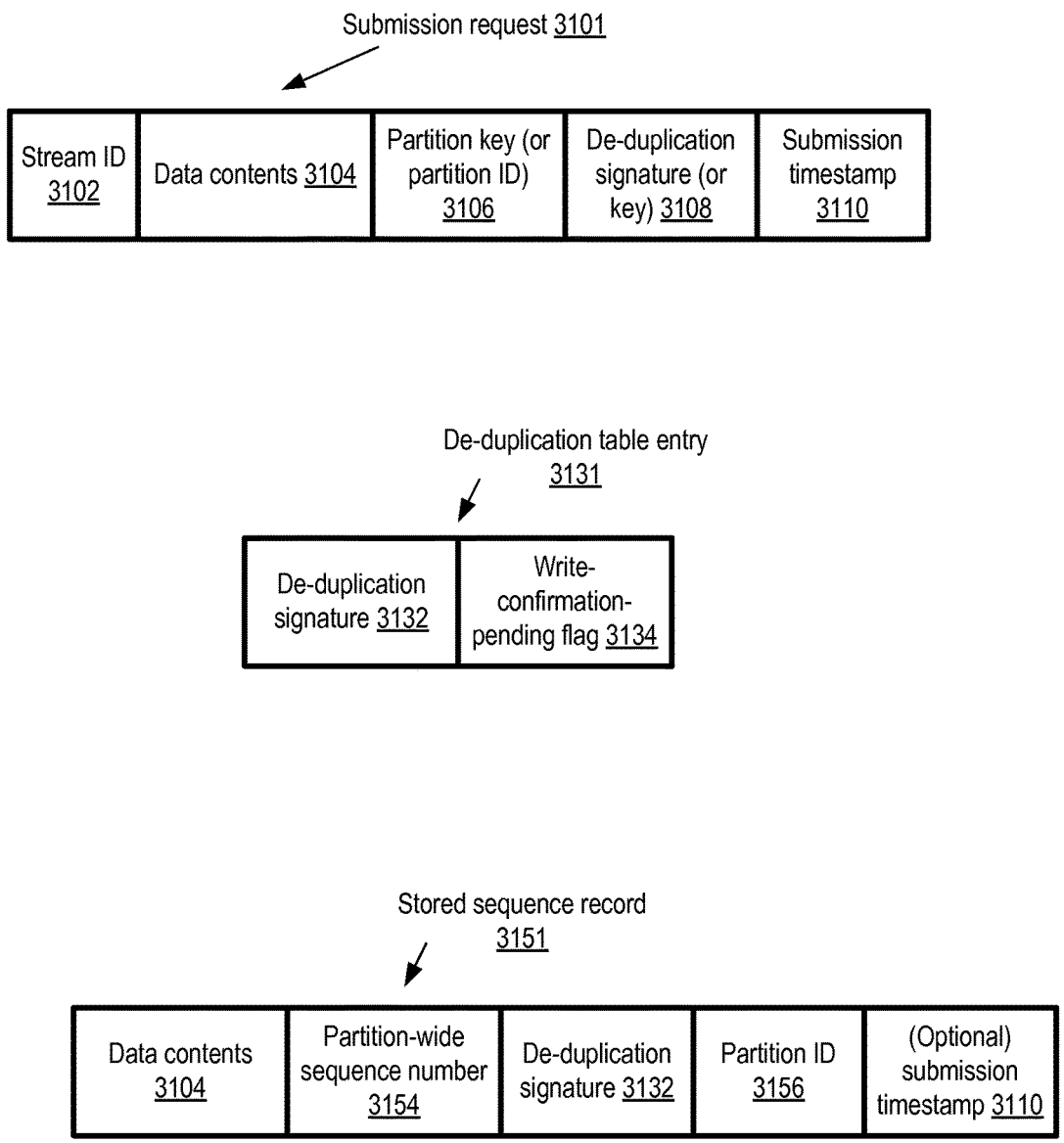
FIG. 31 illustrates example constituent elements of data record submission requests, entries of local de-duplication tables, and sequence records that may be stored in a stream management system in which a decentralized de-duplication mechanism is employed, according to at least some embodiments.

In the event that a given ingestion node 3002 fails or is no longer reachable, in at least some embodiments a replacement ingestion node may be configured, e.g., by a control server of the SMS. In embodiments in which local de-duplication tables 3010 are maintained in volatile memory 3005, the replacement ingestion node may be required to retrieve de-duplication metadata from persistent storage and construct its own local de-duplication table, e.g., as part of recovery operations corresponding to the failure. If a de-duplication time window 3070 is defined for the partition for which the replacement ingestion node is responsible, only those de-duplication signatures for records received within the de-duplication time window may have to be read to populate the local de-duplication table FIG. 31 illustrates example constituent elements of data record submission requests, entries of local de-duplication tables, and sequence records that may be stored in a stream management system in which a decentralized de-duplication mechanism is employed, according to at least some embodiments. Sequence records may comprise the data contents of stream as well as metadata useful for retrieving the data contents (e.g., in sequential order) and for recovery purposes. A data record submission request 3101 may comprise a stream identifier 3102 and the data 3104 to be ingested (e.g., either in-line data, or a pointer to the data such as a URL or a storage device address). In some embodiments, a partition key or a partition identifier 3106 may be included. At least in some embodiments, a de-duplication signature 3108 or a de-duplication key, and/or a submission timestamp 3110 (e.g., based on a clock at the data producer) may be indicated in the submission request 3101 as well. If the data producer provides a de-duplication key rather than a de-duplication signature, the ingestion node 3002 may apply some function (such as a hash function with an appropriate set of statistical properties) to the de-duplication key to determine a signature for the data submitted. In some embodiments, a data producer 120 may supply neither a de-duplication key nor a de-duplication signature; instead, the ingestion node 3002 may select some portion or all of the data 3104 as a de-duplication key and use the output of the function as the de-duplication signature. The submission timestamp 3110 may be used by the ingestion node to perform a preliminary check (e.g., before checking a local de-duplication table 3010) to determine whether a submission request falls within a de-duplication time window 3070. If the submission timestamp 3110 lies outside the de-duplication time window (e.g., if the timestamp indicates a submission time ST, the current time at the ingestion node is CT and the window is W, and (CT-ST)>W), the submission request may be rejected by the ingestion node in those embodiments in which de-duplication time windows are used.

If the submission is not stale, a de-duplication table entry 3131 may be added to the local de-duplication table 3010 in the depicted embodiment. The entry 3131 may include a de-duplication signature 3132 of the data as well as a "write-confirmation-pending" flag 3134 in some embodiments. The write-confirmation-pending flag 3134 of an entry 3131 may be set (e.g., to "True") at the time that a write request for the corresponding data contents is transmitted to the SMS storage subsystem. Depending on the data durability or replication policy in effect for the partition, it may take some time for the data to be saved at the appropriate storage locations (e.g., multiple replicas of the data may be stored in a sequential manner at different storage nodes located in respective data centers, as described below with respect to FIG. 35). Until a confirmation is received from the storage subsystem that the write has been committed or completed successfully at the required number of storage locations (or until an indication is received that the write could not be committed successfully at the required number of storage locations and hence should be deemed to be aborted or failed), the write-confirmation-pending flag may remain set. If a confirmation is received that the write succeeded, the write-confirmation-pending flag 3134 may be unset (e.g., set to "False"). If the write fails, and a duplicate submission was not received for the same data contents in the interim, the entry 3131 may be deleted from the de-duplication table.

If a duplicate submission is received while the write-confirmation-pending flag is set, the duplicate submission may be queued in some embodiments, e.g., a decision as to whether the submission should be rejected as a duplicate or not may be deferred until the response to the write request is received from the storage subsystem. If the write eventually succeeds, the duplicate request may be rejected; if the write eventually fails, the duplicate submission may be treated as though it were a new submission—e.g., a write request may be submitted and the write-confirmation-pending flag may remain set.

FIG. 31 also illustrates one example of the constituent elements of a sequence record 3151 as stored in the storage subsystem of the SMS. Sequence record 3151 may include, in addition to the data 3104 submitted by the data producer 120, a partition-wide (or stream-wide) sequence number 3154 in the depicted embodiment (e.g., similar to sequence number 102 of FIG. 13*b*), as well as a partition identifier 3156. In some implementations, the de-duplication signature 3132 of the data and/or the submission timestamp 3110 may also be stored as part of the sequence record 3151. In other implementations, the de-duplication signature may be stored separately (e.g., in a log of ingestion node operations as described above), or may not be stored at all (but may be reconstructed from the data 3104 if and when it is needed). The submission timestamps may be used in some embodiments to retrieve the appropriate set of de-duplication signatures during recovery after a failure of an ingestion node. For example, only those de-duplication signatures that correspond to submission timestamps within a de-duplication time window relative to the time of the failure may be retrieved from the storage subsystem to reconstruct a local de-duplication table at a replacement ingestion node.

Figure 32:
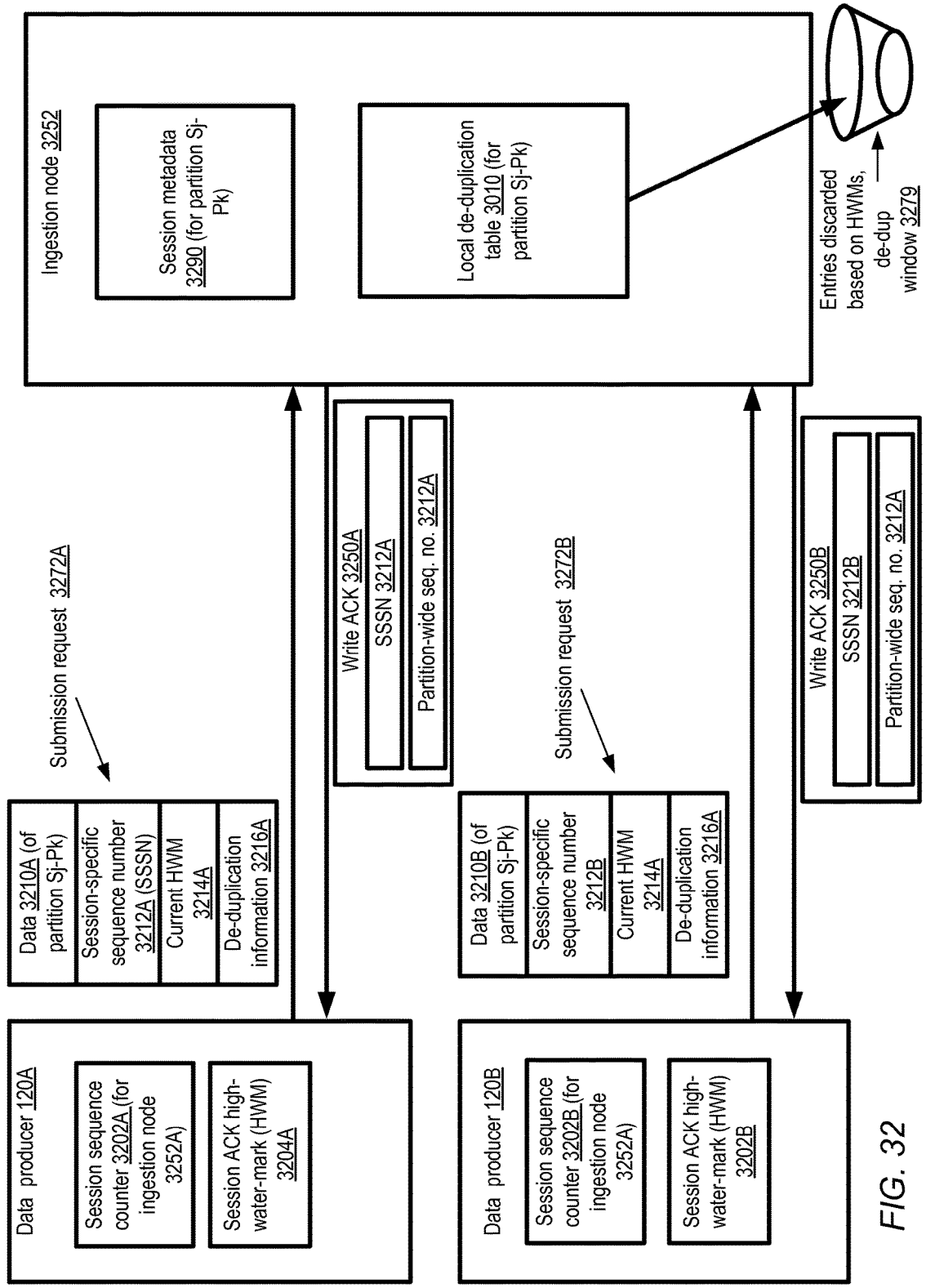
FIG. 32 illustrates examples of interactions between data producers and ingestion nodes of a stream management system in which session-specific sequence numbers are used to prune local de-duplication tables, according to at least some embodiments.

As described above, de-duplication time windows 3070 may be used to control the amount of de-duplication metadata that has to be maintained at ingestion nodes in some embodiments, and also to limit the recovery time after a failure or replacement of an ingestion node. In one embodiment, another technique involving session-specific sequence numbers (SSSNs) (different from the partition-wide sequence numbers 3154 or 102 discussed earlier) may be used for further space optimizations with respect to de-duplication tables. Session-specific sequence numbers may be used either in combination with, or independently of, de-duplication time windows in various embodiments. FIG. 32 illustrates examples of interactions between data producers and ingestion nodes of a stream management system in which session-specific sequence numbers are used to prune local de-duplication tables, according to at least some embodiments.

In the embodiment shown in FIG. 32, the communications between a given data producer 120 and a given ingestion node 3252 with respect to a given partition may be designated a "client session". Thus, a client session may typically be uniquely identifiable by a triplet: (data producer, partition, ingestion node). Within a client session, a session-specific sequence number (SSSN) 3212 may be assigned by the data producer 120 for each data submission request 3272, e.g., using a monotonically increasing integer session counter 3202 or some similar technique. In addition, each data producer may maintain an acknowledgement high-water-mark (HWM) 3204 for each of its sessions, indicating the highest SSSN for which a write acknowledgement has been received. The SSSN 3212 may be included in the submission request 3272. The write acknowledgements 3250 returned to the data producer 120 by the ingestion node 3252 may also indicate the SSSN of the acknowledged submission request.

For example, data producers 120A and 120B transmit submission requests 3272A and 3272B respectively to ingestion node 3252, comprising data 3210A and 3210B respectively, to be added to stream partition Sj-Pk. The submission requests include a respective SSSN 3212 (e.g., 3212A and 3212B for data producers 120A and 120B generated using counters 3202A and 3202B respectively), and respective de-duplication information entries 3216 (such as submission timestamps and/or de-duplication signatures or keys 3216A and 3216B). In addition, the submission requests also include respective current high-water-marks (HWMs) 3214 (e.g., HWM 3214A in submission request 3272A, derived from HWM 3204A, and HWM 3214B in submission request 3272B derived from HWM 3204B) that indicate the highest SSSN for which the data producer has received an acknowledgement from the ingestion node 3252 at the time that the submission request is transmitted. The write acknowledgements 3250 (e.g., 3250A and 3250B) transmitted to the data producers 120 by the ingestion node 3252 include the SSSNs of the submissions being acknowledged, which may be used by the data producers 120 to update the values of their respective HWMs 3204. In addition, in the depicted embodiment, the acknowledgements 3250 may also include the partition-wide sequence numbers 3212 (e.g., 3212A and 3212 in acknowledgements 3250A and 3250B) that are generated based on the order (within the partition Sj-Pk as a whole, not just within a given client session) in which the data submission requests are received by the ingestion subsystem. Thus, the write acknowledgements may include two different independent sequence numbers—a session specific sequence number and a partition-wide sequence number—in the depicted embodiment.

The inclusion of the current HWM 3214 in the submission request may allow the ingestion node to delete entries from its de-duplication table 3010 more aggressively than if just a de-duplication time window were being used. The ingestion node may maintain its own session related metadata 3290 for partition Sj-Pk, indicating for example how many data producers 120 have ongoing sessions, and the most recent session HWMs received from each such data producer. The data entries stored by the ingestion node 3252 may also have session-identifying information. The ingestion node may use the current HWM values provided in a submission request from a particular data producer 120 to identify entries (a) generated by the same session and (b) with lower SSSNs than the current HWM value. An assumption underlying the SSSN-based technique is that since the data producer has already received acknowledgements for submissions with SSSNs lower than the HWM, the probability of the data producer submitting corresponding duplicate submissions is extremely low (or zero). Such entries may therefore be discarded from the local de-duplication table 3010, as indicated by arrow 3279. In embodiments in which the SSSN technique is used together with de-duplication time windows, entries may still be pruned from the local de-duplication table on the basis of the time windows as well. In various implementations, the more aggressive pruning permitted by the use of SSSNs may result in much smaller de-duplication tables on average, and may therefore help speed up de-duplication checks and recovery operations as well.

In at least some embodiments, the ingestion node may utilize the SSSNs to provide additional feedback via the write acknowledgements to the data producers regarding "missing" data record submissions, e.g., submissions that may have been dropped or damaged during transit to the ingestion node over a network. Consider the following example scenario in which the SSSNs of a given session are implemented as consecutive integer values: an ingestion node 3252 maintains, corresponding to each data producer, a data structure (such as a bitmap or bit array) in which it keeps track of some number (e.g., 64 or 256) of most recent submission requests from that data producer 120. When the ingestion node 3252 receives a new submission request 3272 from that data producer with a current HWM value "H1" and an SSSN value "S1", the ingestion node 3252 may quickly be able to tell, using the data structure, the specific SSSNs (if any) between H1 and S1 for which corresponding submission requests have not yet been received at the ingestion node. The ingestion node 3252 may then include a list of such "missing" submission requests within the write acknowledgement 3250 sent for the submission with SSSN S1. Such a "missing" submission request list may be used by the data producer to re-submit the missing requests.

Figure 33:
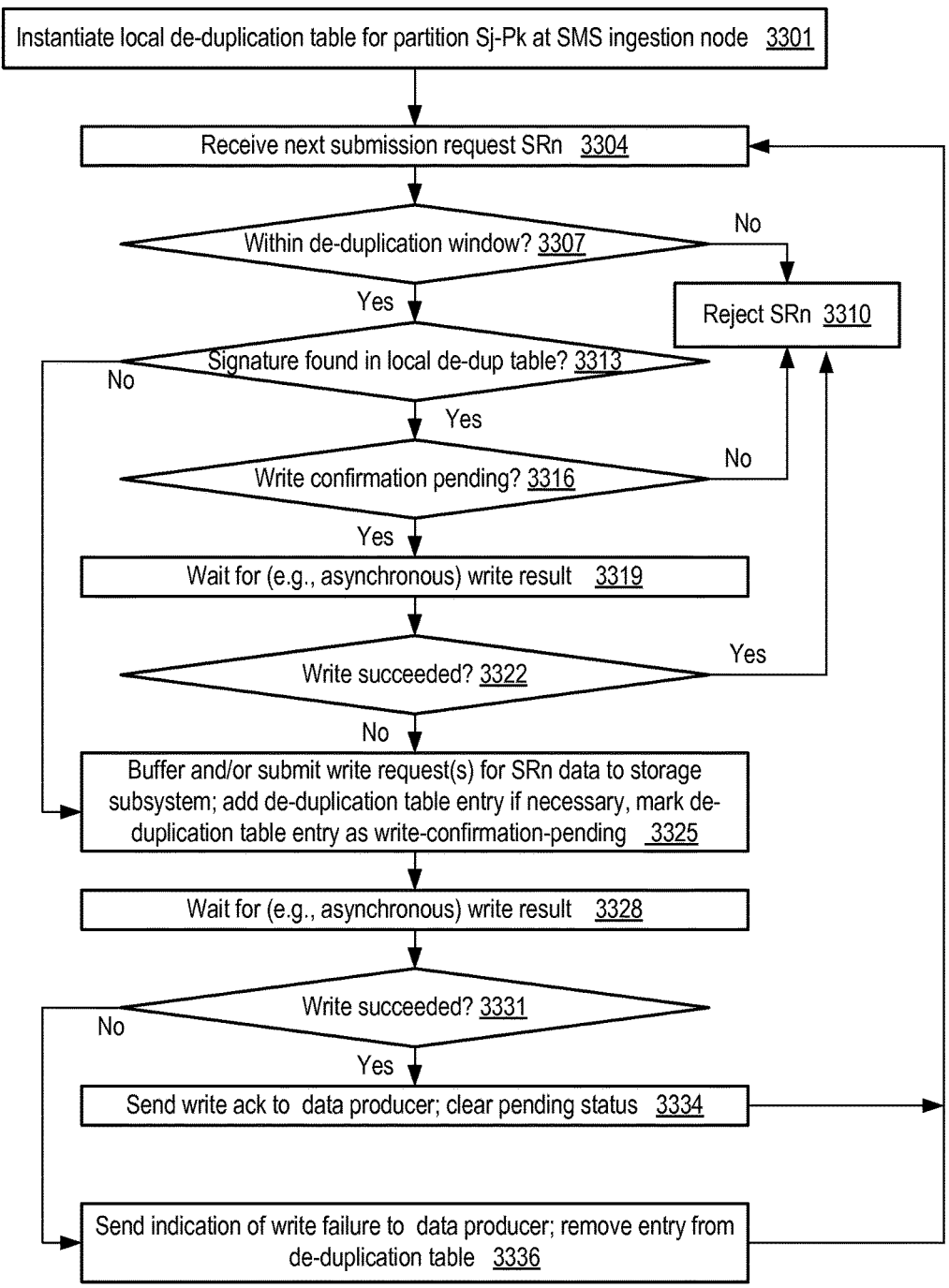
FIG. 33 is a flow diagram illustrating aspects of operations that may be performed to implement a decentralized de-duplication mechanism at a stream management system, according to at least some embodiments.

It is noted that in at least some embodiments, a lower-level protocol (such as TCP/IP (the Transmission Control Protocol/Internet Protocol)) that also uses sequence numbers may be used for responding to packet loss at a per-network-connection level, e.g., by retransmitting lost packets. However, such low-level protocols would not be aware of stream records or stream semantics, and would therefore typically not be particularly useful in reducing the space requirements associated with local de-duplication in a manner analogous to the SSSN-based technique, or in providing feedback to data producers about which specific recent submission requests are "missing" as described above FIG. 33 is a flow diagram illustrating aspects of operations that may be performed to implement a decentralized de-duplication mechanism at a stream management system, according to at least some embodiments. A local de-duplication table may be instantiated for respective partitions assigned to each of a plurality of ingestion nodes of a multi-tenant stream management system. As shown in element 3301, such a local de-duplication table may be instantiated for a particular partition Sj-Pk at a particular ingestion node. When the next submission request SRn is received (element 3304), the ingestion node may first check whether the submission time (e.g., indicated by a timestamp based on the data producer's clock and included in SRn) falls within a de-duplication time window with respect to the current time at the ingestion node. If the submission time is outside the de-duplication time window (as indicated by the "No" outcome of the test represented by element 3307), the submission request SRn may be rejected (element 3310) in the depicted embodiment.

If the submission time lies within the de-duplication window (as indicated by the "Yes" outcome of the test indicated by element 3307), the ingestion node may proceed to perform further tests on SRn. If the local de-duplication table at the ingestion node does not contain an entry with a de-duplication signature matching that of SRn (the "No" outcome of element 3313), SRn may be deemed a new request (i.e., not a duplicate). Accordingly, a de-duplication table entry with SRn's de-duplication signature and a write-confirmation-pending flag set to "True" may be added to the local de-duplication table. A write request (or multiple requests, depending on the persistence/replication policies in effect for Sj-Pk) may be submitted to the SMS storage subsystem by the ingestion node (element 3325). In some cases the write request may be buffered instead of being sent immediately, e.g., to achieve greater efficiencies in transmitting data to the storage subsystem and/or in writing the data at the storage subsystem using sequential write operations.

If an entry with SRn's de-duplication signature is found in the local de-duplication table (in operations corresponding to element 3313), the write-confirmation-pending flag for the entry may be examined (element 3316). If the flag value indicates that the write is confirmed (e.g., if the flag is set to "False"), SRn may be rejected as a duplicate (element 3310). If the flag value indicates that the write is not yet confirmed (e.g., if it is set to "True"), the ingestion node may queue SRn and wait for the (asynchronous) result of the write request before deciding whether to reject or accept SRn (element 3319). If the write eventually is confirmed, as detected in operations corresponding to element 3322, SRn may be rejected. If the write fails (as also detected in element 3322), SRn may be accepted as the equivalent of a new, non-duplicate submission, and operations corresponding to element 3325 may be performed. (There may be no need to add an entry to the de-duplication table in this scenario; instead, the existing entry corresponding to the earlier request whose write did not succeed may be re-used in at least some implementations.)

The ingestion node may wait for the result of the write request to the storage subsystem, corresponding to the non-duplicate submission request (element 3328). If the write succeeds (as detected in element 3331), an acknowledgement may be sent to the data producer (element 3334) and the write-confirmation-pending flag may be reset to "False". If the write fails, in at least some embodiments an indication of the failure may be provided to the data producer (element 3337) and the de-duplication table entry may be deleted.

Figure 34:
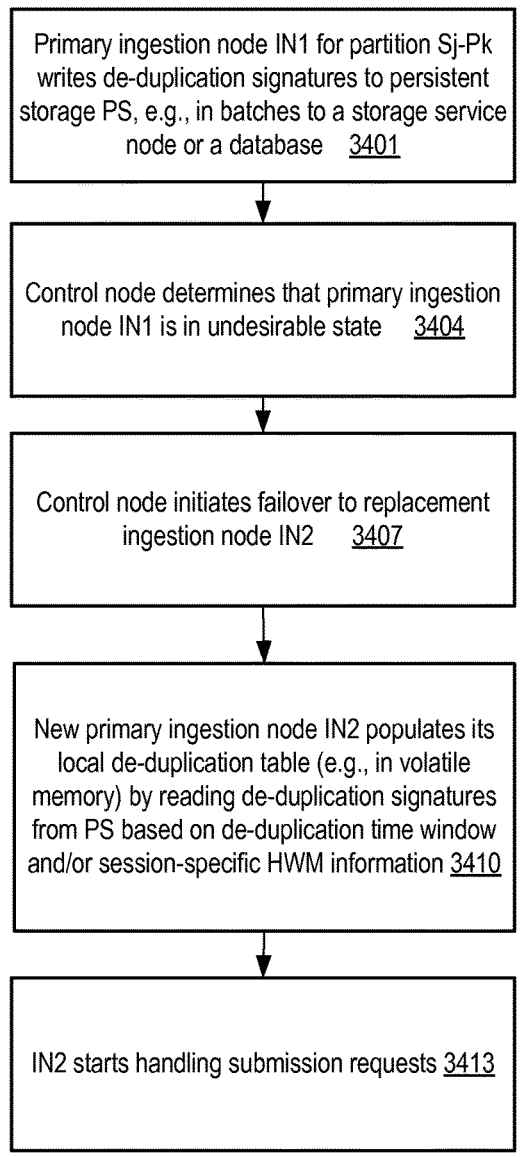
FIG. 34 is a flow diagram illustrating aspects of a failover mechanism for ingestion nodes that implement local de-duplication tables in volatile memory, according to at least some embodiments.

When an ingestion node fails or becomes inaccessible, a replacement ingestion node may be designated in accordance with a failover protocol. In some embodiments, each ingestion node may be configured as a member of a replication group, as indicated in FIG. 9, with one of the members designated as a primary at any given time. FIG. 34 is a flow diagram illustrating aspects of a failover mechanism for ingestion nodes that implement local de-duplication tables, according to at least some embodiments. As shown in element 3401, the current primary ingestion node IN1 configured for a partition Sj-Pk may write de-duplication signatures from its local de-duplication table (which may be instantiated in volatile memory in at least some implementations) to a persistent storage location PS, e.g., in batches to a storage subsystem node or a database. A control node of the SMS may determine that IN1 has reached an undesirable state (element 3404). The control node may then initiate failover to a replacement (currently non-primary) ingestion node IN2 (element 3407).

IN2 may instantiate and populate its own local de-duplication table, e.g., in volatile memory (element 3410). In some embodiments, to populate the table, IN2 may read de-duplication signatures from the persistent storage PS for those data records whose submission times lie within a de-duplication time window of the failure time of IN1. In other embodiments in which the session-specific sequence numbers described above are used for pruning the local de-duplication tables, SSSN metadata pertaining to various client sessions that were active at the time of the failure may be used to select the subset of de-duplication signatures that are to be read from the persistent storage. After it has populated the local de-duplication table, IN2 may start handling submission requests targeting Sj-Pk. In some embodiments, Sj-Pk submission requests that are received during the time taken to populate IN2's local de-duplication table may be queued until the table is fully populated. It is noted that at least in some embodiments, the de-duplication signatures may be stored at different storage locations than are used for the stream data records—e.g., a chain of replication nodes using one set of storage servers may be used for the data records, while a database may be used for the de-duplication signatures. In at least one embodiment, de-duplication signatures themselves may not be stored in persistent storage. Instead, some indication of how to reconstruct the signatures (e.g., information on the de-duplication keys to use) may be stored, and the de-duplication signatures may be recomputed during recovery by the replacement ingestion node from the data portion of the stream's records.

Chained Replication of Data Records

Figure 35:
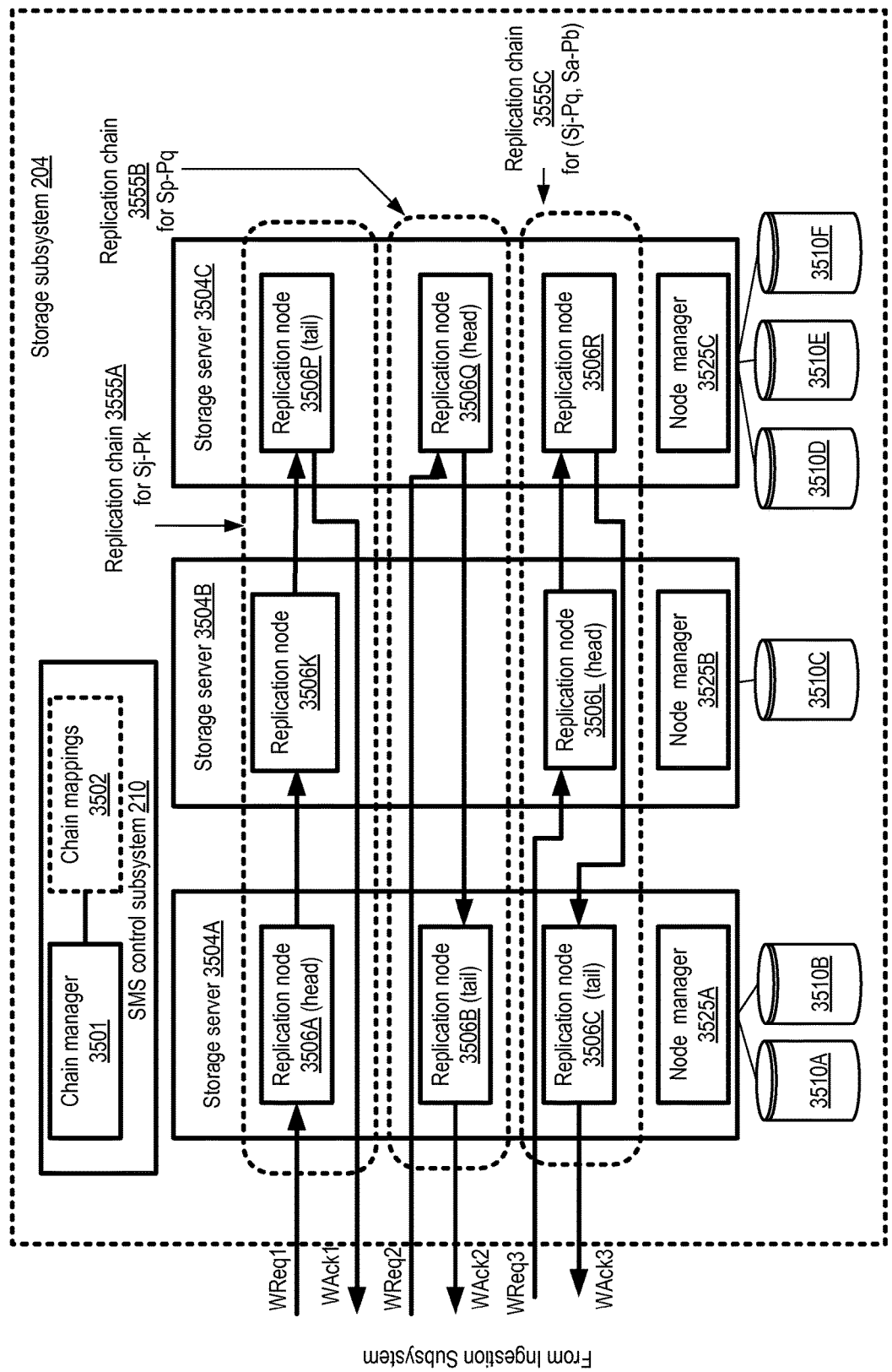
FIG. 35 illustrates examples of replication chains that may be used for sequential replication of data records at a storage subsystem of a stream management system, according to at least some embodiments.

As described earlier, a number of different techniques may be used for storing stream data records in various embodiments. In some embodiments, for example, a database service implemented at a provider network may be used. In at least one embodiment, an approach employing sequential or "chained" replication at a plurality of storage servers may be used, in which for example relatively inexpensive commodity disks of the storage servers may be used to efficiently attain a high degree of data durability. FIG. 35 illustrates examples of replication chains that may be used for sequential replication of data records at a storage subsystem of a stream management system, according to at least some embodiments. A chain manager 3501 may be configured in such embodiments to determine, for a given stream partition such as Sj-Pk, a mapping 3502 of the stream's data to a selected set of storage destinations at which copies of the partition's data records are to be created in sequential order. In at least some implementations the chain manager 3501 may be implemented as a component of an SMS control subsystem 210. Reflecting the sequential or chained nature of the replication, the mappings 3502 may be referred to herein as "chain mappings". Each partition may be assigned a replication chain 3555, comprising some number of replication nodes 3506 that are responsible for generating the replicas. A replication node 3506 may, for example, comprise a process or thread of execution at a storage server 3504, and may be granted write permission to one or more storage devices 3510 employing any of various types of non-volatile storage technologies and accessible from the storage server 3504. Different replication chains may comprise different numbers of replication nodes in at least some embodiments, e.g., based on the data durability requirements of the corresponding partitions. A given replication chain may include respective replication nodes instantiated at a plurality of data centers and/or at a plurality of availability containers in some embodiments. A replication chain may be assigned to more than one partition (potentially of more than one stream) in some implementations. The chain mappings 3502 generated by chain manager 3501 may comprise information on a number of different types of potentially dynamically modifiable relationships: the replication chain currently assigned to a given partition, the storage servers assigned to a given replication chain, the roles (e.g., head node, intermediate node, or tail node, described below in further detail) assigned to replication nodes of a given chain, and/or the storage device(s) at which a given replication node is to write data records.

In the example scenario depicted in FIG. 35, three replication chains—3555A, 3555B and 3555C—are shown in an SMS storage subsystem 204. Replication chain 3555A, configured for partition Sj-Pk (the kth partition of stream Sj), comprises three replication nodes: replication node 3506A on storage server 3504A, replication node 3506K on storage server 3504B, and replication node 3506P on storage server 3504C. Node 3506A is currently designated the "head" of the replication chain 3555A, while node 3506B is currently designated the "tail" of the replication chain 3555A. The head of a given replication chain may be configured to receive write requests (as indicated by the arrow labeled WReq1 in the case of node 3506A) for a given partition's data records from an SMS ingestion subsystem node. For example, in one embodiment an ingestion subsystem node may receive a data submission request of partition Sj-Pk from a data producer, optionally perform de-duplication checking as described earlier, determine (if it is not known already) the identity or address of a head node 3506A or replication chain 3555A from chain manager 3501, and then submit a corresponding write request WReq1 to the head node 3506A. After receiving the write request, the head node may store a local copy of the data to a storage device accessible from the head node's storage server, e.g., to one or more of local storage devices 3510A or 3510B in the case of head node 3506A at storage server 3504A. After storing the local replica, the head node 3506A may transmit or forward a write request for the data record to the next replication node in the replication chain, such as replication node 3506K. The sequential order in which the data records of the partition are to be replicated, starting from a head node, passing through zero or more intermediate nodes, and ending at a tail node, may be defined by the chain manager 3501 as part of the chain mapping 3502. For some partitions that may not require very high data durability, a single-node replication chain may be defined in some implementations, in which separate head and tail nodes are not defined. Each node in the chain may receive a write request, and store a local replica of the corresponding data records. All the nodes except for the tail node may transmit or forward a write request to the next node in the chain; in at least some implementations, such write requests may serve as acknowledgements that the nodes have completed their local writes successfully. The tail node, after storing its replica, may transmit a write acknowledgement (e.g., WAck1 from tail node 3506P of replication chain 3555A) to the SMS ingestion subsystem, indicating that the data record has been successfully stored in accordance with the applicable policies for the partition. As a result of replicating the data record in sequential order as described above, at least some level of workload balance may be achieved automatically among the different replication nodes of a chain—e.g., for a given data record submitted to the ingestion subsystem by a data producer, each node in the chain may receive one incoming message, perform one storage operation, and transmit one outbound message (either a write request or, in the case of the tail node, a write acknowledgement). Upon receiving the write acknowledgement from the tail replication node, in some embodiments the ingestion subsystem may provide a response to the data producer that submitted the data record, indicating that the data has been added or ingested to the stream.

Replication chains 3555A and 3555C each comprise three replication nodes in FIG. 35, while replication chain 3555B comprises two replication nodes. In each of the illustrated replicas chains, different nodes are designated as head nodes and tail nodes. For replication chain 3555B configured for partition Sp-Pq, node 3506Q is designated as the head node configured to receive write requests WReq2 from the SMS ingestion subsystem, and node 3506B is designated as the tail node configured to transmit write acknowledgements WAck2 to the ingestion subsystem. Replication chain 3555C is configured to store data records for two partitions of different streams—partition Sj-Pq and Sa-Pb. For replication chain 3555C, node 3506L on storage server 3504B is the head node, configured to receive write requests WReq3 of partitions Sj-Pq and Sa-Pb from the ingestion subsystem, while node 3506C at storage server 3504A is the tail node responsible for sending write acknowledgements WAck3 to the SMS ingestion subsystem. Replication nodes that are currently designated neither as head nodes nor as tail nodes, such as replication node 3506K or 3506R, may be referred to as intermediate nodes of their replication chains. In some embodiments, a given replication node may serve a plurality of roles—e.g., it may be a head node for one partition, a tail node for another partition, and/or an intermediate node for a different partition. As mentioned above, for some partitions a replication chain comprising only a single node may be configured, combining the head node functionality (receiving the initial write request for a data record from the SMS ingestion subsystem) and the tail node functionality (transmitting a write acknowledgment to the ingestion subsystem after the required number of replicas are generated).

In the embodiment depicted in FIG. 35, a number of multi-tenant resources may be used, e.g., resources may be shared by several partitions, either of the same stream or of different streams. For example, a given storage server 3504 may comprise a computer host or other computing device whose processors, memory and/or storage devices may be shared by several replication nodes 3506. Similarly, a given storage device 3510, such as any of devices 3510A, 3510B, 3510C, 3510D, 3510E and 3510F, may be used to store data records of more than one partition. Furthermore, as indicated above, a given replication node (e.g., a process or thread) may be configured to store replicas of data records of more than one stream. In at least some embodiments, the chain manager 3501 may be responsible for deciding, e.g., at stream initialization time and/or in response to dynamic repartitioning decisions, how best to share a limited set of resources (storage server hosts, storage devices, and replacement nodes) among the various partitions of one or more data streams. In some environments, the resources available for the replication chains may vary in their capabilities, further increasing the complexity of the chain manager's mapping responsibilities—e.g., some storage servers (such as 3504C) may have more local storage devices 3510 than others (such as 3504A and 3504B). The available storage devices 3510 may differ in performance, size, or even storage technology (e.g. SSDs may be available at some storage servers, while only rotating disk-based devices may be available at others).

In addition to generating the chain mappings 3502, the chain manager 3501 may also be responsible for monitoring the health status (e.g., responsiveness) of the various replication nodes 3506 in at least some embodiments, and/or to configure replacement replication nodes when certain types of triggering conditions or failures are detected. In one embodiment, a respective node manager 3525 may be instantiated at each storage server 3604—e.g., node manager 3525A at storage server 3504A, node manager 3525B at storage server 3506B, and node manager 3525C at storage server 3506C. The node manager 3525 may act as a local agent of the chain manager 3501, e.g., to monitor the health of replication nodes 3506 using a heartbeat mechanism and notify the chain manager regarding health status changes, to start/stop/replace replication nodes as needed, and so on. The use of node managers 3525 may help to reduce the workload that has to be handled by the chain manager 3501 in such embodiments. In other embodiments, node managers 3525 may not be implemented, and the chain manager 3501 may perform the necessary configuration and health monitoring functions without the help of such intermediaries. The chain manager 3501 itself may comprise a plurality of software and/or hardware components in some embodiments.

In at least some embodiments in which the storage devices 3510 include rotating disks, the replication nodes 3506 may attempt to optimize write performance using various techniques. For example, in one such embodiment, the number of disk seeks may be reduced by buffering data records (e.g., in volatile or main memory) and flushing the buffers to disk using large sequential write operations instead of smaller more random write operations. In other embodiments, non-volatile write caches may be used. In at least some embodiments, a given replication node 3506 may be configured to ensure that the local replica has been saved to persistent storage before transmitting a write request to the next node in the replication chain (or in the case of the tail node, before transmitting the write acknowledgement to the ingestion subsystem).

As described earlier, retrieval subsystem nodes may receive read requests directed at a given partition from a number of data consumers. A retrieval subsystem node may in turn determine the replication chain configured for the requested records (e.g., by communicating with the chain manager 3501 or some other SMS control subsystem component), and submit an internal read request to a selected replication node of the chain. The replication node may be selected based on any of various factors in different embodiments, e.g., based on a retrieval workload distribution policy, random selection, affinity (e.g., a retrieval subsystem node may continue to send read requests to a selected replication node as long as the node remains responsive), measured latencies (e.g., the retrieval node may record read latencies for various replication nodes of the chain and preferentially use the nodes that have the lowest read latencies), and so on. In one embodiment, retrieval nodes (e.g., processes or threads responsible for responding to retrieval requests from data consumers) may be implemented at the storage servers themselves—e.g., the storage subsystem and the retrieval subsystem may be combined. In such an embodiment, a data consumer may obtain network addresses of the combined retrieval/storage nodes, e.g., from the SMS control subsystem, and may submit read requests to the combination nodes.

Figure 36:
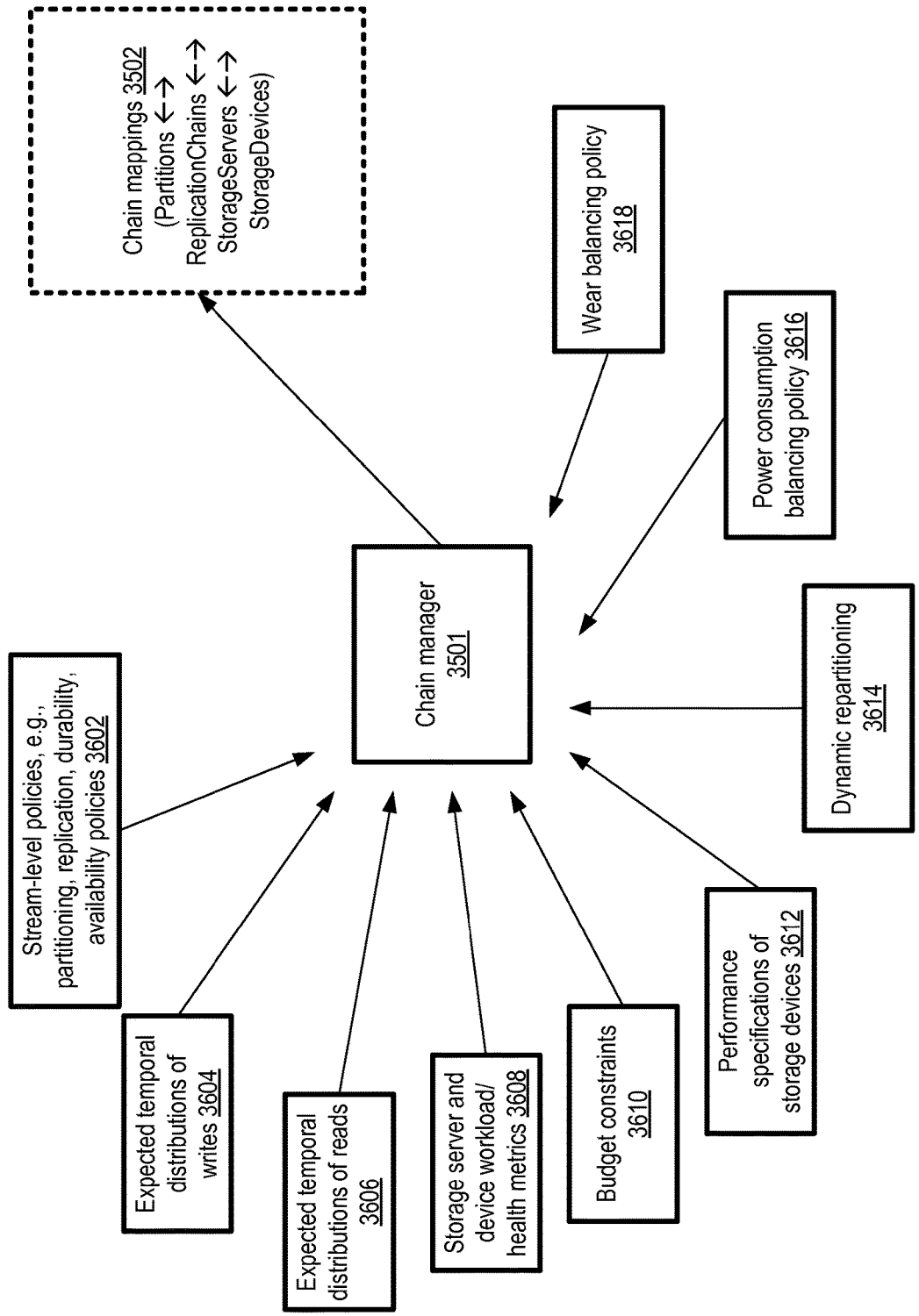
FIG. 36 illustrates examples of factors that may influence the replication chain mappings generated by a chain manager of a stream management system, according to at least some embodiments.

As indicated above, a number of policies, metrics and other factors may have to be taken into account by a chain manager 3501 to generate the chain mappings 3502. FIG. 36 illustrates examples of factors that may influence the replication chain mappings generated by a chain manager 3501 of a stream management system, according to at least some embodiments. The chain manager 3501 may determine an initial chain mapping in some embodiments at the time that a stream is created or initialized, and may modify the chain mapping as needed over time, e.g., in response to dynamic repartitioning events 3614. To determine the initial chain mapping, in some embodiments, the chain manager 3501 may determine various applicable stream-level policies 3602, such as the overall partitioning policy, replication or durability policies, and availability policies. The stream level policies 3602 may determine, for example, the number of partitions into which the stream is to be divided, and the physical/geographical distribution of the stream's data, which in turn may lead to the configuration of a corresponding number of replication chains at selected data centers or availability containers. The expected temporal distribution of writes (record submissions) 3604, and/or the expected temporal distribution of reads (record retrievals) 3606 may also be considered when deciding various aspects of chain mappings 3502, such as the kinds of storage devices to be used for the replication chains. For example, in an embodiment in which both rotating disk-based storage and solid-state storage devices are available, the chain manager may assign rotating disk storage to partitions for which high submission and retrieval rates are expected (so that large sequential writes and reads can be used, thus reducing the performance overhead associated with disk head seek operations), while SSDs may be used for streams with lower expected write/read rates.

Metrics 3608 collected from the various storage servers 3604 and/or from the storage devices being used (including, for example, throughput, latency, error rates, health state metrics, and the like) may also play a role in determining exactly which storage servers and devices should be assigned to a replication chain in some embodiments. The chain manager 3501 may also consider the performance specifications 3612 of storage devices accessible from various storage servers when determining chain mappings 3502, e.g., when deciding how many replication nodes should be configured to store data records at the same shared storage device. In some embodiments, the chain manager 3501 may also have to consider client budget constraints 3610—e.g., it may be advisable to use cheaper commodity disks than more expensive SSDs for a given replication chain in accordance with a client's storage budget. The chain manager may have to weigh conflicting factors when making its mapping decisions—e.g., from the budget perspective, a disk-based replication chain may be preferred for a given partition, but from a write performance perspective, it may be preferable to use SSDs. In some embodiments, a number of resource usage balancing policies may be employed for storage devices or storage servers, and such policies may also influence the mappings 3502 generated by chain manager 3501. For example, power consumption balancing policy 3616 may be applied in some storage systems, in an attempt to ensure that the variation in the amount of power consumed by different storage servers or devices is kept reasonably small. Similarly, for certain types of storage device such as SSDs or other kinds of disks, a "wear-and-tear" balancing policy 3618 may be implemented in some embodiments to distribute workloads relatively uniformly among devices, with the goal of achieving similar time-to-failure or time-to-replacement metrics for the various storage devices. In addition to the factors mentioned earlier, such power usage balancing policies 3616 and/or wear balancing policies 3618 may also be taken into consideration by chain manager 501 when selecting the specific resources to be used for various replication nodes.

In at least some embodiments, as discussed earlier, dynamic repartitioning may be initiated in response to client requests or in response to various triggering conditions. The triggering conditions may include overload conditions detected at a replication chain or at one or more replication nodes. In some such scenarios, in which the chain manager 3501 monitors the health status of the various replication nodes, the chain manager itself may initiate a dynamic repartitioning that in turn leads to a change in the chain mapping. As described above, the chain mappings 3502 may include mappings between streams/partitions, replication chains, storage servers, and/or storage devices in various embodiments. In some embodiments, some of the mapping decisions may be made locally at the storage servers—e.g., node managers 3525 may determine the specific storage devices, file systems etc. that are to be used by a given replication node, while the storage servers themselves may be selected by the chain manager 3501. In response to a repartitioning, changes may be made to any of the different mappings—e.g., a different replication chain may be assigned to a partition, a chain that was previously configured for one partition may be assigned a different set of one or more partitions, or the storage servers or devices being used for a given partition may be changed.

Figure 37:
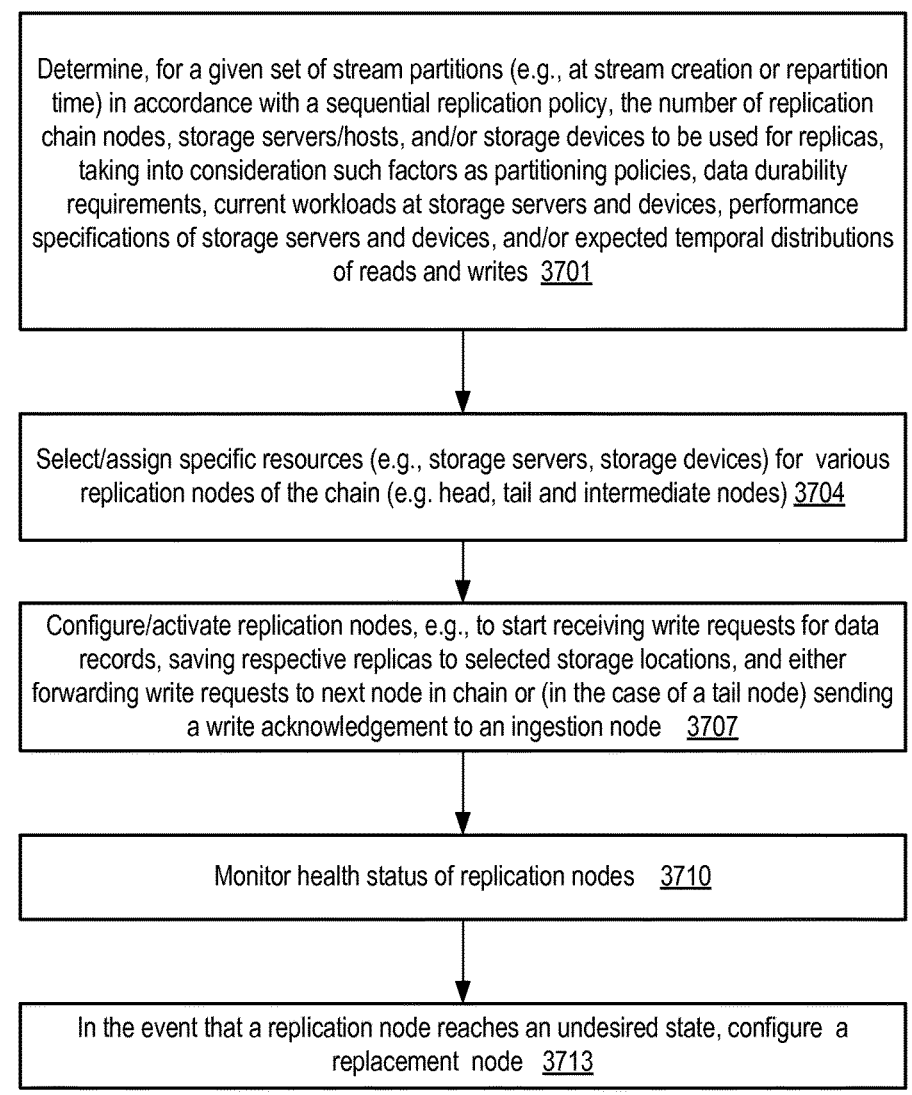
FIG. 37 is a flow diagram illustrating aspects of operations that may be performed by a chain manager of a stream management system, according to at least some embodiments.

FIG. 37 is a flow diagram illustrating aspects of operations that may be performed by a chain manager 3501 of a stream management system, according to at least some embodiments. As shown in element 3701, the chain manager may determine, for a given set of stream partitions (e.g., at stream creation or reparation time) in accordance with a sequential replication policy, the number of replication chain nodes, storage servers/hosts, and/or storage devices to be used for replicas. The chain manager may make its determinations based on various factors in different embodiments, such as the partitioning policy in effect, data durability requirements, current workloads at storage servers and devices, performance specifications of storage servers and devices, and/or the expected temporal distributions of reads and writes. The resources to be used for the replication chain members may then be selected (element 3704)—e.g., the particular nodes that are to be designated as the head node, tail node, and intermediate node(s) may be identified. In some embodiments, in which for example the different nodes are instantiated at different data centers, the selection of the roles (head vs. tail vs. intermediate) for the nodes, and the exact sequential order in which the replicas are to be generated, may be based on the physical locations of the storage servers used—e.g., an attempt to minimize end-to-end latency for the replication process may be made. As noted earlier, some or all of the resources being used may be multi-tenant in at least some embodiments—e.g., a given storage server, device, or node, may be used for replicating data of two or more different partitions/streams.

The selected replication nodes may be configured or activated (element 3707), e.g., to start receiving write requests for data records, saving respective replicas to selected storage locations, and either forwarding the write request on or (in the case of a tail node) sending an acknowledgement to the ingestion node from which the initial write request was received at the chain. In some embodiments, pools of processes or threads may be set up at the storage nodes, and members of such pools may be configured for replication chains, utilized until they are no longer required, and then returned to the pools. Each node in a given replication chain may be notified regarding the next node in the chain (or that it is the tail node), e.g., by the chain manager or a node manager at the storage server in some embodiments.

After the replication nodes have been configured, the chain manager may monitor the health status of the nodes (element 3710). In some embodiments, a heartbeat mechanism may be used, and/or log messages generated by the replication nodes may be monitored. In some embodiments, a node manager at the storage server may be configured to monitor the health of replication nodes at the storage server, and notify the chain manager when an unexpected/undesired health state is discovered. In at least some embodiments, the chain manager and/or the node manager may configure a replacement replication node if/when an undesired state of an existing replication node is identified (element 3713).

Figure 38:
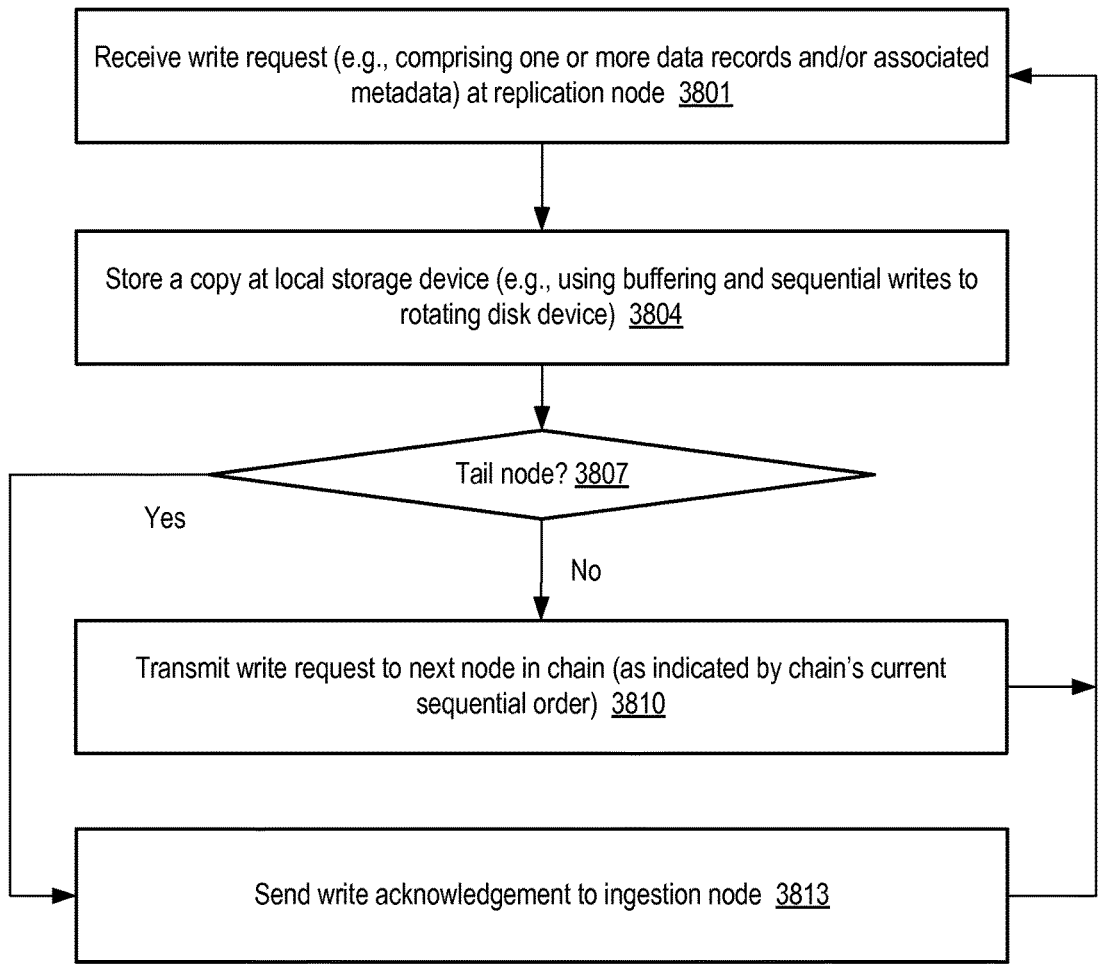
FIG. 38 is a flow diagram illustrating aspects of operations that may be performed by a node of a replication chain at a stream management service, according to at least some embodiments.

FIG. 38 is a flow diagram illustrating aspects of operations that may be performed by a node of a replication chain (e.g., either the head node, an intermediate node, or the tail node) at a stream management service, according to at least some embodiments. As shown in element 3801, a write request corresponding to a data record that was submitted by a data producer may be received by the replication node configured for the partition to which the data record belongs. In the case where the recipient is the head node of the chain, the write request may be received from an SMS ingestion subsystem node. (The ingestion node may determine the network address of the head node, for example, by querying the chain manager or another component of the SMS control subsystem). In the cases where the recipient is not a head node, the write request may be received from another node of the chain, e.g., in accordance with the sequential replication order defined for the replica by the chain manager. The write request may comprise the data portion of the data producer's submission, and may also include associated metadata in some embodiments, such as a partition-wide sequence number, a session-specific sequence number, a de-duplication signature, a partition identifier, and/or a submission timestamp as discussed earlier. The recipient node may store a copy of the data and/or metadata at a local storage device in the depicted embodiment (element 3804). In some embodiments, the data and/or metadata may be buffered temporarily in order to accumulate enough data for a sequential write operation of a desired size, so that, for example, the number of disk seeks can be reduced.

If the recipient node is the tail node of the replication chain (as detected in element 3807), a write acknowledgement may be transmitted to the ingestion subsystem node from which the data was initially received at the storage subsystem (element 3813). The write acknowledgement may signal to the ingestion subsystem that the replication of the data producer's data has been successfully completed, and a corresponding acknowledgement to that effect may be sent to the data producer in at least some embodiments. If the recipient node is not the tail node (as also detected in element 3807), the write request may be sent on to the next node in the chain (element 3810), e.g., with the next node being selected in accordance with the sequential replication order defined for the chain by the chain manager. The operations corresponding to element 3801 onwards may be repeated at the same set of replication chain nodes for data records submitted subsequently for the same partition.

It is noted that in various embodiments, operations other than those illustrated in the flow diagrams of FIG. 17-FIG. 24, FIG. 27-29, FIG. 34-35, and FIG. 37-38 may be used to implement the stream management service and/or the stream processing functionality described above. Some of the operations shown may not be implemented in some embodiments or may be implemented in a different order, or in parallel rather than sequentially. It is also noted that, with respect to each of the SMS and SPS functions for which programmatic interfaces are supported in various embodiments, any combination of one or more techniques may be used for implementing the interfaces, including the use of web pages, web sites, web-services APIs, other APIs, command-line tools, graphical user interfaces, mobile applications (apps), tablet apps, and the like.

Use Cases

The techniques described above, of establishing scalable partitioning-based, dynamically configurable managed multi-tenant services for collection, storage, retrieval and staged processing of stream data records may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to an SMS for scalable ingestion and storage, and SPS techniques described may be implemented for the analysis of the collected metrics. Similarly, applications to collect and analyze large numbers of log records from numerous log sources (e.g., application logs from the nodes of a distributed application, or system logs from the hosts or compute instances at a data center) may also be able to utilize SMS and SPS functionality. In at least some environments, the SPS processing operations may comprise a real-time ETL (Extract-Transform-Load) processing operation (i.e., an operation that transforms received data records in real time for loading into a destination, instead of doing the transformation offline), or a transformation of data records for insertion into a data warehouse. Using an SMS/SPS combination for loading data into a data warehouse in real time may avoid the delays that are typically required to clean and curate data from one or more data sources, before the data can be inserted into a warehouse for analysis.

A number of different "big data" applications may also be built using the SMS and SPS techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein. The flexible policy-based configuration options and pricing options may help different types of users customize the streaming functionality to suit their specific budgets and data durability/availability requirements.

Illustrative Computer System

Figure 39:
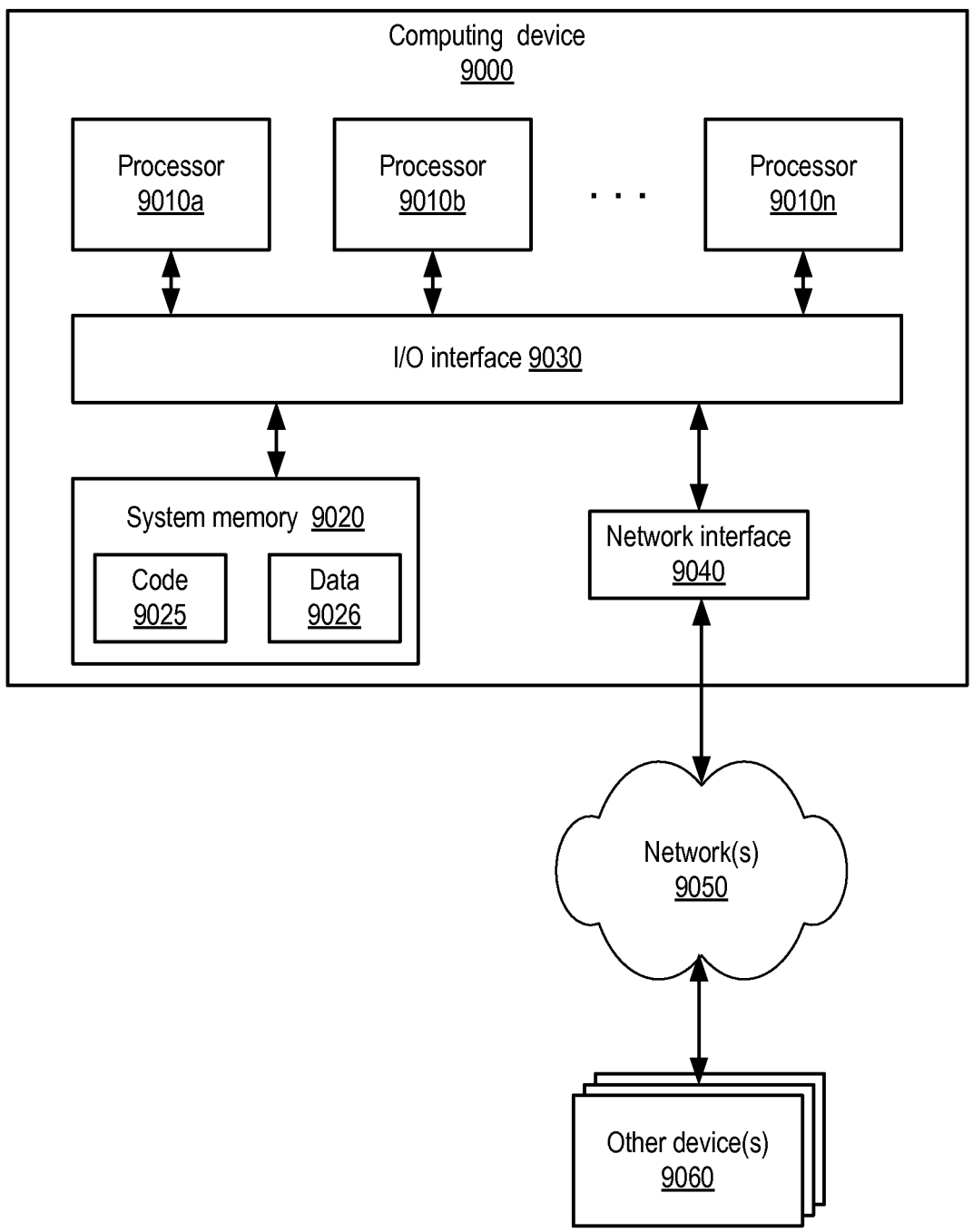
FIG. 39 is a block diagram illustrating an example computing device that may be used in at least some embodiments.

In at least some embodiments, a server that implements a portion or all of one or more of the technologies described herein, including the techniques to implement the components of the SMS subsystems (e.g., the ingestion, storage, retrieval and control subsystems, including chain managers), as well as the SPS worker and control nodes, may include a general-purpose computer system that includes or is configured to access one or more computer-accessible media. FIG. 39 illustrates such a general-purpose computing device 9000. In the illustrated embodiment, computing device 9000 includes one or more processors 9010 coupled to a system memory 9020 via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In various embodiments, system memory 9020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices used to store physical replicas of data object partitions. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 38, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 38 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 39 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
assign, to store respective replicas of data records of a partition of a particular data stream, a replication chain comprising three or more replication nodes of a multi-tenant stream management system, wherein the replication chain comprises a head replication node and a tail replication node, and wherein at least one replication node of the plurality of replication nodes is implemented at least in part using a resource shared with a different replication node assigned to a different partition of a different data stream;
receive, at an ingestion node of the stream management system assigned to the first partition, a submission request indicating a particular data record of the first partition;
receive the data record at the head replication node from the ingestion node;
store, in a sequential order starting from the head replication node and ending at the tail replication node, a replica of the data record at a respective local storage device at each of the three or more replication nodes of the replication chain;
subsequent to storing the replica of the data record at each of the three or more replication nodes in the sequential order, transmit, from the tail replication node to the ingestion node, an indication that replication of the data record has been completed; and
provide, to a source of the submission request, a response indicating that the data record has been successfully stored at the stream management system.

2. The system as recited in claim 1, wherein the replication chain is assigned based at least in part on one or more of: (a) an expected temporal distribution of data record submissions to the partition, (b) an expected temporal distribution of data record retrievals from the partition, (c) one or more performance metrics of resources configurable to implement replication nodes, (d) input/output performance characteristics of storage devices accessible from replication nodes, (e) budget constraints associated with the particular data stream, or (f) a resource usage balancing policy.

3. The system as recited in claim 1, wherein the head replication node is implemented at a first data center, and the tail replication node is implemented at a different data center.

4. The system as recited in claim 1, wherein the one or more computing devices are further configured to:
assign at least a particular replication node of the three or more replication nodes to store replicas of data records of a different partition of a different data stream.

5. The system as recited in claim 1, wherein to store a particular replica of the data record, the one or more computing devices are further configured to:
accumulate a plurality of data records of the partition, including the data record, in a volatile memory buffer at a particular replication node; and
flush the plurality of data records to a particular non-volatile local storage device of the particular replication node using one or more sequential write operations.

6. A method, comprising:
performing, by one or more computing devices:
assigning, to store respective replicas of data records of a partition of a particular data stream, a replication chain comprising three or more replication nodes of a multi-tenant stream management system;
receiving, at a selected replication node of the replication chain, a data record of the partition submitted to the stream management system by a data producer;
storing, in a sequential order, a replica of the data record at a respective local storage device at each replication node of the replication chain; and
providing, subsequent to said storing the replica of the data record at each replication node of the replication chain in the sequential order, an acknowledgement of a successful storage of the data record at the stream management system.

7. The method as recited in claim 6, wherein the local storage device at a particular replication node of the replication chain comprises non-volatile storage.

8. The method as recited in claim 6, wherein said assigning is based at least on part on one or more of: (a) a partitioning policy associated with the particular data stream, (b) an expected temporal distribution of data record submissions, (c) an expected temporal distribution of data record retrievals, (d) one or more performance metrics obtained from resources configurable to host replication nodes, (e) input/output performance characteristics of replication nodes of the replication chain, (f) budget constraints associated with the particular data stream, or (g) a resource usage balancing policy.

9. The method as recited in claim 6, wherein the three or more replication nodes include a first replication node implemented at a first data center, and a second replication node implemented at a different data center.

10. The method as recited in claim 6, further comprising performing, by the one or more computing devices:
assigning at least a particular replication node of the replication chain to store replicas of data records of a different partition of the particular data stream.

11. The method as recited in claim 6, further comprising performing, by the one or more computing devices:
assigning at least a particular replication node of the replication chain to store replicas of data records of a different partition of a different data stream.

12. The method as recited in claim 6, further comprising performing, by the one or more computing devices:
instantiating a particular replication node of the replication chain at a particular computing resource; and
instantiating, at the particular computing resource, a different replication node of a different replication chain assigned to a different partition of a different data stream.

13. The method as recited in claim 6, further comprising performing, by the one or more computing devices:
accumulating a plurality of data records of the partition, including the data record, in a volatile memory buffer at a particular replication node; and flushing the plurality of data records to a particular non-volatile local storage device of the particular replication node using one or more sequential write operations.

14. The method as recited in claim 6, wherein the replication chain comprises a plurality of replication nodes, further comprising performing, by the one or more computing devices:

designating a particular replication node of the replication chain as a head replication node configured to receive the data record from an ingestion node of the stream management service, and a different replication node of the replication chain as a tail replication node configured to transmit an acknowledgement to the ingestion node after a plurality of replicas of the data record have been stored.

15. The method as recited in claim 6, further comprising performing, by the one or more computing devices:

receiving a retrieval request for the data record;

selecting, based at least in part on a retrieval workload distribution policy for the partition, a particular replication node of the replication chain from which contents of the data record are to be read; and providing contents of the data record from the particular replication node.

16. A non-transitory computer-accessible storage medium storing program instructions that when executed on one or more processors:

determine, based at least in part on a partitioning policy associated with a particular data stream of a multi-tenant stream management service, three or more replication nodes to be assigned to store replicas of data records of a particular partition of the particular data stream in accordance with a sequential replication policy for storing, in a sequential order, a replica of a data record at each of the three or more replication nodes and subsequently providing an acknowledgement of a successful storage of the replica of the data record;

select computing resources of the multi-tenant stream management service at which the three or more replication nodes assigned to the particular partition are to be implemented;

initiate a configuration of the three or more replication nodes at selected computing resources;

monitor a health status of the three or more replication nodes; and in response to a detection of an unexpected health status of a replication node of the three or more replication nodes, initiate a configuration of a replacement replication node.

17. The non-transitory computer-accessible storage medium storing program as recited in claim 16, wherein the computing resources are selected based at least in part on one or more of: (a) an expected temporal distribution of data record submissions, (b) an expected temporal distribution of data record retrievals, (c) one or more performance metrics of the computing resources, (d) input/output performance characteristics of storage devices accessible from the computing resources, (e) budget constraints associated with the particular data stream, or (f) a resource usage balancing policy.

18. The non-transitory computer-accessible storage medium storing program as recited in claim 16, wherein the three or more replication nodes include a first replication node implemented at a first data center, and a second replication node implemented at a different data center.

19. The non-transitory computer-accessible storage medium storing program as recited in claim 16, wherein the instructions when executed at the one or more processors:

assign at least a particular replication node of the three or more replication nodes to store replicas of data records of a different partition of a different data stream.

20. The non-transitory computer-accessible storage medium storing program as recited in claim 16, wherein the three or more replication nodes comprises a plurality of replication nodes, wherein the instructions when executed on the one or more processors:

designate a particular replication node of the plurality of replication nodes as a head replication node configured to receive a data record of the particular partition from an ingestion node of the stream management service, and a different replication node of the plurality of replication nodes as a tail replication node configured to transmit an acknowledgement to the ingestion node after a plurality of replicas of the data record have been stored.

* * * * *